US011862860B2

(12) United States Patent
Ross et al.

(10) Patent No.: US 11,862,860 B2
(45) Date of Patent: Jan. 2, 2024

(54) SYSTEMS AND METHODS FOR IMPROVING WIRELESS MESH NETWORKS

(71) Applicant: L3VEL, LLC, Wilmington, DE (US)

(72) Inventors: Kevin Ross, Lehi, UT (US); Muhammad Ahsan Naim, South Jordan, UT (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 17/694,365

(22) Filed: Mar. 14, 2022

(65) Prior Publication Data

US 2022/0294127 A1 Sep. 15, 2022

Related U.S. Application Data

(60) Provisional application No. 63/160,638, filed on Mar. 12, 2021.

(51) Int. Cl.
*H01Q 21/24* (2006.01)
*H01Q 19/02* (2006.01)
*H01Q 3/46* (2006.01)

(52) U.S. Cl.
CPC ............ *H01Q 21/245* (2013.01); *H01Q 3/46* (2013.01); *H01Q 19/021* (2013.01)

(58) Field of Classification Search
CPC ........ H01Q 21/245; H01Q 21/24; H01Q 3/46; H01Q 3/245; H01Q 19/021; H01Q 19/062
See application file for complete search history.

(56) References Cited

U.S. PATENT DOCUMENTS

| | | | |
|---|---|---|---|
| 8,385,921 | B1 | 2/2013 | Shousterman et al. |
| 8,406,126 | B1 | 3/2013 | Leiba et al. |
| 9,425,985 | B1 | 8/2016 | Shousterman et al. |
| 9,538,331 | B2 | 1/2017 | Ross |
| 9,621,465 | B2 | 4/2017 | Ross |
| 9,860,179 | B2 | 1/2018 | Ross |
| 9,942,776 | B2 | 4/2018 | Ross et al. |

(Continued)

FOREIGN PATENT DOCUMENTS

WO 2018083548 A1 5/2018

OTHER PUBLICATIONS

International Searching Authority International Search Report and Written Opinion dated Jun. 23, 2022, issued in connection with International Application No. PCT/US2022/020220, filed Mar. 14, 2022, 9 pages.

*Primary Examiner* — Awat M Salih
(74) *Attorney, Agent, or Firm* — Lee Sullivan Shea & Smith LLP

(57) ABSTRACT

A radio module for a wireless communication node comprises (i) a phased antenna array comprising a first set of antenna elements having a first polarization and a second set of antenna elements having a second polarization, (ii) a radio frequency (RF) module comprising a plurality of RF chains that are configured to feed the first and second sets of antenna elements in the phased antenna array, and (iii) a control unit that is configured to control an activation state of each antenna element in the phased antenna array. The radio module further comprises at least one beam narrowing module that is configured to (i) receive signals emitted by any active antenna element in the phased antenna array and (ii) consolidate the received signals into a respective narrow beam composite signal.

20 Claims, 33 Drawing Sheets

(56) References Cited

U.S. PATENT DOCUMENTS

| | | | |
|---|---|---|---|
| 9,973,939 | B2 | 5/2018 | Ross |
| 10,027,508 | B2 | 7/2018 | Leiba et al. |
| D856,962 | S | 8/2019 | Hart et al. |
| 10,530,851 | B1 | 1/2020 | Hart |
| 10,530,882 | B2 | 1/2020 | Ross |
| 2014/0057570 | A1 | 2/2014 | Leiba |
| 2015/0358082 | A1 | 12/2015 | Ross |
| 2018/0294551 | A1 | 10/2018 | Ryan et al. |
| 2018/0331935 | A1 | 11/2018 | Ross et al. |
| 2018/0343685 | A1 | 11/2018 | Hart et al. |
| 2019/0044547 | A1* | 2/2019 | Nilsson .................. H04B 1/005 |
| 2019/0074871 | A1* | 3/2019 | Petersson ................. H01Q 3/40 |
| 2020/0022201 | A1 | 1/2020 | Ross et al. |
| 2020/0037384 | A1 | 1/2020 | Yang et al. |
| 2020/0144719 | A1 | 5/2020 | Scarborough et al. |
| 2020/0350680 | A1 | 11/2020 | Yang et al. |
| 2022/0021125 | A1* | 1/2022 | Baligh ..................... H01Q 3/46 |

* cited by examiner

SYSTEMS AND METHODS FOR IMPROVING WIRELESS MESH NETWORKS

CROSS-REFERENCE TO RELATED APPLICATIONS

This application claims priority to U.S. Provisional Application No. 63/160,638, filed Mar. 12, 2021 and entitled "SYSTEMS AND METHODS FOR IMPROVING WIRELESS MESH NETWORKS," which is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communication with a user through a communication connection or a system management action.

Current wireless mesh networking systems exhibit many shortcomings. For instance, current wireless mesh networking systems may fail to account for extra protection for point-to-point narrow beam wireless paths. Such paths are highly directional and work only under perfect line-of-sight or near line-of-sight conditions. Once the wireless mesh network is built, certain events such as vegetation growth or loss of an intermediary node can impact the line-of-sight paths between the links. This can result in single or multiple link failures in the network.

Additionally, current wireless mesh networking systems may fail to account for extra protection for a high reliability wireless path for carrying backhaul data that carries control signaling data along with user data for users in the network segment. Current wireless mesh networking systems use the same or similar beam transmission techniques for an access path that carries data for a single user and backhaul path that may affect network performance as backhaul paths tend to be more sensitive to interference and other signal inhibitors and can degrade the performance of entire network segment Thus, there exists multiple needs in the art for improved systems and methods relating to wireless communication mesh network design and operation.

OVERVIEW

The present disclosure, for example, relates to wireless networks and communications including, but not limited to, broadband internet services to end user, security and/or automation systems, and more particularly to mesh networking and related operations and techniques.

The wireless communication systems disclosed herein may comprise a set of wireless communication nodes that are each installed with respective wireless communication equipment for establishing point-to-point (ptp) and/or point-to-multipoint (ptmp) wireless links. Depending on the implementation, this wireless communication equipment may take various forms, and in at least some examples, that wireless communication equipment may include at least one radio module that is based on a phased antenna array.

In accordance with the present disclosure, such a radio module may comprise (i) a phased antenna array comprising antenna elements having multiple different polarizations (e.g., a first set of antenna elements having a horizontal polarization and a second set of antenna elements having a vertical polarization), (ii) an radio frequency (RF) module comprising a plurality of RF chains that feed the antenna elements, (iii) a control unit that is configured to dynamically control an activation state (e.g., the activation/deactivation) of the RF chains and their corresponding antenna elements in order to alter the polarization and/or emission pattern of the radiated signal, and perhaps also (iv) one or more beam narrowing modules. This control unit may comprise hardware, software, or some combination thereof, among other possibilities. Further, in practice, the control unit may be configured to dynamically control the activation state of the RF chains and their corresponding antenna elements in response to an instruction from a network processing unit (NPU) of the radio module, a digital module of the radio module, or the like, among various other possibilities.

Accordingly, in one aspect, disclosed herein is a radio module for a wireless communication node in a wireless mesh network, where the radio module includes (i) a phased antenna array comprising a first set of antenna elements having a first polarization and a second set of antenna elements having a second polarization, (ii) an RF module comprising a plurality of RF chains that are configured to feed the first and second sets of antenna elements in the phased antenna array, and (iii) a control unit that is configured to control an activation state of each antenna element in the phased antenna array.

The radio module may further include at least one beam narrowing module. The at least one beam narrowing module may take various forms, including a lens antenna or a parabolic antenna, among other examples.

In some implementations, the at least one beam narrowing module may comprise a single beam narrowing module that is configured to (i) receive signals emitted by any active antenna element in the phased antenna array and (ii) consolidate the received signals into a narrow beam composite signal. In such implementations, the control unit may be configured to activate only a given one of the first or second sets of antenna elements at any given time while deactivating the other of the first or second sets of antenna elements.

In other implementations, the at least one beam narrowing module may comprise (1) a first beam narrowing module that is configured to (i) receive signals emitted by the first set of antenna elements having the first polarization when active and (ii) consolidate the received signals into a first narrow beam composite signal having the first polarization, and (2) a second beam narrowing module that is configured to (i) receive signals emitted by the second set of antenna elements having the second polarization when active and (ii) consolidate the received signals into a second narrow beam composite signal having the second polarization. In such implementations, the control unit may be configured to (i) activate one of the first or second sets of antenna elements for signal reception over a bi-directional wireless link and (ii) activate the other of the first or second sets of antenna elements for signal transmission over the bi-directional wireless link.

In still other implementations, the first set of antenna elements having the first polarization may be grouped into at least two separate subsets of antenna elements having the first polarization, and the second set of antenna elements having the second polarization may be grouped into at least two separate subsets of antenna elements having the second polarization. In such implementations, the at least one beam narrowing module may comprise a plurality of beam narrowing modules that are each configured to (i) receive signals emitted by a respective subset of antenna elements when active and (ii) consolidate the received signals into a respective narrow beam composite signal, and the control unit may be configured to independently activate or deactivate each respective subset of antenna elements. In at least some implementations, the control unit may be configured to (i) activate a first subset of the first set of antenna elements for signal reception over a first bi-directional wireless link, (ii) activate a first subset of the second set of antenna elements for signal transmission over the first bi-directional wireless link, (iii) activate a second subset of the first set of antenna elements for signal reception over a second bi-directional wireless link, and (iv) activate a second subset of the second set of antenna elements for signal transmission over the second bi-directional wireless link.

The first and second polarizations of the antenna elements may take various forms. In some implementations, the first polarization may be a horizontal polarization and the second polarization may be a vertical polarization. In other implementations, the first polarization may be a +45 degree polarization and the second polarization may be a −45 degree polarization.

The plurality of RF chains of the RF module may take various forms. In some implementations, the plurality of RF chains may each be configured to feed a single antenna element of the phased antenna array. In other implementations, the plurality of RF chains may each be configured to feed two or more antenna elements of the phased antenna array.

In another aspect, disclosed herein is a communication system comprising a set of wireless communication nodes that are installed with respective equipment for operating as part of a wireless mesh network, wherein the respective equipment of each wireless communication node in the set includes a respective radio module that includes (i) a phased antenna array comprising a first set of antenna elements having a first polarization and a second set of antenna elements having a second polarization, (ii) an RF module comprising a plurality of RF chains that are configured to feed the first and second sets of antenna elements in the phased antenna array, and (iii) a control unit that is configured to control an activation state of each antenna element in the phased antenna array.

Each respective radio module of each wireless communication node in the set of wireless communication nodes may further include at least one beam narrowing module. The at least one beam narrowing module may take various forms, including a lens antenna or a parabolic antenna, among other examples.

In some implementations, the at least one beam narrowing module of each respective radio module may comprise a single beam narrowing module that is configured to (i) receive signals emitted by any active antenna element in the phased antenna array and (ii) consolidate the received signals into a narrow beam composite signal. In such implementations, the control unit may be configured to activate only a given one of the first or second sets of antenna elements at any given time while deactivating the other of the first or second sets of antenna elements.

In other implementations, the at least one beam narrowing module of each respective radio module may comprise (1) a first beam narrowing module that is configured to (i) receive signals emitted by the first set of antenna elements having the first polarization when active and (ii) consolidate the received signals into a first narrow beam composite signal having the first polarization, and (2) a second beam narrowing module that is configured to (i) receive signals emitted by the second set of antenna elements having the second polarization when active and (ii) consolidate the received signals into a second narrow beam composite signal having the second polarization. In such implementations, the control unit may be configured to (i) activate one of the first or second sets of antenna elements for signal reception over a bi-directional wireless link and (ii) activate the other of the first or second sets of antenna elements for signal transmission over the bi-directional wireless link.

In still other implementations, for each respective radio module, the first set of antenna elements having the first polarization may be grouped into at least two separate subsets of antenna elements having the first polarization, and the second set of antenna elements having the second polarization may be grouped into at least two separate subsets of antenna elements having the second polarization. In such implementations, the at least one beam narrowing module of each respective radio module may comprise a plurality of beam narrowing modules that are each configured to (i) receive signals emitted by a respective subset of antenna elements when active and (ii) consolidate the received signals into a respective narrow beam composite signal, and the control unit may be configured to independently activate or deactivate each respective subset of antenna elements. In at least some implementations, the control unit may be configured to (i) activate a first subset of the first set of antenna elements for signal reception over a first bi-directional wireless link, (ii) activate a first subset of the second set of antenna elements for signal transmission over the first bi-directional wireless link, (iii) activate a second subset of the first set of antenna elements for signal reception over a second bi-directional wireless link, and (iv) activate a second subset of the second set of antenna elements for signal transmission over the second bi-directional wireless link.

The first and second polarizations of the antenna elements included in each respective radio module may take various forms. In some implementations, the first polarization may be a horizontal polarization and the second polarization may be a vertical polarization. In other implementations, the first polarization may be a +45 degree polarization and the second polarization may be a −45 degree polarization.

The plurality of RF chains of the RF module included in each respective radio module may take various forms. In some implementations, the plurality of RF chains may each be configured to feed a single antenna element of the phased antenna array. In other implementations, the plurality of RF chains may each be configured to feed two or more antenna elements of the phased antenna array.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

Disclosed herein are technologies for wireless mesh networks that serve as the basis for communication systems configured to provide various types of services to end users, including but not limited to telecommunication services such as high-speed internet.

Figure 1:
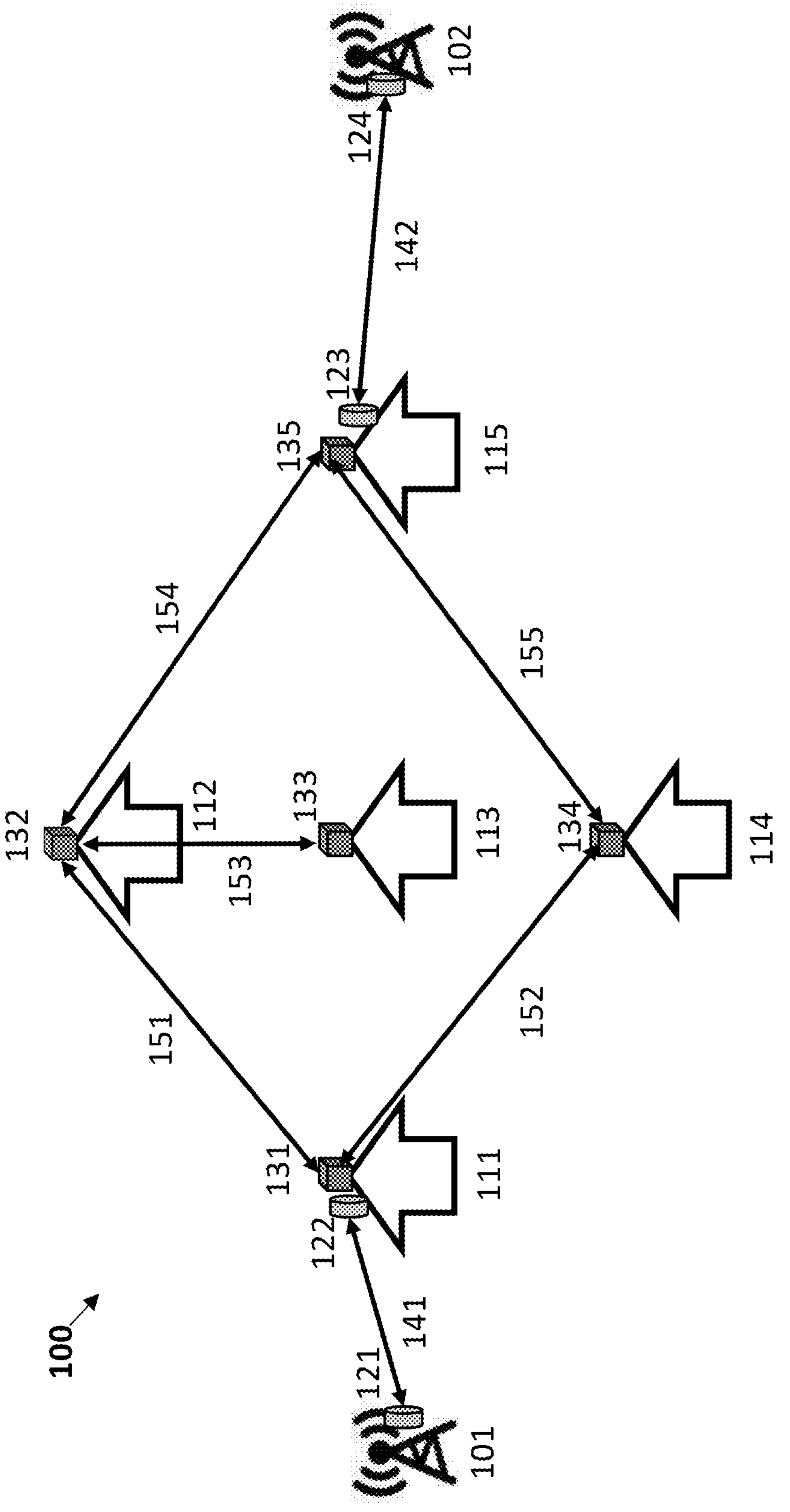
FIG. 1 depicts an example of a communication system that is based on a wireless mesh network, in accordance with the present disclosure.

For instance, the wireless mesh network technologies disclosed herein may form the basis for a data communication system capable of providing multigigabit internet speeds through a mesh network of infrastructure nodes interconnected via wireless point-to-point (ptp) and/or point-to-multipoint (ptmp) links, such as the example communication system 100 illustrated in FIG. 1. As shown, communication system 100 in FIG. 1 includes Tower/fiber access points 101 and 102, which may each also be referred to as a fiber Point of Presence ("PoP"). Tower/fiber access points 101 and 102 can be co-located or can be located at different physical locations. Tower/fiber access points 101 and 102 have access to a high-bandwidth dark (or lit) fiber capable of providing up to several hundred gigabits/second of data throughput. Tower/fiber access points 101 and 102 provide backhaul connectivity to a core network/data center (not shown in the FIG. 1 for the sake of simplicity).

In accordance with the present disclosure, Tower/Fiber access points 101 and 102 may host respective wireless communication equipment that enables Tower/Fiber access points 101 and 102 to operate as wireless communication nodes of a wireless mesh network. In this respect, the Tower/Fiber access points 101 and 102 that are installed with the wireless communication equipment for operating as wireless mesh nodes may each be referred to herein as a "fiber PoP node" of the wireless mesh network shown in FIG. 1.

For instance, as shown, Tower/Fiber access points 101 and 102 may host respective sets of wireless communication equipment 122 and 123 for establishing ptp links with a next tier of wireless communication nodes in the wireless mesh network (which, as noted below, may be referred to as the "seed nodes" of the wireless communication network). The respective sets of wireless communication equipment 121 and 124 are capable of reception and transmission of high bandwidth (multiple gigahertz) signals operating at very high frequencies (e.g., 6 Ghz~100 Ghz such as 28 Ghz, V band, E band, etc.). The respective sets of wireless communication equipment 121 and 124 may each comprise a baseband/digital unit equipped with components including but not limited to a processor, memory, etc. The respective sets of wireless communication equipment 121 and 124 also each comprise an RF unit and an antenna unit for establishing at least one ptp link with another wireless communication node of the wireless mesh network. In at least some embodiments, the antenna subsystem of each respective set of wireless communication equipment 121 and 124 is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, communication system 100 includes seed homes 111 and 115. Examples of seed homes include detached single-family homes, non-detached residential buildings such as multi-dwelling units (MDUs), commercial buildings such as small/medium businesses (SMB), or some other private property or infrastructure, where communication equipment can be deployed on rooftops of such seed homes among other possibilities. (In this respect, it will be appreciated that a "seed home" need not necessarily be a residential home.) In accordance with the present disclosure, seed homes 111 and 115 may host respective wireless communication equipment that enables seed homes 111 and 115 to operate as wireless communication nodes of a wireless mesh network. In this respect, the seed homes 111 and 115 that are installed with the respective wireless communication equipment for operating as wireless mesh nodes may each be referred to herein as a "seed node" of the wireless mesh network shown in FIG. 1.

For instance, as shown in FIG. 1, seed homes 111 and 115 may host respective sets of wireless communication equipment 122 and 123 for establishing ptp links with the fiber PoP nodes of the wireless mesh network, which may be considered a different tier of the wireless mesh network. The respective sets of wireless communication equipment 122 and 123 are each capable of reception and transmission of high bandwidth (multiple gigahertz) signals operating at very high frequencies (e.g., 6 Ghz~100 Ghz such as 28 Ghz, V band, E band, etc.), which are commonly referred to as millimeter-wave frequencies. The respective sets of wireless communication equipment 122 and 123 may each comprise a baseband/digital unit equipped with components including but not limited to a processor, memory, etc. The respective sets of wireless communication equipment 122 and 123 may also comprise an RF unit and antenna unit for establishing at least one ptp link with another wireless communication node in the wireless mesh network. In at least some embodiments, the antenna subsystem of each respective set of wireless communication equipment 122 and 123 may be capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

For example, wireless communication equipment 121 residing at Tower/fiber access point 101 and wireless communication equipment 122 residing at seed home 111 may work together to form a bi-directional high-bandwidth communication ptp data link 141 that provides connectivity between Tower/fiber access point 101 and seed home 111. Similarly, wireless communication equipment 124 residing at Tower/fiber access point 102 and wireless communication equipment 123 residing at seed home 115 may work together to form a bi-directional high-bandwidth communication ptp data link 142 that provides connectivity between Tower/fiber access point 102 and seed home 115.

As further shown in FIG. 1, seed homes 111 and 115, in addition to wireless communication equipment 122 and 123, may also host respective, second sets of wireless communication equipment 131 and 135 for establishing ptp and/or ptmp links with a next tier of wireless communication nodes in the wireless mesh network (which, as noted below, may be referred to as "anchor nodes" of the wireless mesh network). In the example of FIG. 1, the respective, second sets of wireless communication equipment 131 and 135 may each comprise multiple independent transmission/reception submodules for establishing multiple ptp and/or ptmp links, which may also be referred to as "radio modules." However, it should be understood that the respective, second sets of wireless communication equipment 131 and 135 could also each comprise a single radio module for establishing a single ptp or ptmp link, as opposed to multiple radio modules.

Each module of the respective, second sets of wireless communication equipment 131 and 135 is capable of reception and transmission of high bandwidth (multiple gigahertz) signals operating at very high frequencies (e.g., 6 Ghz~100 Ghz such as 28 Ghz, V band, E band, etc.), which as noted above are commonly referred to as millimeter-wave frequencies. Each module of the respective, second sets of wireless communication equipment 131 and 135 comprises an independent baseband/digital unit equipped with components including but not limited to a processor, memory, etc. Each module in the respective, second sets of wireless communication equipment 131 and 135 also comprises an independent RF unit and independent antenna unit for establishing at least one ptp link or ptmp link with another wireless communication node (or perhaps multiple other wireless communication nodes) in the wireless mesh network. In at least some embodiments, the antenna subsystem of one or more modules of the second set of wireless communication equipment 131 may be a ptp antenna unit that is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees. However, in other embodiments, the antenna subsystem of one or more modules of the second set of wireless communication equipment 131 may be a ptmp antenna unit that is capable of beamforming and creating multiple beams simultaneously in different directions. As described in further detail below, the second set of wireless communication equipment 131 may take various other forms as well.

Communication system 100 also includes multiple anchor homes 112, 113 and 114. As with seed homes 111 and 115, anchor homes 112, 113 and 114 may include detached single-family homes, non-detached residential buildings such as MDUs, commercial buildings such as SMBs, or some other private property or infrastructure, where wireless communication equipment can be deployed on rooftops of such anchor homes among other possibilities. (In this respect, it will be appreciated that an "anchor home" need not necessarily be a residential home.) Further, as with seed homes 111 and 115, anchor homes 112, 113 and 114 may host respective wireless communication equipment that enables anchor homes 112, 113 and 114 to operate as wireless communication nodes of a wireless mesh network. However, unlike seed homes 111 and 115, anchor homes are generally not installed with wireless communication equipment that provides a direct wireless connectivity to any Tower/Fiber access point. Instead, anchor homes 112, 113 and 114 are typically only installed with wireless communication equipment for establishing ptp and/or ptmp links with seed nodes and/or with other wireless communication nodes in the same tier of the wireless mesh network, where such wireless communication equipment may be similar to the respective, second sets of wireless communication equipment 131 and 135 for establishing ptp and/or ptmp links that is installed at each of the seed homes 111 and 115. The anchor homes 112, 113 and 114 that are installed with the respective wireless communication equipment for operating as wireless mesh nodes may each be referred to herein as an "anchor node" of the wireless mesh network shown in FIG. 1.

For example, anchor home 112 hosts wireless communication equipment 132. A first module of wireless communication equipment 132 residing at anchor home 112 and another module of wireless communication equipment 131 residing at seed home 111 may work together to form a bi-directional high bandwidth communication ptp data link 151 that provides wireless connectivity between seed home 111 and anchor home 112. Similarly, as another example, a second module of wireless communication equipment 132 residing at anchor home 112 and a module of wireless communication equipment 133 residing at anchor home 113 may work together to form a bi-directional high bandwidth communication ptp data link 153 that provides wireless connectivity between anchor home 112 and anchor home 113. As yet another example, a third module of wireless communication equipment 132 residing at anchor home 112 and a module of wireless communication equipment 135 residing at seed home 115 may work together to form a bi-directional high bandwidth communication ptp data link 154 that provides wireless connectivity between anchor home 112 and seed home 115. As a further example, another module of wireless communication equipment 131 residing at seed home 111 and a module of wireless communication equipment 134 residing at anchor home 114 work together to form a bi-directional high bandwidth communication ptp data link 152 that provides wireless connectivity between anchor home 114 and seed home 111. As still another example, another module of wireless communication equipment 134 residing at anchor home 114 and a module of wireless communication equipment 135 residing at seed home 115 may work together to form a bi-directional high bandwidth communication ptp data link 155 that provides wireless connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1 G, 2 G, 3 G, 4 G, 5 G and 6 G, etc. Further, in at least some embodiments, bi-directional communication links 141, 142, 151, 152, 153, 154 & 155 may each comprise a millimeter-wave link. Further yet, bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional ptp data links 141, 142, 151, 152, 153, 154 & 155 are shown to illustrate an example of a communication system that is based on the wireless mesh network technologies disclosed herein. However, in general, it should be understood that communication system 100 can include a different number of Tower/fiber PoP nodes, seed nodes, anchor nodes, and/or communication links, which may depend on the specific layout of a particular instantiation of the communication system deployed in the field. Similarly, although, FIG. 1 shows a particular arrangement of communication equipment 121, 122, 123 & 124 that provides connectivity between a Tower/fiber access point (e.g., Tower/fiber access points 101, 102) and a seed home, as well as a particular arrangement of communication equipment 131, 132, 133, 134 & 135 that provides connectivity between two anchor homes or between an anchor and a seed home, the wireless communication equipment that is installed at the nodes of a wireless mesh network can vary from one communication system to another communication system, which may depend on the specific size and layout of a particular instantiation of the communication system. It should also be understood that communication system 100 may also contain other nodes (e.g., network switches/routers, etc.) that are omitted here for the sake of simplicity.

In line with the discussion above, communication system 100 of FIG. 1 may be utilized to provide any of various types of services to end users, including but not limited to telecommunication services such as high-speed interne. In this respect, it should be understood that one pool of end users of the service(s) provided by communication system 100 may be individuals that reside (or work) at the seed homes and anchor homes of FIG. 1. Additionally, although not shown in FIG. 1, it should be understood that communication system of FIG. 1 may also include client nodes that connect to certain nodes of the communication system (e.g., anchor nodes) via wireless ptp or ptmp links so as to enable other end users to receive the service(s) provided by communication system 100. These client nodes may take various forms, examples of which may include fixed-location customer premise equipment (CPE) and mobile computing devices, among other possibilities.

Figure 2:
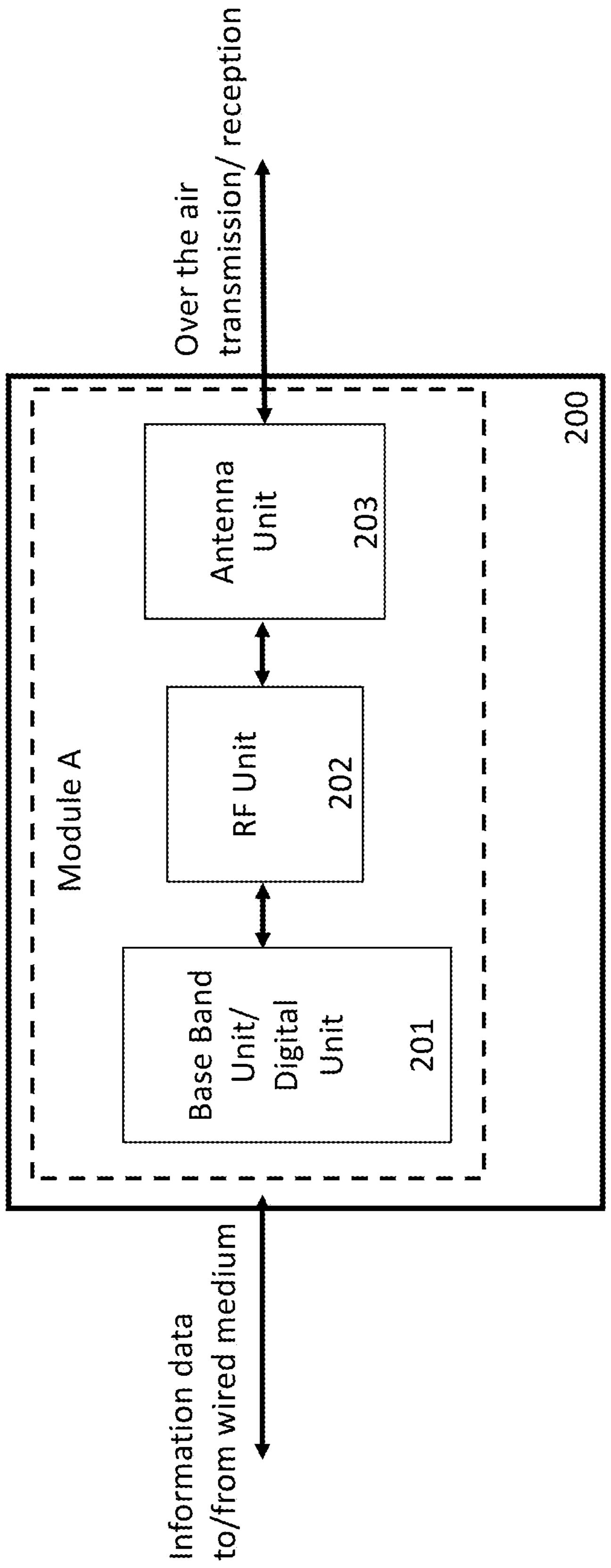
FIG. 2 depicts one possible example of a wireless communication node comprising a Module A type of radio module, in accordance with the present disclosure.

Referring to FIG. 2, one possible example of a wireless communication node of FIG. 1 is shown as a wireless communication node 200 installed with wireless communication equipment that comprises a module labelled as "Module A," which is one type of ptp radio module. As shown, Module A comprises a base band unit or digital unit 201 which runs the physical layer level protocol including digital modulation/demodulation (modem) and other higher layer protocols such as a MAC layer, etc. Base band unit 201 interacts with other nodes of a communication system that are external to the node at which the wireless communication equipment 200 is installed via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing ptp links with a different module residing at a different node of the communication system.

Figure 3:
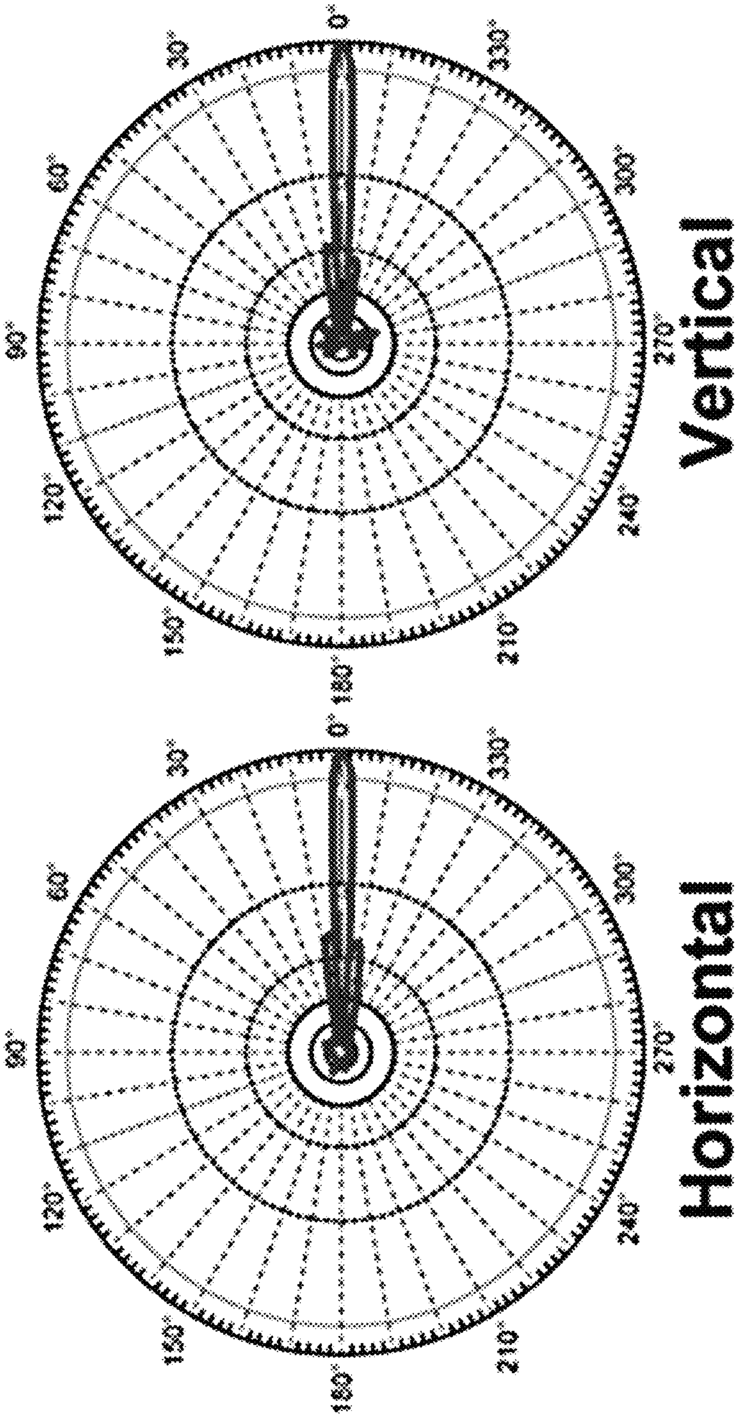
FIG. 3 depicts an example antenna pattern of a Module A type of radio module, in accordance with the present disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to a change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
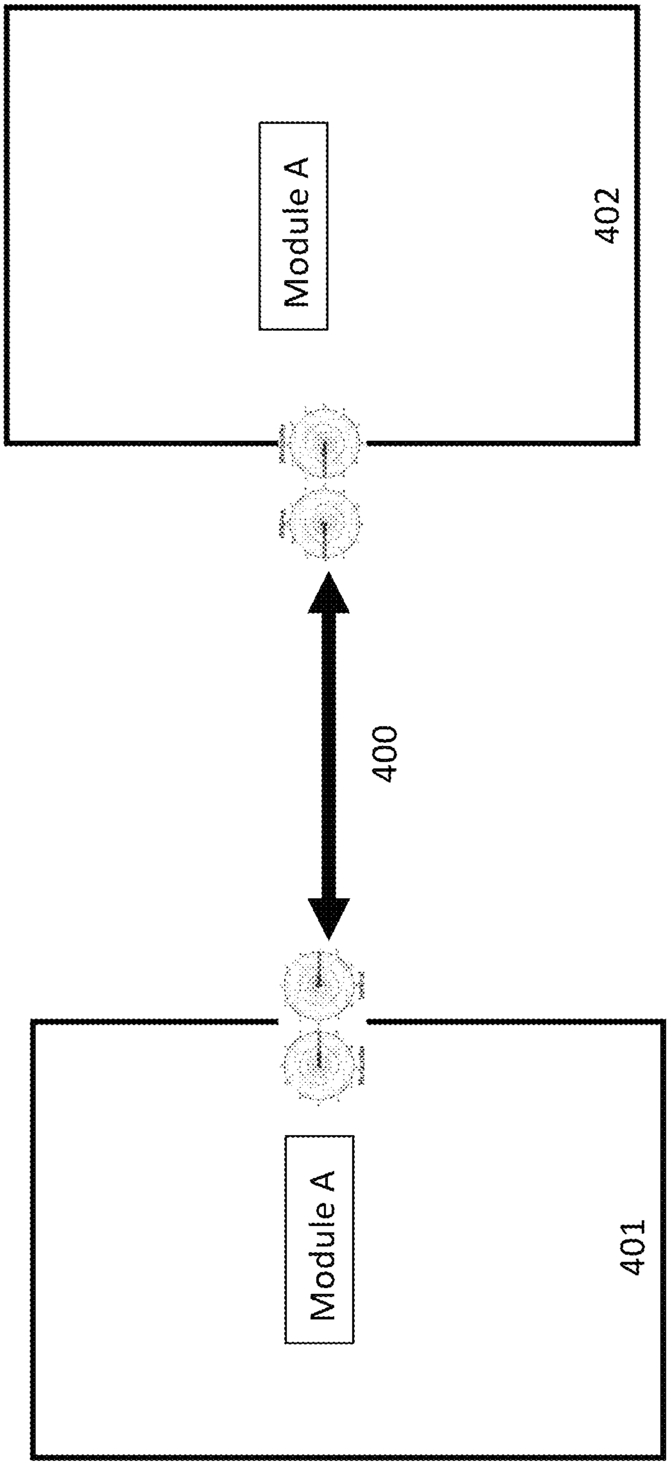
FIG. 4 depicts an example of a point-to-point communication link established between two wireless communication nodes, in accordance with the present disclosure.

Referring to FIG. 4, a ptp wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of each respective Module A in the wireless communication nodes 401 and 402, the bi-directional ptp link 400 may have an extremely narrow beam. This transmission and reception capability of radio signals over an extremely narrow beam via ptp link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
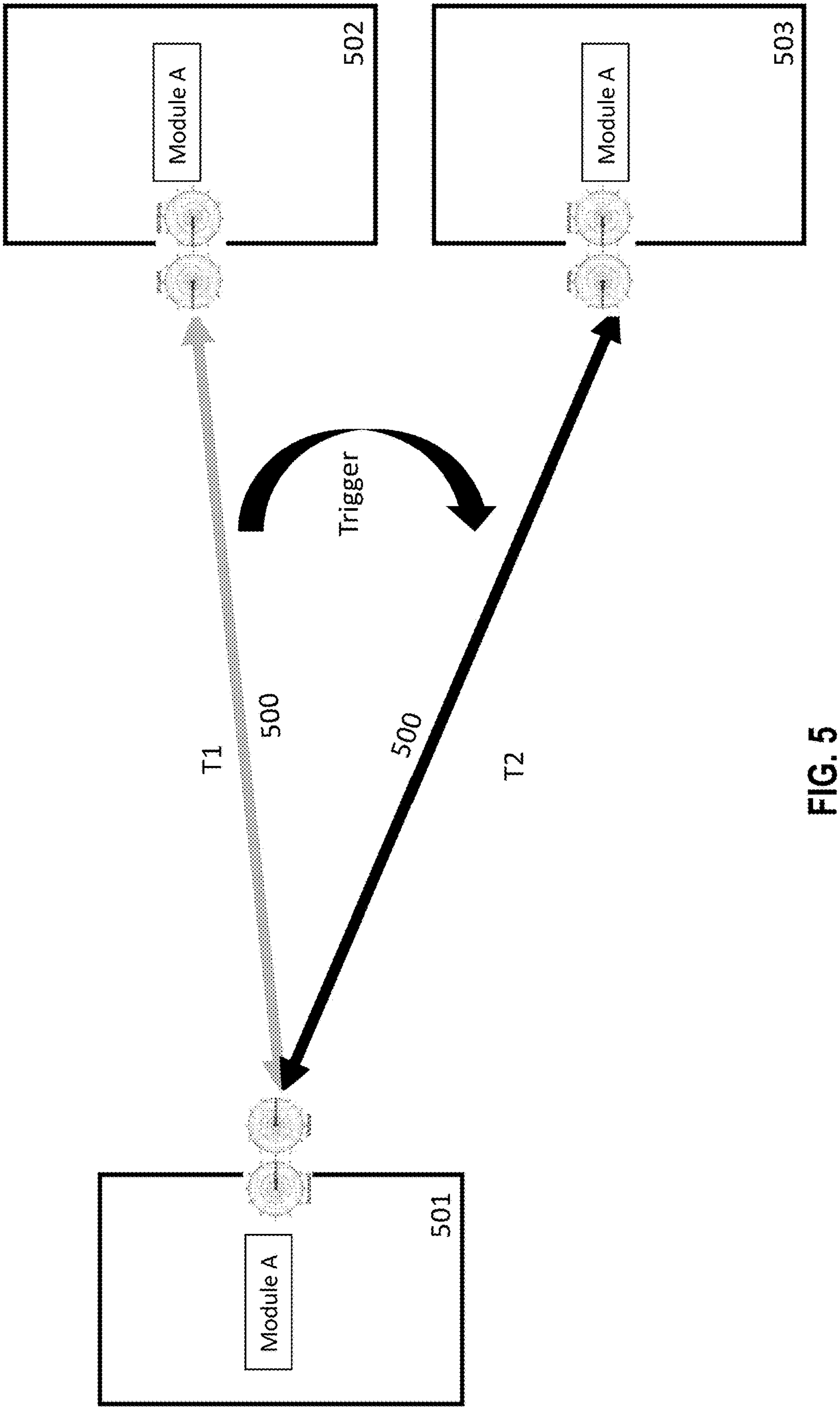
FIG. 5 depicts an example of a wireless communication node invoking beam steering, in accordance with the present disclosure.

For example, referring to FIG. 5, a wireless communication node 501 comprising Module A, a second wireless communication node 502 comprising Module A, and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502, which may involve various factors, including but not limited to, a change from a LOS path to a non-LOS path due to a change in environment, increased interference, a change in a position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple other wireless communication nodes of the communication system by establishing multiple extremely narrow beam bi-directional links with the help of multiple modules (e.g., multiple Module As) belonging to different wireless communication nodes working together.

Figure 6:
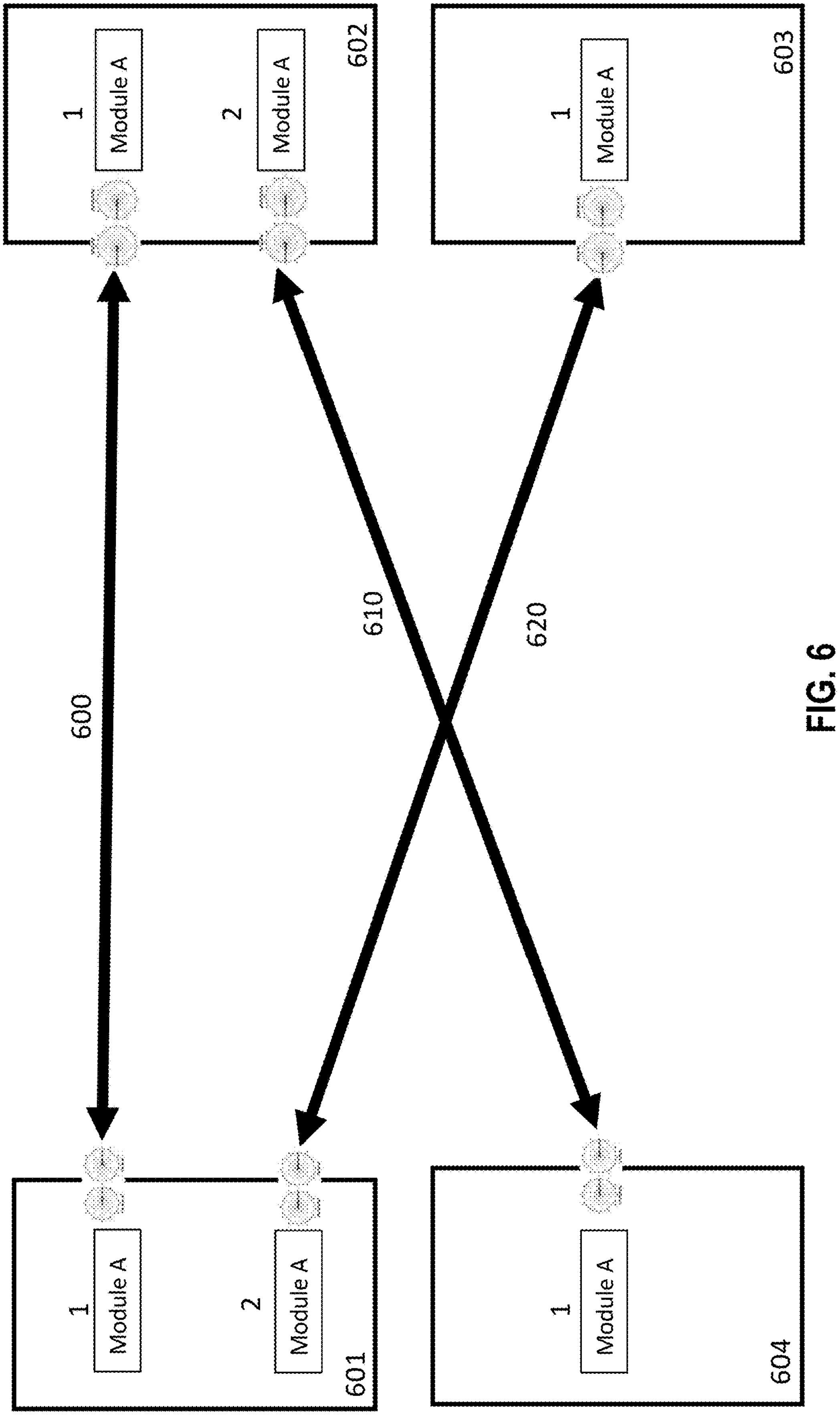
FIG. 6 depicts an example of an arrangement in which certain wireless communication nodes are communicating with multiple other wireless communication nodes, in accordance with the present disclosure.

As one example to illustrate, referring to FIG. 6, wireless communication nodes 601 and 602 each host two Module As labeled "1" and "2," while wireless communication nodes 603 and 604 each host a single Module A. As shown, a Pt Module A of wireless communication node 601 and a $1^{st}$ Module A of wireless communication node 602 work together to establish extremely narrow bi-directional beam-based link 600 to provide a wireless connection between wireless communication node 601 and 602. Similarly, a $2^{nd}$ Module A of wireless communication node 601 and 602 and a $1^{st}$ (and only) Module A of wireless communication nodes 603 and 604 respectively work together to establish extremely narrow bi-directional beam-based links 610 and 620 to provide wireless connections between wireless communication nodes 601-603 and 602-604, respectively.

In one embodiment, the $1^{st}$ and $2^{nd}$ Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
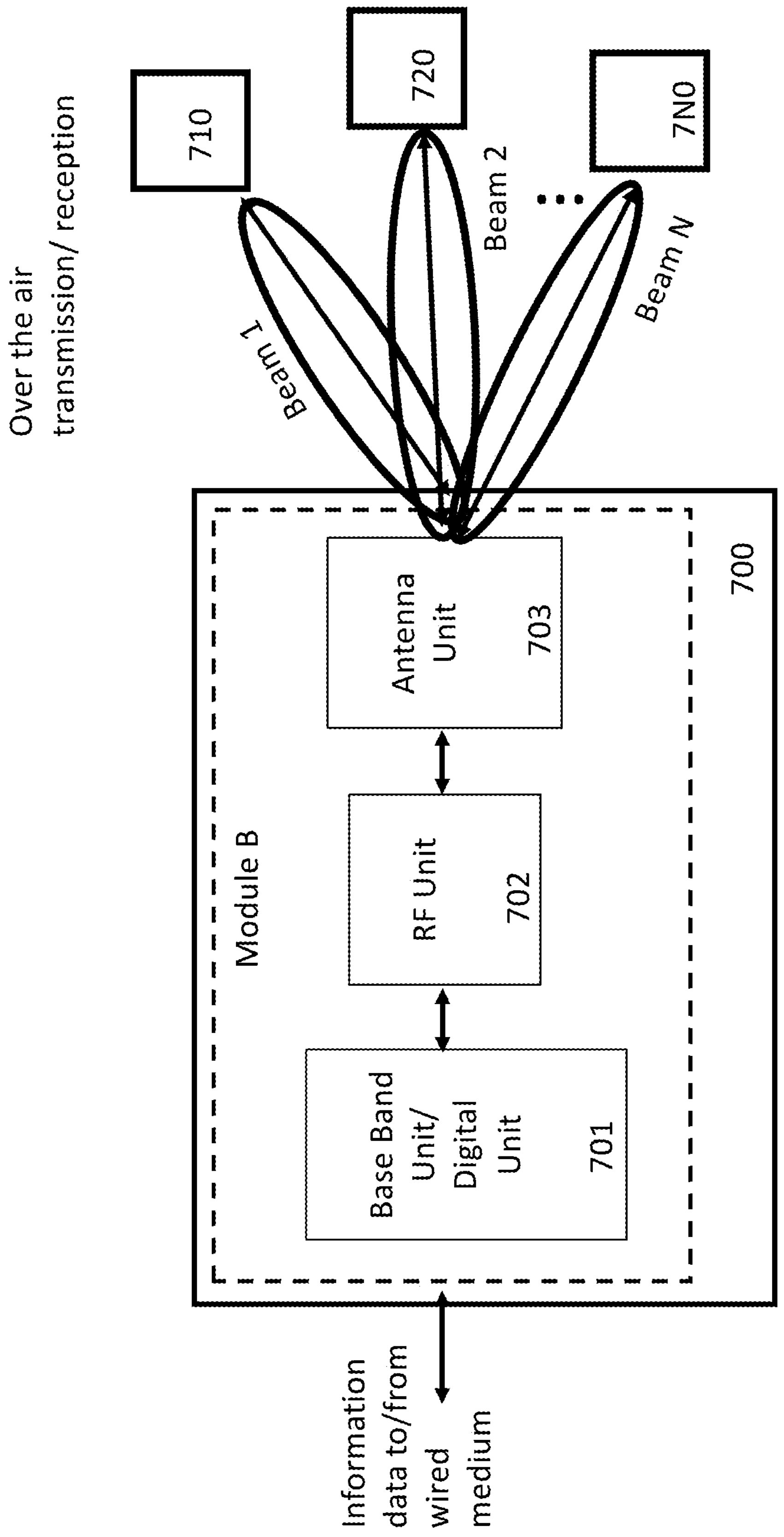
FIG. 7 depicts another possible example of a wireless communication node comprising a Module B type of radio module, in accordance with the present disclosure.

Referring to FIG. 7, another possible example of a wireless communication node of FIG. 1 is shown as a wireless communication node 700 installed with wireless communication equipment that comprises a single module labeled as "Module B," which is one type of ptmp radio module. For purposes of illustration only, wireless communication node 700 of FIG. 7 is shown to be engaging in over-the-air transmission and/or reception with multiple other wireless communication nodes 710 to 7N0.

Module B comprises base band unit or digital unit 701 which runs the physical layer level protocol including digital modulation/demodulation (modem) and other higher layer protocols such as a MAC layer, etc. Base band unit 701 interacts with other nodes of a communication system that are external to the node at which the wireless communication node 700 is installed via wired medium.

Module B also includes RF unit 702, which among other things processes IF signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish ptmp wireless communication links with multiple wireless communication nodes. Hence Module B with the help of antenna unit 703 is capable of establishing ptmp links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of the ptmp beams of antenna unit 703 of Module B are not extremely narrow (e.g., 3 dB beam width of 7~10 degree) and side lobes power levels do not start to drop at a rapid rate, which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) in that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N−1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such a ptmp arrangement is inferior to an interference profile of an arrangement where a wireless communication node hosts multiple Module As and creates multiple ptp links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple ptp narrow beams of wireless communication node that host multiple Module As.

Figure 8:
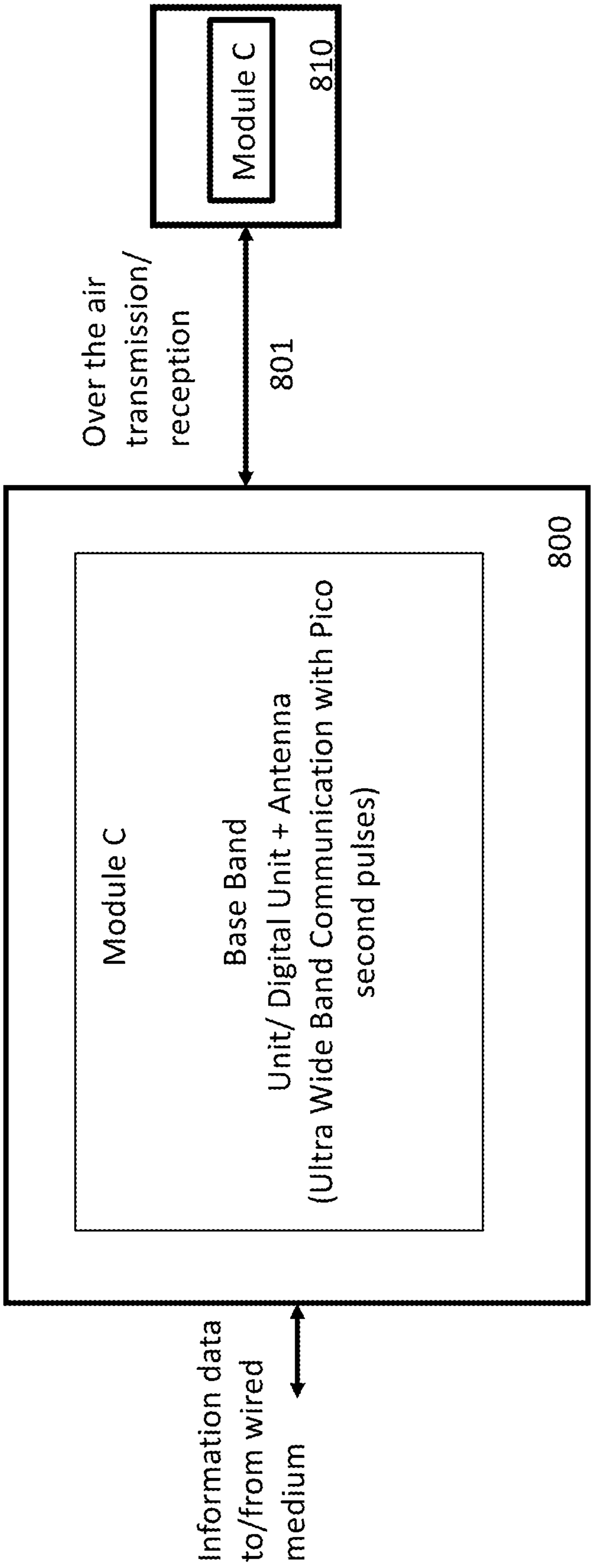
FIG. 8. depicts yet another possible example of a wireless communication node comprising a Module C type of radio module, in accordance with the present disclosure.

Referring to FIG. 8, still another possible example of a wireless communication node of FIG. 1 is shown as a wireless communication node 800 installed with wireless communication equipment that comprises a module labeled as "Module C," which is another type of ptp radio module. For purposes of illustration only, wireless communication node 800 of FIG. 8 is shown to be engaging in over-the-air transmission and/or reception with another wireless communication node 810 that is also hosting a Module C type of ptp radio module.

Module C comprises a base band unit or digital unit which runs the physical layer level protocol including digital modulation/demodulation (modem) and other higher layer protocols such as MAC layer etc. Module C's baseband unit interacts with other nodes of a communication system that are external to the wireless communication node 800 via wired medium.

Module C also includes an ultra-wide band antenna embedded with the baseband unit. Module C is capable of generation, transmission, and reception of extremely short duration pulses (a few picoseconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1-, 2-, or 3-dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, network performance is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another embodiment, and in line with the discussion above, a wireless communication node of FIG. 1 can host multiple types of modules. This allows a wireless communication node to communicate simultaneously with multiple wireless communication nodes and with two different interference profiles.

Figure 9:
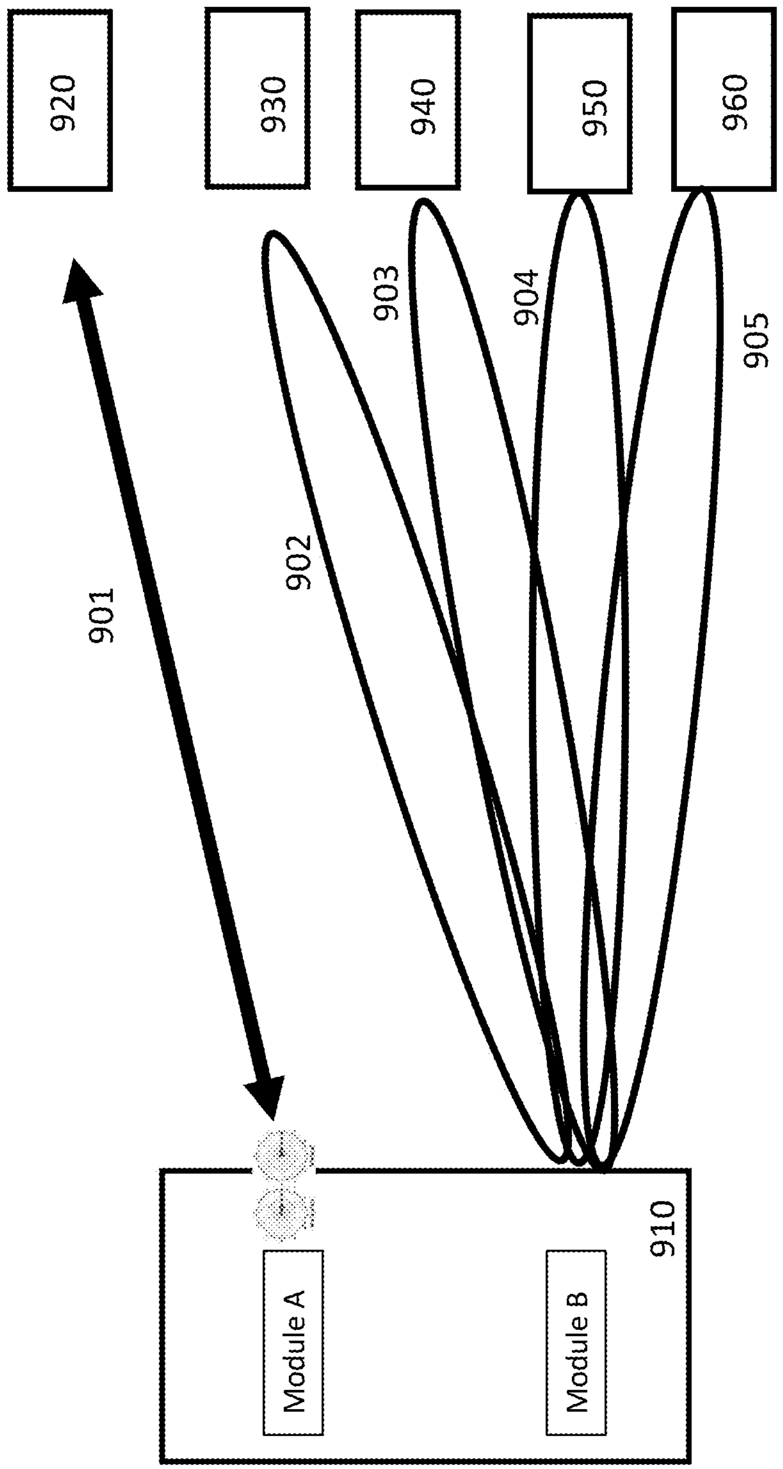
FIG. 9 depicts an example of a wireless communication node comprising Module A and Module C types of radio modules, in accordance with the present disclosure.

As one example to illustrate, referring to FIG. 9, an example wireless communication node 910 is shown that hosts one Module A and one Module B. As shown in FIG. 9, Module A of wireless communication node 910 and a communication module of an example wireless communication node 920 may work together to establish an extremely narrow bi-directional beam-based link 901 to provide wireless connection between wireless communication nodes 910 and 920. Additionally, Module B of wireless communication node 910, which is based on AAS and generates multiple beams simultaneously, may create a ptmp link that connects wireless communication node 910 with example wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a total of two modules (i.e., a single Module A and a single Module B) are shown to be part of a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on various factors, including but not limited to the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, a wireless communication node of FIG. 1 can host more than one type of module. This allows a wireless communication node to communicate simultaneously with multiple wireless communication nodes and with different interference profiles.

Figure 10:
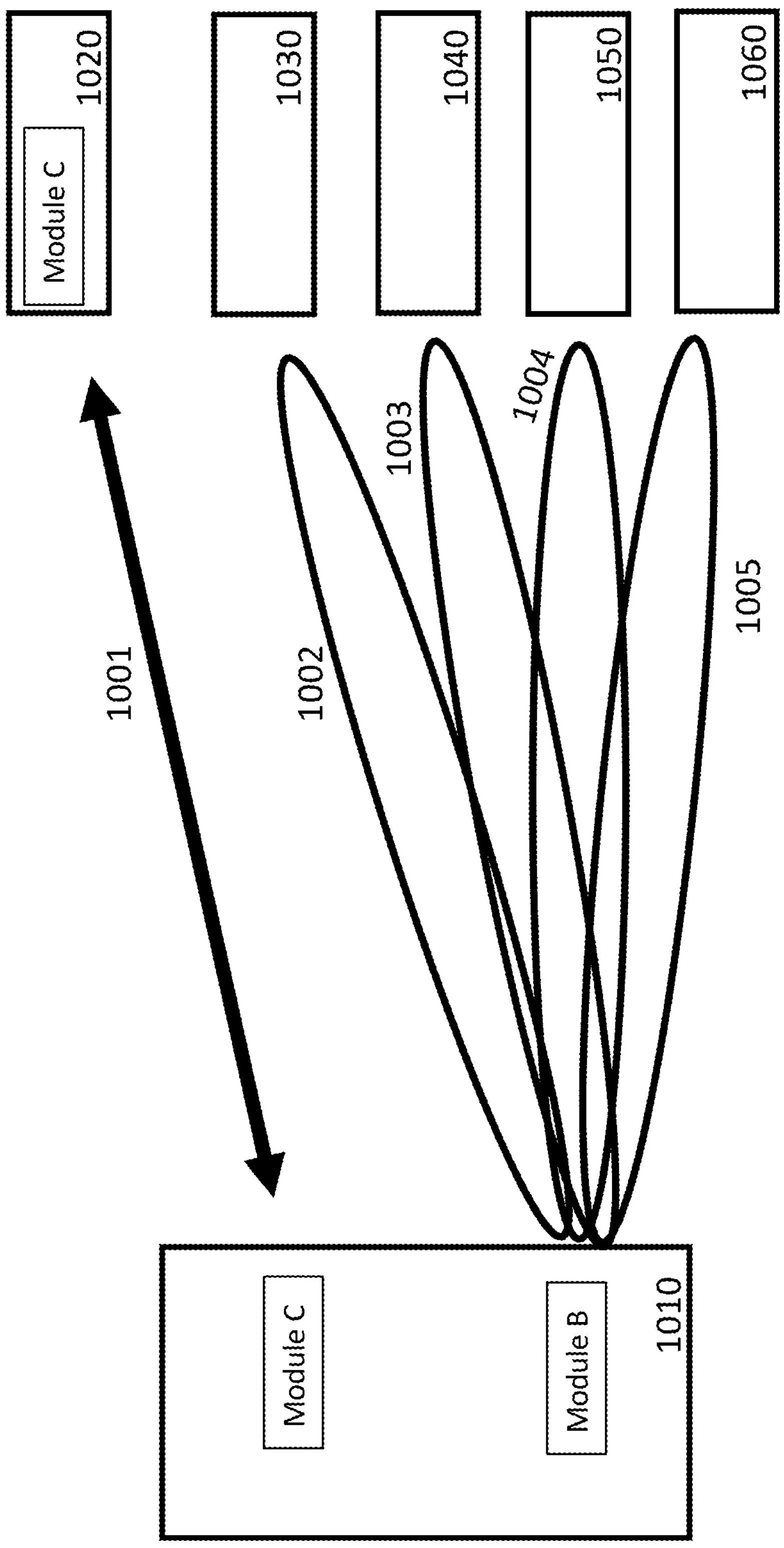
FIG. 10 depicts an example of a wireless communication node comprising Module B and Module C types of radio modules, in accordance with the present disclosure.

As another example to illustrate, referring to FIG. 10, an example wireless communication node 1010 is shown that hosts one Module C and one Module B. As shown in FIG. 10, Module C of wireless communication node 1010 and Module C of an example wireless communication node 1020 may work together to establish extremely high data rate ultra-wide frequency and low power spectral density beam-based link 1001 to provide wireless connection between wireless communication nodes 1010 and 1020. Additionally, Module B of wireless communication node 1010, which is based on AAS and generates multiple beams simultaneously, may create a ptmp link that connects wireless communication node 1010 with example wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a total of two modules (i.e., a single Module C and a single Module B) are shown to be part of a wireless communication node 1010 that enables the wireless communication node to establish two independent and different types of bi-directional links with different wireless communication nodes simultaneously. However, it should be understood that wireless communication node 1010 can host more than two types of modules (e.g., a combination of Module A, Module B and/or Module C) and the maximum number of total modules that a wireless communication node can host may depend on various factors, including the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another embodiment, a wireless communication node of FIG. 1 can host more than one type of module and dynamically change the type of link between wireless communication nodes. This allows a wireless communication node to communicate simultaneously with multiple wireless communication nodes and with different interference profiles and to adapt with changes in the network environment.

Figure 11A:
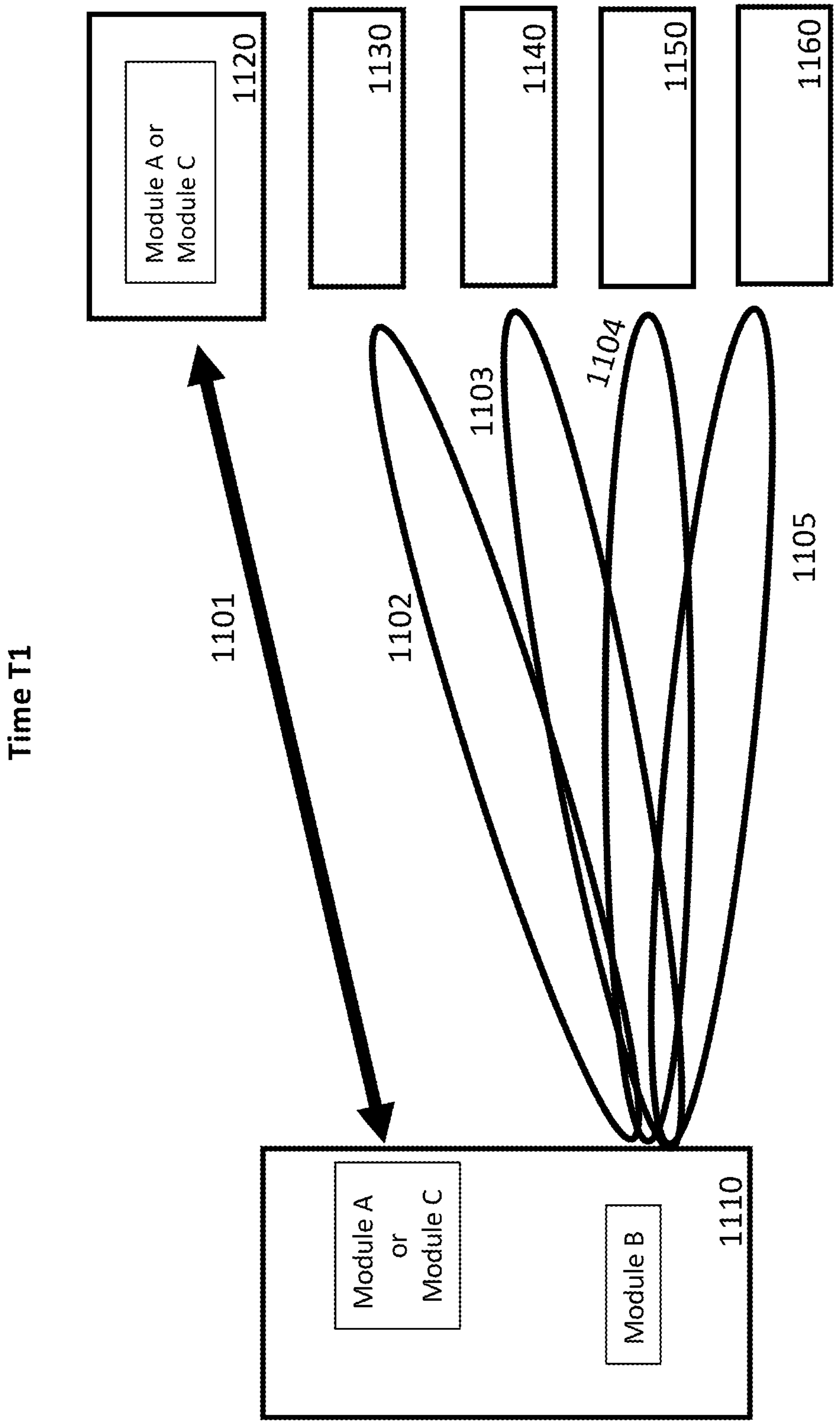
FIG. 11A depicts an example of a wireless communication node communicating with multiple other wireless communication nodes at a first time, in accordance with the present disclosure.

As one example to illustrate, referring to FIG. 11A, an example wireless communication node 1110 is shown that hosts a Module C or Module A along with a Module B. During time T1, Module A/Module C of wireless communication node 1110 and a communication module of an example wireless communication node 1120 may work together to establish either an extremely high date rate ultra-wide frequency low power spectral density beam or an extremely narrow beam-based link 1101 to provide a wireless connection between wireless communication nodes 1110 and 1120. At substantially the same time duration T1, Module B of wireless communication node 1110, which is based on AAS and generates multiple beams simultaneously, may create a ptmp link that connects wireless communication node 1110 with example wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3) a module of wireless communication node 1150 to establish bi-directional beam 1104, and (4) a module of wireless communication node 1160 to establish bi-directional beam 1105.

Figure 11B:
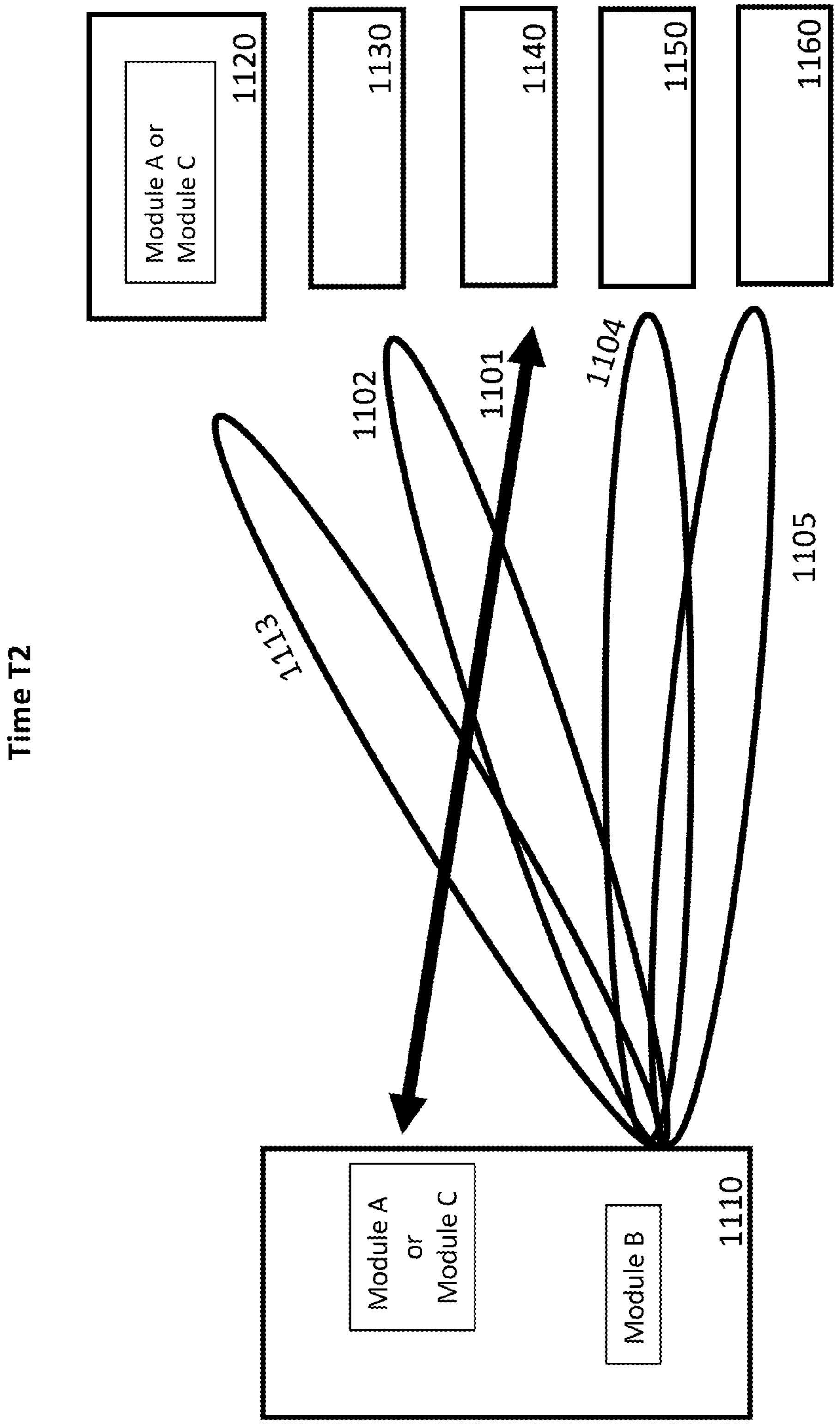
FIG. 11B depicts an example of a wireless communication node communicating with multiple other wireless communication nodes at a second time after the wireless communication node has engaged in beam steering to dynamically change its wireless connections, in accordance with the present disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes of FIG. 1 may leave the wireless mesh network. In such case, links between nodes may be dropped and the communication network may dynamically re-align itself by adjusting/switching link types between the remaining number of wireless communication nodes in the wireless mesh network to best suit the needs to the wireless communication nodes and the wireless mesh network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a ptp link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and 1160 can simultaneously create ptmp wireless communication links with other modules of wireless communication nodes in the communication system that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create ptmp wireless communication links with other modules of wireless communication nodes in the communication system that are not shown here.

As another example, one or more of wireless communication nodes 1120, 1130, 1140, 1150 and 1160 can host two Module As or Module Cs. Hence, when wireless communication node 1110 makes a ptp link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create ptp wireless communication links with other modules of wireless communication nodes in the communication system that are not shown here. Similarly, when wireless communication node 1110 makes a ptmp links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create ptp wireless communication links with other modules of wireless communication nodes in the communication system that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a ptp link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create ptp wireless communication links with a third communication module (e.g., Module B) of wireless communication nodes 1120, 1130, 1140, 1150 and 1160 can simultaneously create ptmp wireless communication links with other modules of wireless communication nodes in the wireless mesh network that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create ptp wireless communication links with other modules of wireless communication nodes in the mesh network that are not shown here and a third communication module (e.g., Module B) of wireless communication nodes 1120, 1130, 1140, 1150 and 1160 can simultaneously create ptmp wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a communication system that is based on the wireless mesh network technologies disclosed herein. Hence links established by Module A or Module C can act as a wireless backhaul for a communication system while links established with Module B can provide access to individual users of the communication system.

In one embodiment, an entire wireless mesh network can be composed of ptp links where both links providing backhaul and access have interference immunity. Although such links are more expensive due to the requirement of separate modules to establish individual links, such links are suitable when certain high service quality or reliability is required to be ensured for all end users of the service(s) delivered via the wireless mesh network.

Figure 12:
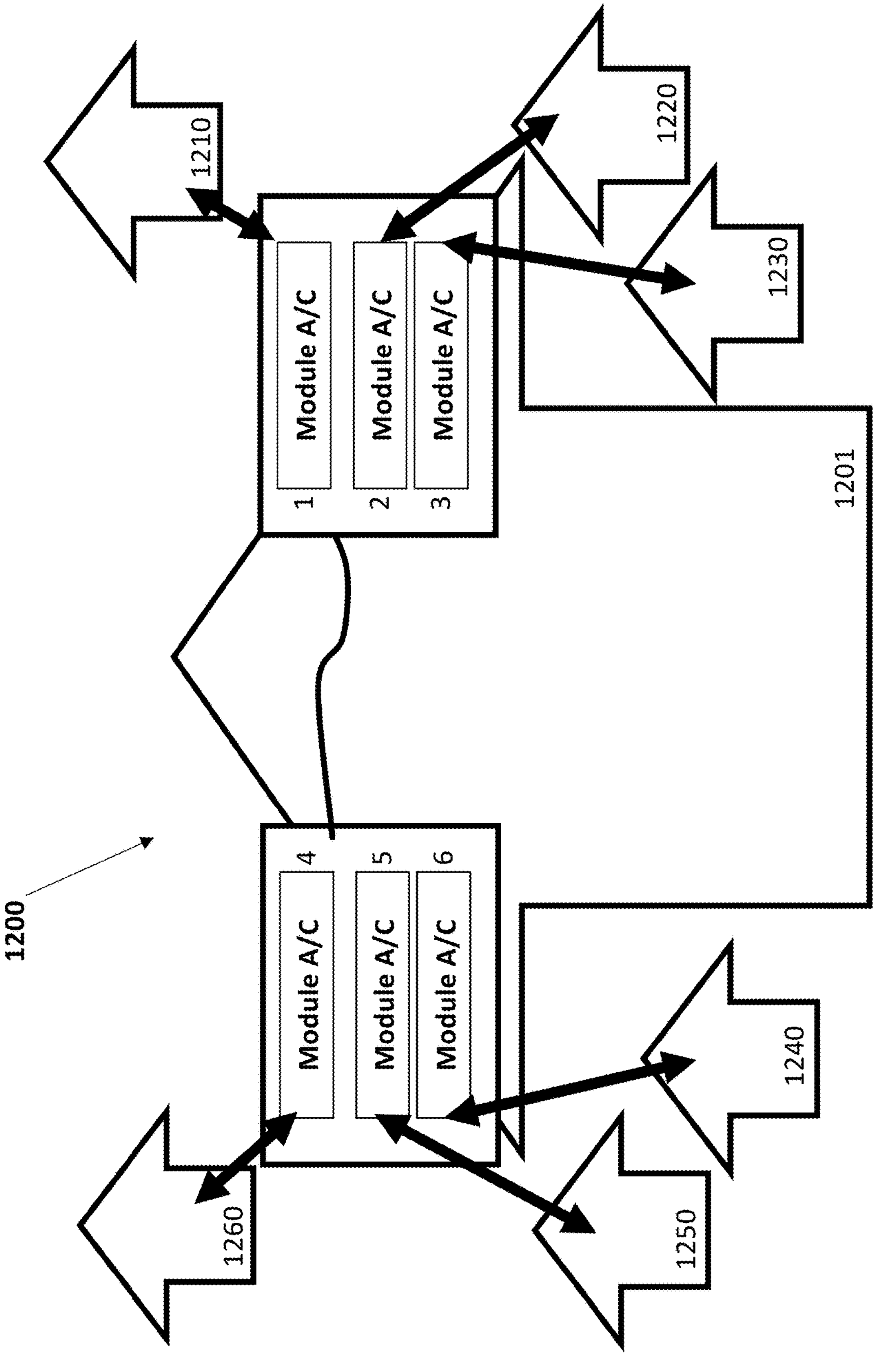
FIG. 12 depicts an example of a site at which at which a seed or an anchor node of a wireless mesh network has been deployed, in accordance with the present disclosure.

For example, FIG. 12 shows a site 1200 at which a seed or an anchor node of a wireless mesh network has been deployed. Site 1200 hosts a wireless communication node 1201 that includes a total of 6 communication modules that each take the form of a Module A or Module C type of ptp module. Hence wireless communication node 1201 is capable of establishing six ptp links. As shown, wireless communication node 1201 uses a $1^{st}$ and $4^{th}$ Module A/Module C to establish connections with site 1200 and site 1260 that serve as backhaul links, while wireless communication node 1201 uses a $2^{nd}$, $3^{rd}$, $5^{th}$ and $6^{th}$ Module A/Module C to establish ptp links with sites 1220, 1230, 1250 and 1240 to provide access links. In this respect, links between sites 1200 and 1220, sites 1200 and 1230, sites 1200 and 1240, and sites 1200 and 1250 only carry data for individual users, whereas links between sites 1200 and 1260 and sites 1200 and 1210 carry signaling and data for all the sites including 1200, 1210, 1220, 1230, 1240, 1250 and 1260.

In another embodiment, a wireless mesh network can be composed of combination of ptp links and ptmp links, where the ptp links generally serve as backhaul links for carrying aggregated mesh access traffic for the wireless mesh access network and the ptmp links generally serve as access links for carrying individual mesh access traffic to individual users. In this respect, the ptp links and ptmp links may be considered to define different "layers" (or "segments") of the wireless mesh access network. Although such a wireless mesh network does not necessarily provide interference immunity to all the end users of the service(s) delivered via the wireless mesh network due to presence of ptmp links, such a wireless mesh network is less expensive due to the non-requirement of separate modules to establish individual links and may also be better suited for adding client nodes that do not have predefined locations.

Figure 13:
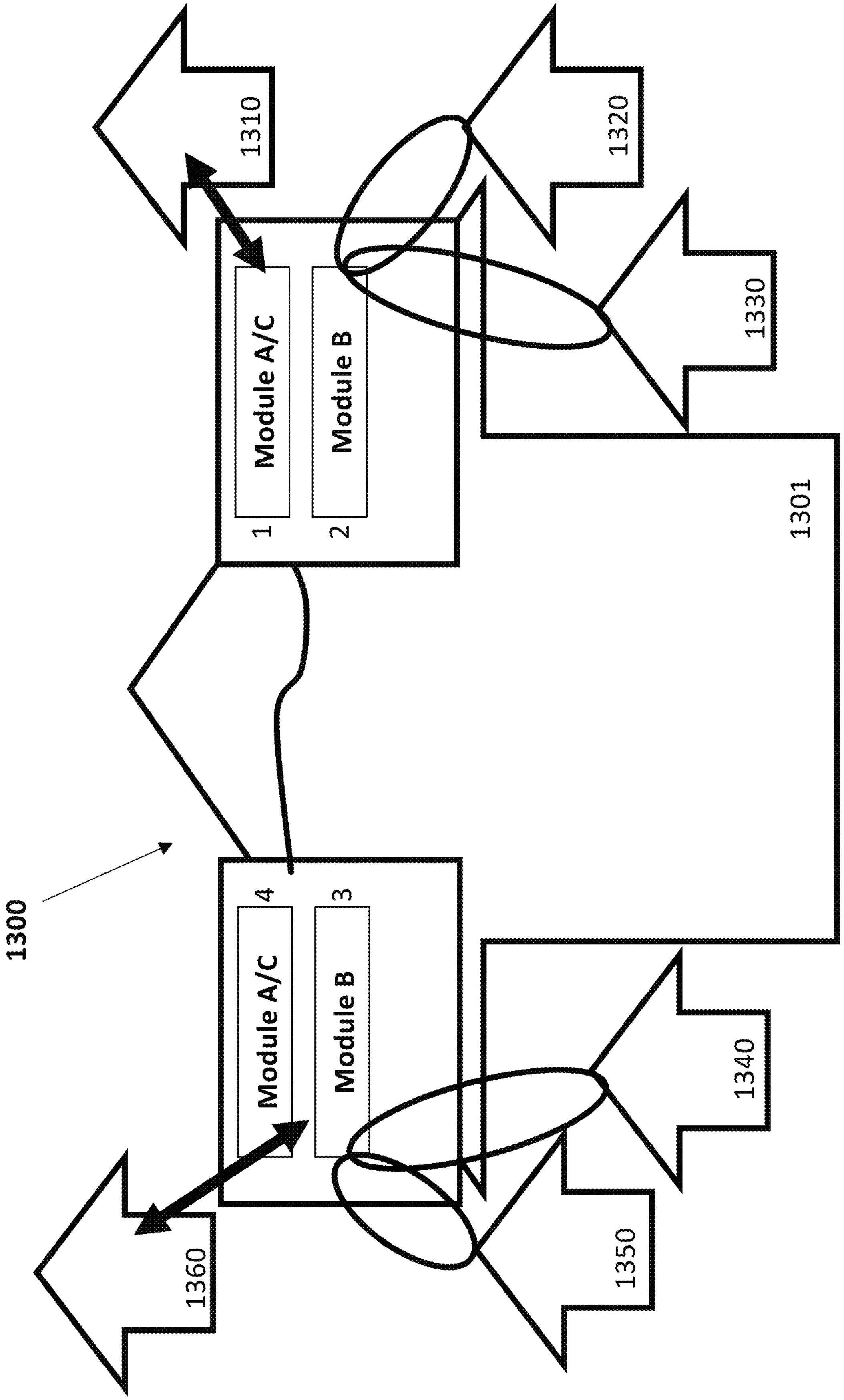
FIG. 13 depicts another example of a site at which at which a seed or an anchor node of a wireless mesh network has been deployed, in accordance with the present disclosure.

For example, FIG. 13 shows a site 1300 at which a seed or an anchor node of a wireless mesh network has been deployed. Site 1300 hosts a wireless communication node 1301 that includes a total of 4 communication modules, two of which take the form of ptp modules (e.g., Module A and/or Module C) and two of which take the form of ptmp modules (e.g., Module B). Hence this wireless communication node is capable of establishing two ptp links and two ptmp links. As shown, wireless communication node 1301 uses a $1^{st}$ and $4^{th}$ Module A/Module C to establish connections with site 1310 and site 1360 that serve as backhaul links, while wireless communication node 1301 uses a $2^{nd}$ Module B to establish ptmp links with sites 1320, 1330 and uses a $3^{rd}$ Module B to establish ptmp links with sites 1350 and 1340 to provide access links. In other words, links between sites 1300 and 1320, sites 1300 and 1330, sites 1300 and 1340 and sites 1300 and 1350 only carry data for individual users, whereas links between sites 1300 and 1360 and sites 1300 and 1310 carry signaling and data for all the sites including 1300, 1310, 1320, 1330, 1340, 1350 and 1360.

Figure 14:
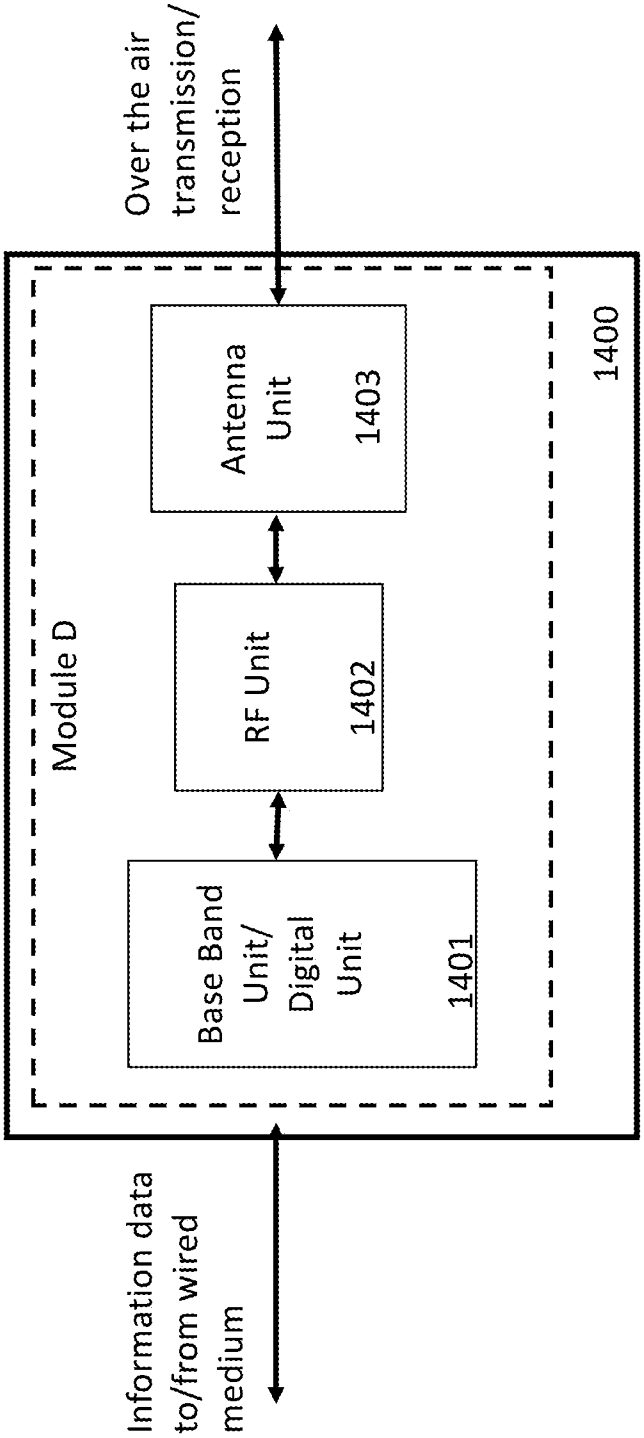
FIG. 14 depicts another example of wireless communication node comprising a Module D type of radio module, in accordance with the present disclosure.

Referring to FIG. 14, another possible example of a wireless communication node of FIG. 1 is shown as a wireless communication node 1400 installed with wireless communication equipment that comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication system that are external to the wireless communication node 1400 via wired medium.

Module D also includes RF unit 1402, which among other things processes IF signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing ptmp links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
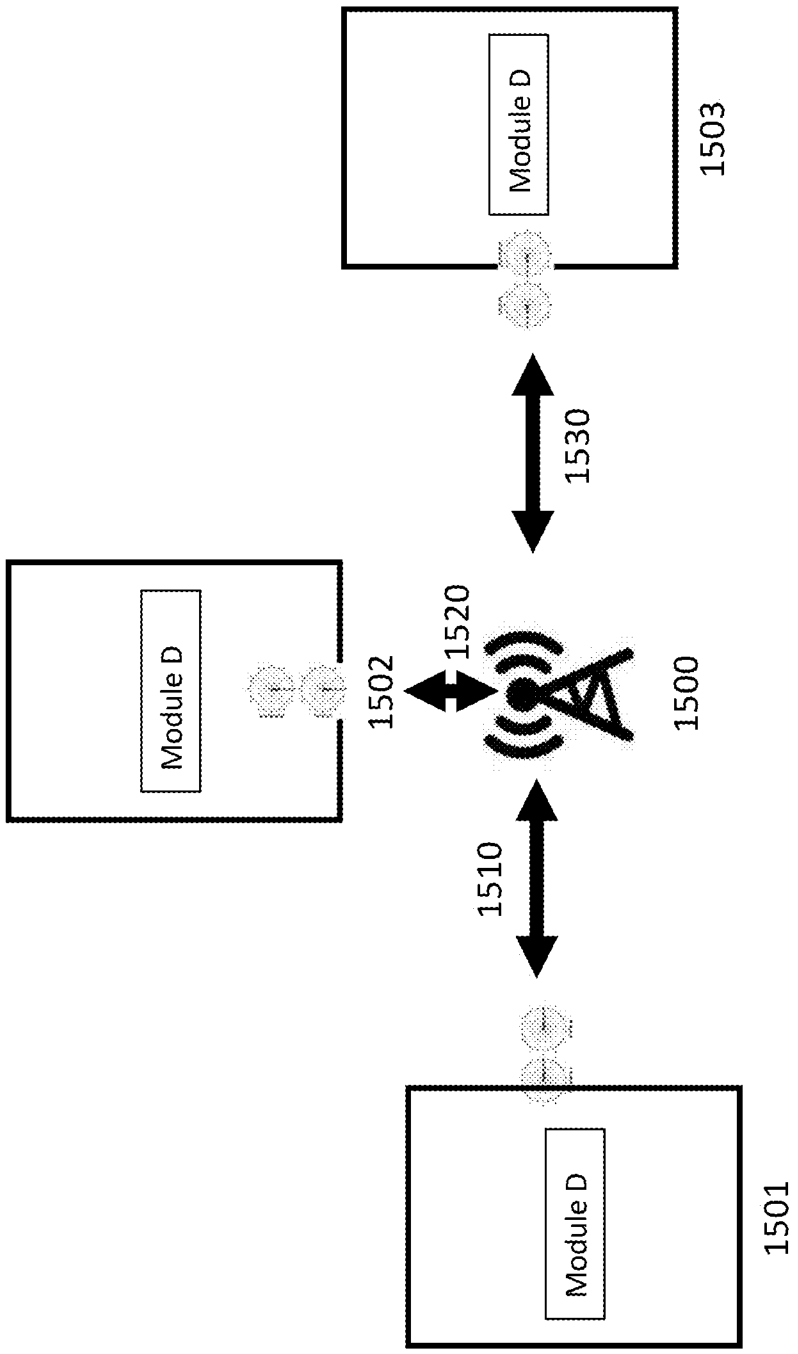
FIG. 15 depicts an example of multiple wireless communication nodes comprising a Module D type of radio modules connected to a tower, in accordance with the present disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the communication system, a given communication system can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, communication system 1600 of FIG. 16 includes a tower 1610 which is similar to tower 1500 described in the context of FIG. 15. In contrast to communication system 100 in FIG. 1, the wireless communication equipment 131, 132, 133, 134 and 135 at the seed and anchor nodes of the communication system may include an additional Module D besides Module A/Module B or Module C that enables these wireless communication nodes to optionally establish bi-directional links having the features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 16:
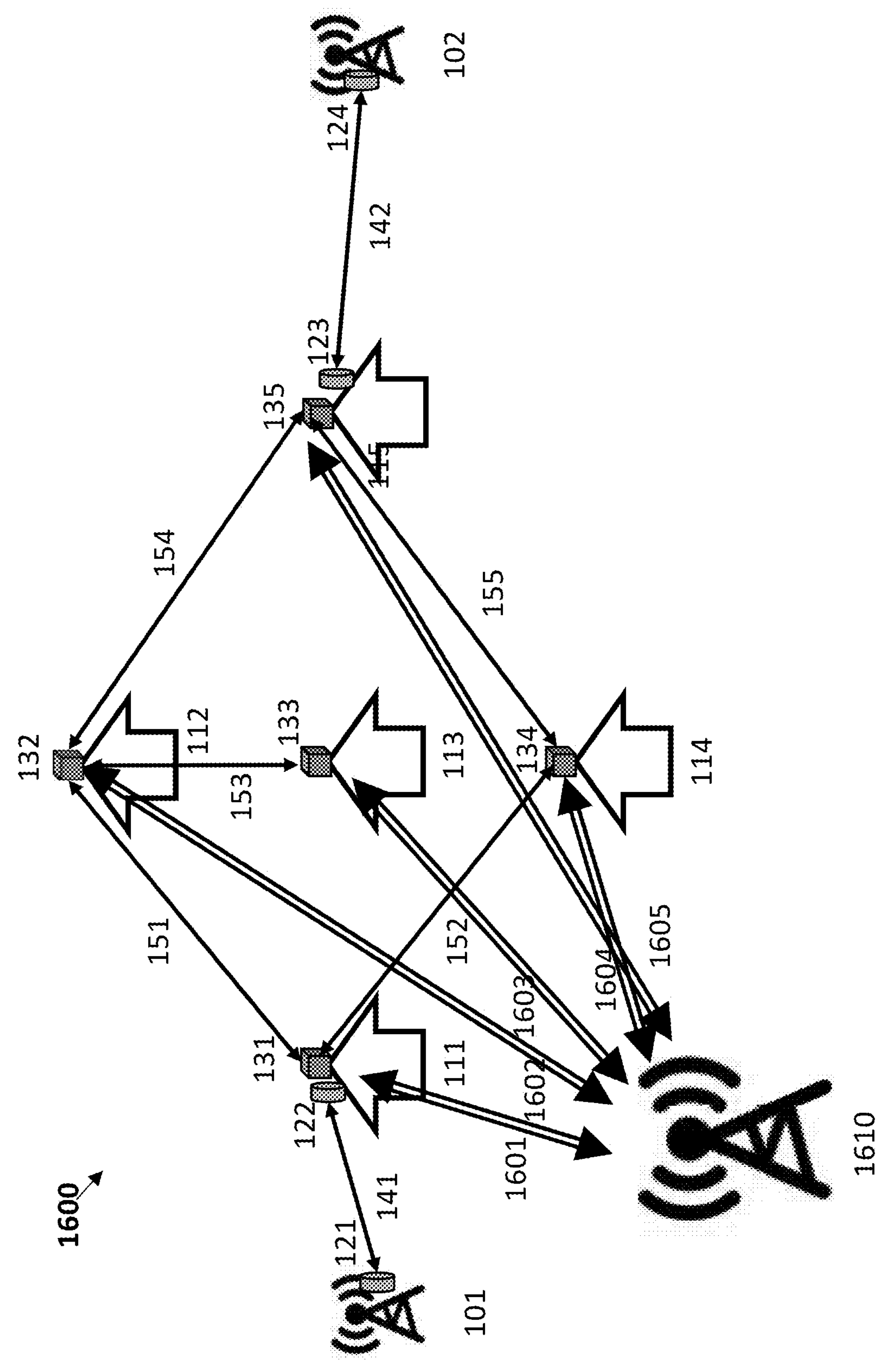
FIG. 16 depicts another example of a communication system that comprises a wireless mesh network, in accordance with the present disclosure.

In FIG. 16, only one tower (i.e., tower 1610) capable of massive MIMO ptmp communication is shown to be connected to the five wireless communication nodes of the communication system. However, it should be understood that a communication system can also have more than one tower, each connected to multiple different wireless communication nodes hosting various other modules.

In areas within tower 1500's (and other towers of same type) coverage area, a given communication system can initially start in a ptmp manner, where tower 1500 (and other towers of same type) provides access to individual customers using sub 6 Ghz massive MIMO ptmp beams. Later, nodes in the given communication system can opportunistically connect with other nodes using regular modules (e.g., Module A/Module B/Module C) in the presence of line-of-sight. This way, the given communication system may evolve to form a wireless mesh network with ptp and ptmp connections between nodes in addition to each communication node having a path directly (non-line-of-sight) to tower 1500 (and other towers of same type) that fall within the coverage area.

One of ordinary skill in the art will appreciate that a route a given packet takes from a source to a destination in this communication system may be optimized by considering various factors including latency, congestion, reliability etc. One of ordinary skill in the art will also appreciate that a given communication system can later add seed nodes (e.g., the seed nodes hosted at seed homes 111 and 115 in FIG. 1) along with tower/fiber access points 101 and 102 to provide alternate backhaul as per need basis.

In another embodiment, instead of providing massive MIMO ptmp networking capability using a terrestrial tower, ptmp massive MIMO capability to wireless communication nodes can also be provided by a satellite, such as a low earth orbit (LEO) satellite. For example, referring to FIG. 17, communication system 1700 is shown that is similar to communication system 100 and has all the components described in the context of FIG. 1. Additionally, communication system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS. 14-15 with satellite 1710 using massive MIMO beamforming capabilities. Such links labelled as 1701, 1702, 1703, 1704 and 1705 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 17:
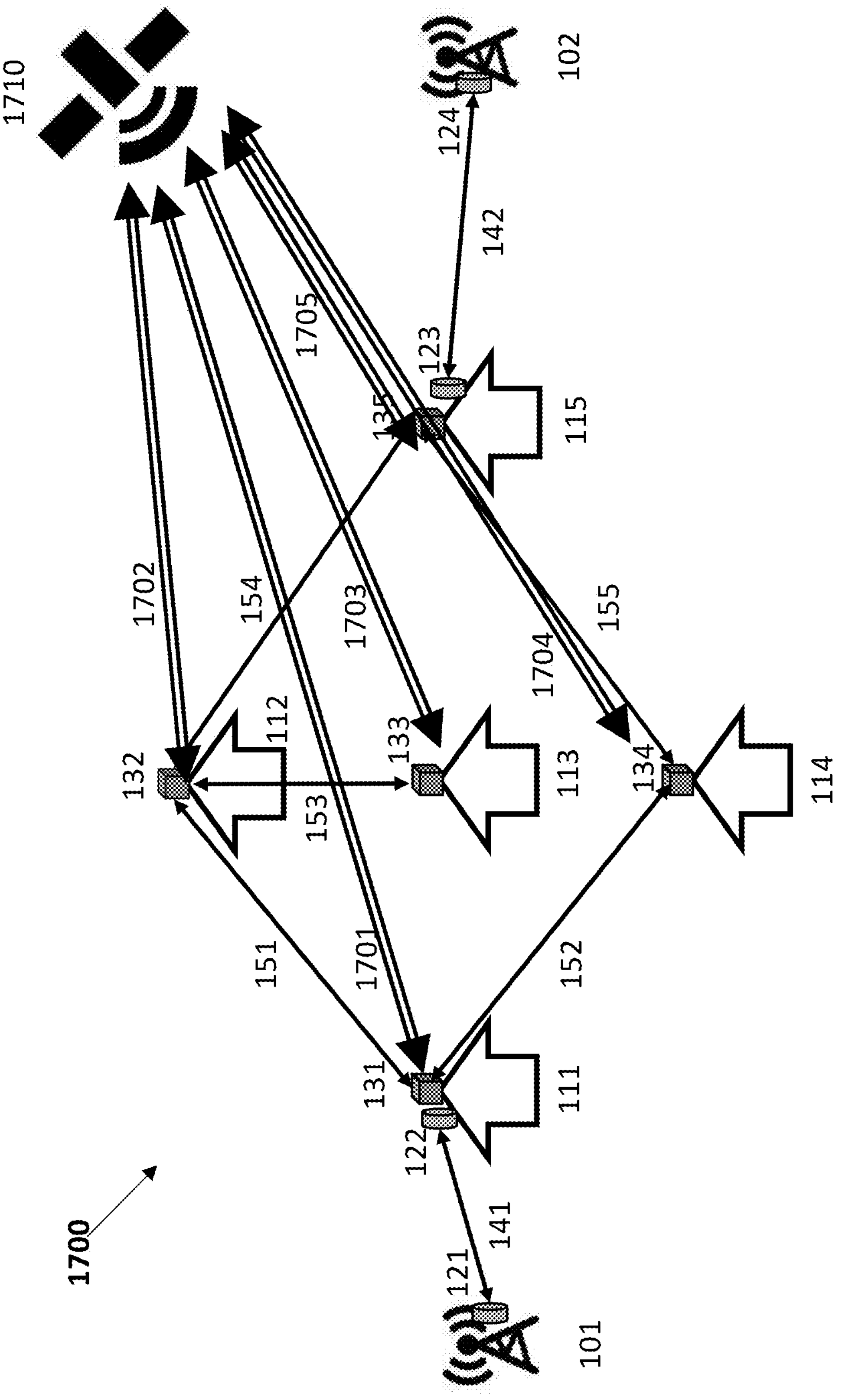
FIG. 17 depicts yet another example of a communication system that comprises a wireless mesh network, in accordance with the present disclosure.

In FIG. 17, only one satellite 1710 capable of massive MIMO ptmp communication is shown to be connected to the five wireless communication nodes of the communication system. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to transport backhaul data between an end user and a core network using multiple different types of communication links. For example, referring to FIG. 18, communication system 1800 is shown that is similar to communication system 100 and has all the components described in the context of FIG. 1. Additionally, communication system 1800 of FIG. 18 includes a satellite 1810 which is capable of massive MIMO transmission and reception on frequencies including but not limited to 5-6 Ghz, similar to tower 1500 described in the context of FIG. 15. Communication system 1800 also includes a massive MIMO cable tower 1820 which is also similar to tower 1500 described in the context of FIG. 15.

In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS.

14-15 with satellite 1810 and tower 1820 using massive MIMO beamforming capabilities. Such links labeled as 1801, 1802, 1803 and 1804 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons, including but not limited to change in the line-of-sight profile of a millimeter-wave link between two wireless communication nodes.

Figure 18:
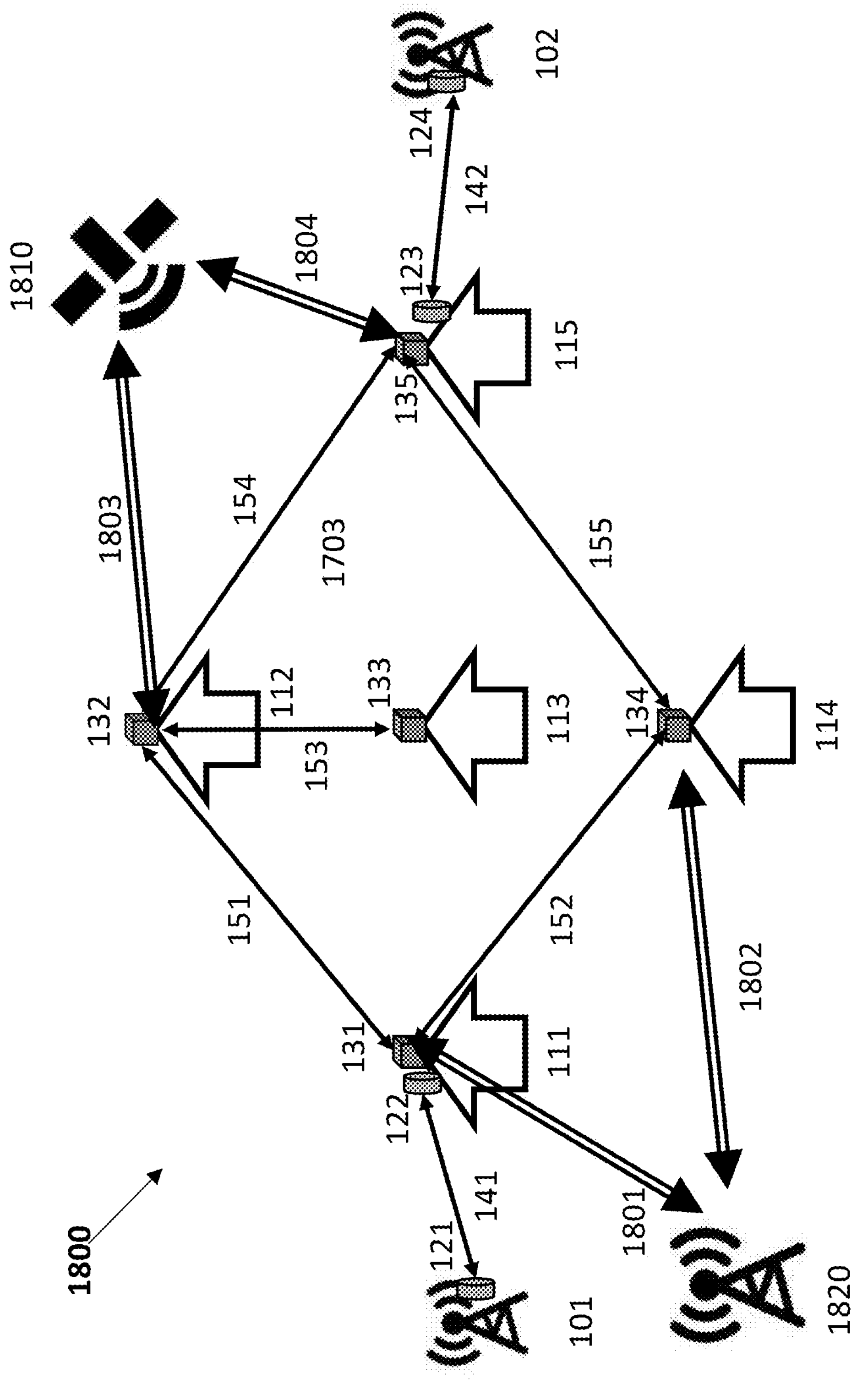
FIG. 18 depicts still another example of a communication system that comprises a wireless mesh network, in accordance with the present disclosure.

Specifically, satellite 1810 in FIG. 18 is connected to the seed node hosted at seed home 115 using wireless communication equipment 135 via link 1804 and to the anchor node hosted at anchor home 112 using wireless communication equipment 132 via link 1803. In this respect, the seed node hosted at seed home 115 has multiple options to route backhaul traffic to the core network.

In one embodiment, the seed node hosted at seed home 115 can pick a satellite link 1804 to transport backhaul data at a given time, and based on some trigger at a different time, can cause its wireless communication equipment 135/123 to switch links for backhaul data transmission from satellite link 1804 to wireless link 142 (which as noted above may be a ptp or ptmp millimeter-wave-based link such as an E-band link) coupled to the fiber PoP node hosted at tower/fiber access point 102. Such trigger may include latency, bandwidth, packet loss requirements, etc. of a particular application.

FIG. 18 also shows an anchor node hosted at an anchor home 113 where the node's wireless communication equipment 133 may exchange data with the anchor node hosted at anchor home 112 using its wireless communication equipment 132. If the anchor node at anchor home 112 receives end-user data from the anchor node at anchor home 113, the anchor node at anchor home 112 may then have multiple options to transport end-user data to the core network via its wireless communication equipment 132, including (1) directly sending the end-user data to the core network via satellite link connection 1803, (2) indirectly sending the end-user data to the core network via the seed node at seed home 115, which may send the end-user data to the core network either via satellite link connection 1804 or via link 142 with the fiber PoP node hosted at access point 102, or (3) indirectly sending the end-user data to the core network via the seed node at seed home 111, which may send the end-user data to the core network either via link connection 1802 or via link 141 with the fiber PoP node hosted at access point 101, among other options.

In one embodiment, wireless communication equipment 132 of the anchor node at anchor home 112 can also dynamically switch its connection link to route data to and from the anchor node at anchor home 113. For example, due to some trigger similar to the triggers described above, wireless communication equipment 132 can dynamically switch from directly communicating data between the anchor node at anchor home 113 and the core network via satellite link 1803 to indirectly communicating data between the anchor node at anchor home 113 via the seed node at seed home 115 and satellite link 1804, as one possible implementation.

It should be understood that links 1803 and 1804 can be part of same massive MIMO beam or links 1803 and 1804 can be part of different massive MIMO beams. It should also be understood that satellite links 1803 and 1804 can use the same frequency range of communications or can operate in different frequency ranges. Further, while FIG. 18 shows only one satellite (i.e., satellite 1810) capable of massive MIMO ptmp communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to the seed node at seed home 111 via link 1801 and to the anchor node at anchor home 112 via link 1802. This provides the anchor node at anchor home 114 with options to route packets to the core network in multiple ways including (a) indirectly through one of the seed nodes at seed homes 111 and 115 through links 152 or 155 (which as noted above may be ptp or ptmp millimeter-wave-based links), and (b) directly to tower 1820 via massive MIMO based link 1802. Similarly, the seed node hosted at seed home 111 has multiple options to route backhaul traffic to the core network. In one embodiment, the seed node hosted at seed home 111 can pick link 1801 to transport backhaul data at a given time, and based on some trigger at a different time, can cause its wireless communication equipment 131/122 to switch links for backhaul data transmission from link 1801 to wireless link 141 which as noted above may be a ptp or ptmp millimeter-wave-based link such as an E-band link) coupled to the fiber PoP node hosted at tower/fiber access point 101. Such trigger may include latency, bandwidth, packet loss requirements, etc. of a particular application.

In FIG. 18, only one tower (i.e., tower 1820) capable of massive MIMO ptmp communication is shown to be connected to two wireless communication nodes. However, it should be understood that a communication system can also have a different number of massive MIMO towers, each connected to multiple different wireless communication nodes hosting various other modules.

In another embodiment, one or more wireless communication nodes described above and discussed with respect to FIGS. 1-18 may additionally be an edge computing node by hosting a processor (separate or shared), memory, digital contents, software, and storage, among other components for computing, and other required operations for edge computing, in addition to the high speed low latency networking capability that has already been described above. This enables a given communication system to provide cloud services in a distributed manner closer to an end user as wireless communication nodes are distributed across the network and provide an interface between the network and an end-user. This memory unit can store a copy of local digital contents and can additionally store portions of digital content that that are not local. The non-local digital contents among other things can include digital content belonging to other nodes. This provides content redundancy in a communication system. Hence, when an end user of a communication system requests for digital content, then this edge computing mechanism allows a request to be fulfilled in a variety of different ways, including a request processed by a local node and/or remote node based on various criteria including but not limited to latency, network congestion, etc. of the application making the request.

In another embodiment, one or more wireless communication nodes described above and discussed with respect to FIGS. 1-18 can additionally be a blockchain node by hosting a computer comprising at least one processor, memory, digital content, software, etc., which is connected to a blockchain network comprising a client that is capable of storing, validating and/or relaying transactions in addition to the high-speed low latency networking capability that has already been described above. This enables the communication system and its nodes described in this disclosure and discussed in the context of FIGS. 1-18 to provide an ideal platform for blockchain databases, enterprise blockchain databases, permissioned/private blockchains, hybrid and other similar types of databases given that (1) file/data/record storage space is inherently distributed as wireless communication nodes are distributed across the geographical coverage area and (2) low latency communication between the nodes and across the network due to high speed wireless links enable improved latency and improves the transaction throughput of the blockchain based databases.

In another embodiment, one or more wireless communication nodes can additionally act as blockchain-based distributed data storage node by adding dedicated or shared storage capacity capability to these nodes. One key advantage of implementing blockchain-based distributed data storage on a given communication system and the wireless communication nodes described in this disclosure is that storage nodes are inherently distributed, and due to the low latency and high bandwidth of the wireless communication links between the wireless communication node described above and the proximity of the storage location nodes to an end-user, accessing the data content can be faster compared to other approaches.

In accordance with the present disclosure, the wireless communication equipment (ptp link modules, ptmp link modules, multiple ptp link modules, combination of multiple ptp and ptmp links, antennas for cellular small cells/CPEs and millimeter-wave equipment, cable, mounts, power supply boxes, etc.) that gets deployed and installed at a seed or anchor home can be consumer financed. For instance, in case of a customer meeting a certain credit score threshold (or any other credit checking criteria), the equipment required to add a millimeter-wave mesh node at the customer's premises (i.e., to add the customer to the wireless mesh network) and provide high speed internet service may be financed by a bank on the behalf of the customer, and the customer may agree with the financing bank to re-pay the amount financed by the bank over a certain time period by making periodic (e.g. monthly) payments based on the terms and conditions of the agreement. This way, the customer becomes owner of the equipment (a wireless mesh network node) once the full financed amount is made to the financing bank. This customer can in one embodiment lease back the wireless mesh network node equipment installed on its property to the wireless mesh network operator that installed the wireless mesh network equipment on its property and provide high speed internet data service. In another embodiment, this customer can lease back the wireless mesh network node equipment installed on its property to the wireless mesh network operator that installed the wireless mesh network equipment on its property and provide high speed internet data service for a certain term (e.g., 18 months, 24 months, 36 months, etc.).

In some instances, this customer may be required to lease back the equipment to only that operator which originally installed the equipment at the customer location and provided high speed internet data services. In other instances, this customer can lease back the equipment to any wireless internet network operator. In another instance, lease back of the equipment to an operator other than the operator which originally installed the network equipment at the customer location may only occur with the permission of the wireless internet network operator that originally installed that equipment at customer location. In yet another instance, such lease back to a different wireless internet network operator may only occur after expiration of the lease term with the original wireless internet network operator.

For a wireless internet network operator building and operating a wireless mesh network, the type of customer financing-based network deployment described above becomes a crowd sourcing or crowdfunding-based infrastructure roll out mechanism, where instead of one or few large entities, CAPEX is sourced from a pool of individuals who in some instances are the customers of the wireless mesh network operator. Such customers can get high speed internet data service from the wireless mesh network operator (operating using ptp/ptmp modules, other communication nodes and equipment and various variations discussed earlier in this disclosure) at a subsidized/discounted rate. In certain cases, such customers may get two separate bills periodically, one for the high-speed internet data service and other for the equipment financing from bank. In another case, customers can get a single consolidated bill from a wireless mesh operator.

In some instances, all customers of a wireless mesh operator can be based on consumer financing explained above in a neighborhood or market where wireless mesh operator offers its high-speed internet data service. In other instances, wireless mesh network's customers in a market or neighborhood can be financed through a variety of different ways including operator financing where wireless mesh operator pays for the equipment of the wireless mesh node, financed through bundling with a private utility or service that has a relatively smaller market size (e.g. home security/automation, solar energy, etc.) compared to market size of the high speed internet where a bundled service is offered and wireless mesh operator uses the marketing/sales commission received from the private utility or service provider to fund the wireless mesh node equipment, financed through the revenue generated from running blockchain platform based services on the wireless mesh network nodes along with the consumer/customer based financing that is explained earlier in the disclosure.

Further, in accordance with the present disclosure, the communications equipment including various types of ptp/ptmp modules, cellular small cell, etc. that were described above can be used to establish multiple ptp and/or point-to-multiple links where both network nodes of a wireless link, one from where a link originates and the second from where a link terminates (in general, nodes can switch roles dynamically between link originator and link terminator based on the direction of data flow), are located at the different customer locations and providing high speed internet service to the dwellers of the property where wireless mesh network node is deployed and installed. In some cases, one of the two nodes of the link can be at a location where the deployed equipment provides high speed internet service to the dwellers of the property at that location. In other instances, both nodes of the link may be at a location where the deployed equipment does not provide high speed internet service to the dwellers of the property at that location.

It should be understood that the length of the communication links of a wireless mesh network disclosed herein may vary. For instance, the length of the communication links of a wireless mesh network established with the help of the various communication modules and equipment described above may be less than 300 meters on average. Alternatively, the length of the communication links of a wireless mesh network can be greater than 300 meters on average as well. Many other lengths of the communication links are possible as well.

In accordance with the present disclosure, further disclosed herein are communication modules that employ direct RF (microwave/millimeter wave)-to-optical and direct Optical-to-RF (microwave/millimeter wave) conversion. In one example implementation, the high-speed photo detectors can be used that directly translate an optical signal into a microwave signal. One of ordinary skill in the art will appreciate that other approaches can be used for direct optical-to-RF conversion. Similarly, a dipole antenna directly coupled to a plasmonic modulator allows direct conversion from the RF to the optical world. One of ordinary skill in the art will appreciate that different approaches can be used for direct conversion of RF signals to optical signals. This direct optical-to-RF and direct RF-to-Optical conversion modules eliminate the need of the use of analog to digital and digital to analog (ADC/DAC) modules that are required by traditional modem implementations. These mixed signal components (i.e., ADC/DAC) consume high amount of power and also increase the cost as each antenna is required to be connected to a separate ADC/DAC module.

Figure 19:
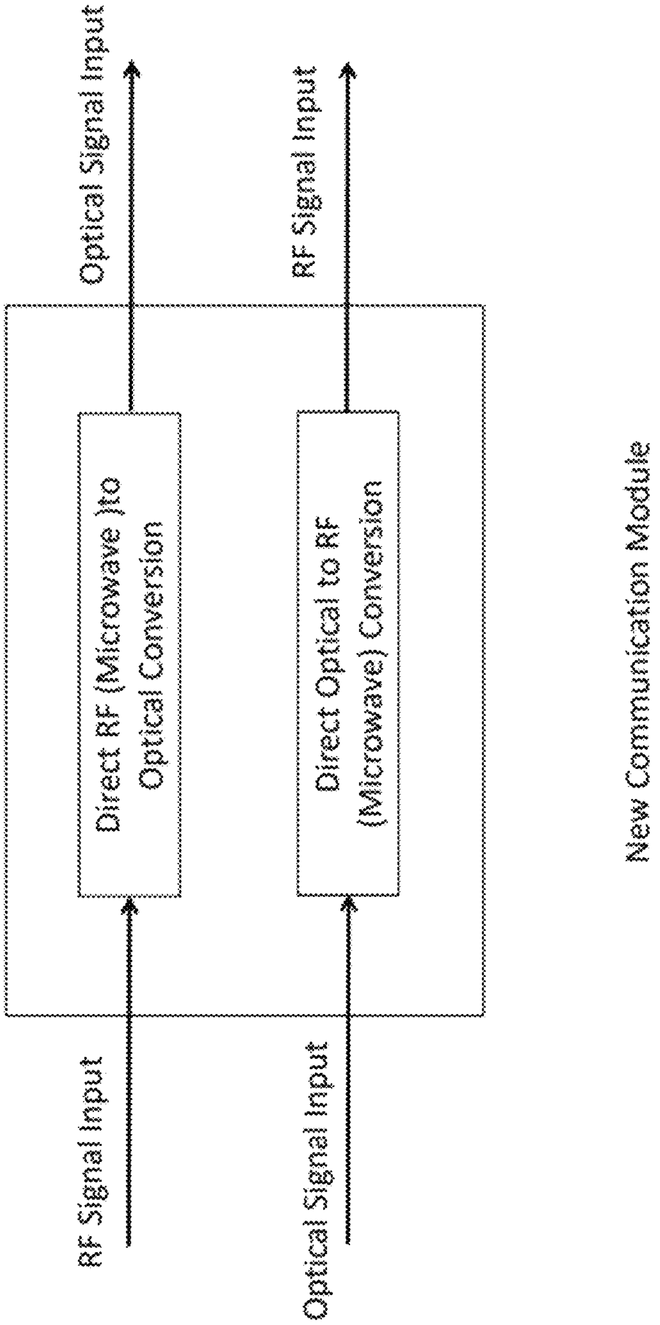
FIG. 19 depicts an example of communication module based on direct RF-to-Optical and direct Optical-to-RF conversion, in accordance with the present disclosure.

FIG. 19 shows a communication module based on direct RF-to-Optical and direct Optical-to-RF conversion. Communication module of FIG. 19 contains a single direct RF-to-Optical sub-module and a single Optical-to-RF sub-module. However, communication module of FIG. 19 can host any integer number of direct RF-to-Optical sub-modules greater than or equal to zero and any integer number of direct Optical-to-RF sub-modules greater than or equal to zero. In one example embodiment, this direct RF-to-Optical and direct Optical-to-RF conversion technology can be implemented is an integrated Circuit (IC) or chip.

Figure 20:
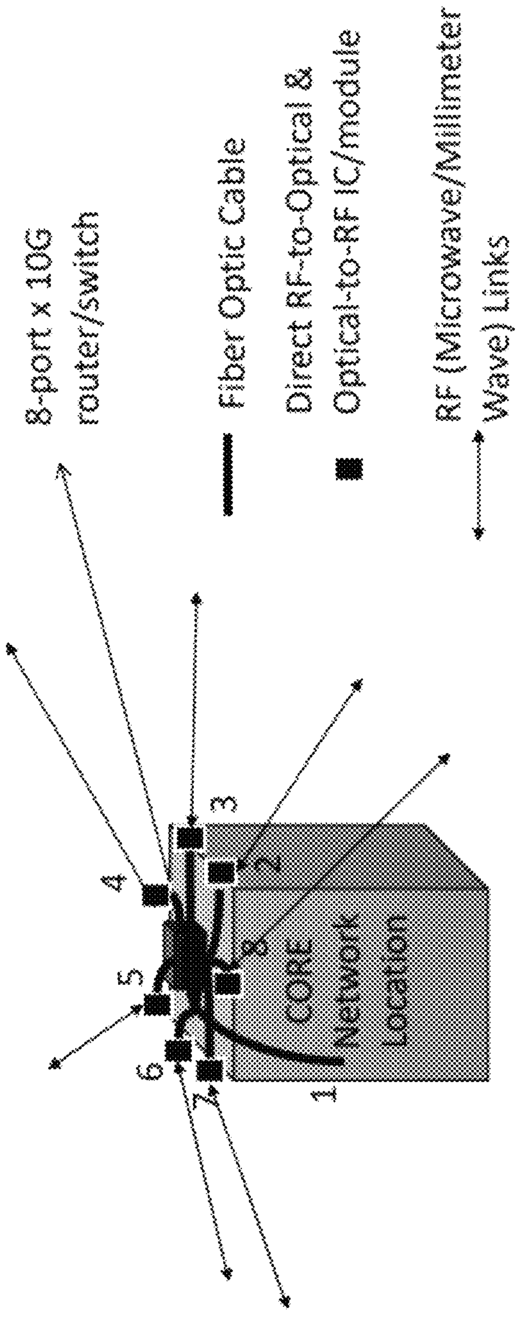
FIG. 20 depicts an example router/switch, in accordance with the present disclosure.

Based on the above explanation with respect to the example communication module of FIG. 19, in an example embodiment, the core of a wireless mesh network can be a wireline optical or wired router/switch where each port is mapped, either through a direct connection or over optical/wired line, to an individual direct conversion Optical-to-RF or RF-to-Optical chip that then focuses, on both receiver and transmitter side, all RF energy into a high gain narrow beam that can be both fixed or steerable. In one example embodiment, a standard 8-port×10 G router/switch could be used, with one port being used as a data drop to local building/site and the other 7 ports being connected over a fiber optic cable to various Optical-to-RF or RF-to-Optical end points that are located at multiple distributed locations external (and/or internal) on/in the building/site as shown in FIG. 20. One of ordinary skill in the art will understand that the router/switch can have a different number of ports as well.

These multiple distributed locations can be determined in advance based on the use of connection potentiality optimization algorithms, where the algorithm understands the relationship between end point placement and potentially connection partners. Also, the individual ptp beams can be dynamically steered among potential ptp connection partners to facilitate path optimization algorithms and/or to respond to network congestion and/or network element failures. In one embodiment, these Optical-to-RF or RF-to-Optical end points that establish ptp/ptmp beams can be placed below a roof's eaves and in other embodiments, these end points can be placed above a roof's eaves. In some other embodiments, some of the Optical-to-RF or RF-to-Optical end points can be placed below a roof's eaves and some can be placed above a roofs eaves and actual placement may depend upon the line-of-sight profile of the location/site.

It should be understood that the example communication module discussed in the context of FIGS. 19-20 can be implemented in other communication modules that were discussed in the context of FIGS. 1-18. For instance, the modules discussed in the context of FIGS. 1-18 can have direct RF-to-Optical and direct Optical-to-RF technology embedded such that the narrow beam, extremely narrow beam, and/or ptp/ptmp/multiple ptp links can be established without the need for ADC/DAC mixed signal circuitry that consumes a high amount of power and requires to be connected individually with each antenna.

In accordance with the present disclosure, a modified version of the communication nodes discussed earlier for forming a wireless mesh network will now be discussed. In one embodiment, a communication node can host flexible millimeter-wave radio equipment capable of establishing multiple ptp and/or ptmp links operating over millimeter-wave frequencies and can comprise 3 different sub-modules: (1) digital/network module, (2) ptp radio module, and (3) ptmp radio module. A digital/network module is responsible for interfacing the above millimeter-wave radio box (and thus the communication node) with a core network (which may also at times be referred to as a backhaul or fiber network). Specifically, it provides switching capability to direct traffic between the ptp or ptmp radio modules of the millimeter-wave radio box (communication node) and the core network. The connectivity between a single or multiple ptp and/or ptmp radio modules of the millimeter-wave radio box and the core network can be based over a variety of interfaces including but not limited to PCI/PCI express bus interface and ethernet.

In one embodiment, PCI/PCIe can be used when a ptp or ptmp radio that needs to be connected is enclosed in the same box with a digital/network module and separation between the digital/network module and the ptp module is limited to few inches such as 3-6 inches or less.

In one embodiment, a digital/network module provides connectivity to a single ptp or ptmp module over a single PCI/PCIe bus interface. In a different embodiment, a digital/network module provides connectivity to 3 ptp or 3 ptmp or a combination of 3 ptp/ptmp modules over three separate PCI/PCIe bus interfaces. In another embodiment, a digital/network module provides connectivity to N ptp or N ptmp or a combination of N ptp/ptmp modules over N separate PCI/PCIe bus interfaces, where N is a positive integer number greater than zero.

An ethernet interface such as an RJ45 port with multi-gigabit support, including but not limited to 1 Gb, 2.5 Gb, 5 Gb, 10 Gb, etc., can be used to connect ptp or ptmp radio modules with a digital/network module. In one embodiment, an ethernet interface can be used when the ptp or ptmp radio that needs to be connected is not enclosed in the same box with a digital/network module and separation between digital/network module and the ptp module is greater than 3-6 inches. In some embodiments, the length can be 10 meters or more.

In one embodiment, a digital/network module provides capability of connecting up to 4 ptp/ptmp radios or up to 3 ptp/ptmp radio and a small cell over 4 ethernet interfaces. In a different embodiment, a digital/network module provides capability of connecting up to N ptp/ptmp radios or up to N−1 ptp/ptmp radio and a small cell over N ethernet interfaces, where N is a positive integer number greater than zero. Digital/network module also contains SFP/SFP+ interface or any other interface to connect digital/network module with the core network.

The ptmp radio module of the communication node discussed above is responsible for establishing ptmp millimeter-wave-based bi-directional links to connect to peer millimeter-wave radios in a wireless mesh network. The ptmp radio module comprises a baseband sub-module and RF module. Baseband module handles the baseband processing and among other aspects is responsible for baseband processing related to beamforming. RF module contains phased antenna array that works in conjunction with baseband module to generate ptmp millimeter-wave beams.

The ptp radio module of the communication node described above is responsible for establishing ptp millimeter-wave-based bi-directional links to connect to a peer millimeter-wave radio in a wireless mesh network. The ptp radio module comprises a baseband sub-module, RF module and beam narrowing module. The baseband module handles the baseband processing and, among other aspects, is responsible for baseband processing related to beamforming. RF module contains phased antenna array that works in conjunction with baseband module to generate ptp millimeter-wave beam. A beam narrowing module is responsible for narrowing the beam by focusing most of the radiated signal energy in the desired direction and lowering the antenna side lobes to minimize the interference in a wireless mesh network.

In one embodiment, the beam narrowing module can be a lens antenna integrated with an RF module. In another embodiment, the beam narrowing module can be a parabolic antenna integrated with an RF module. In yet another embodiment, the beam narrowing module could be a module other than a lens or parabolic antenna and rely on a different approach to narrow the beam originating from a phased array-based RF module.

Figure 21:
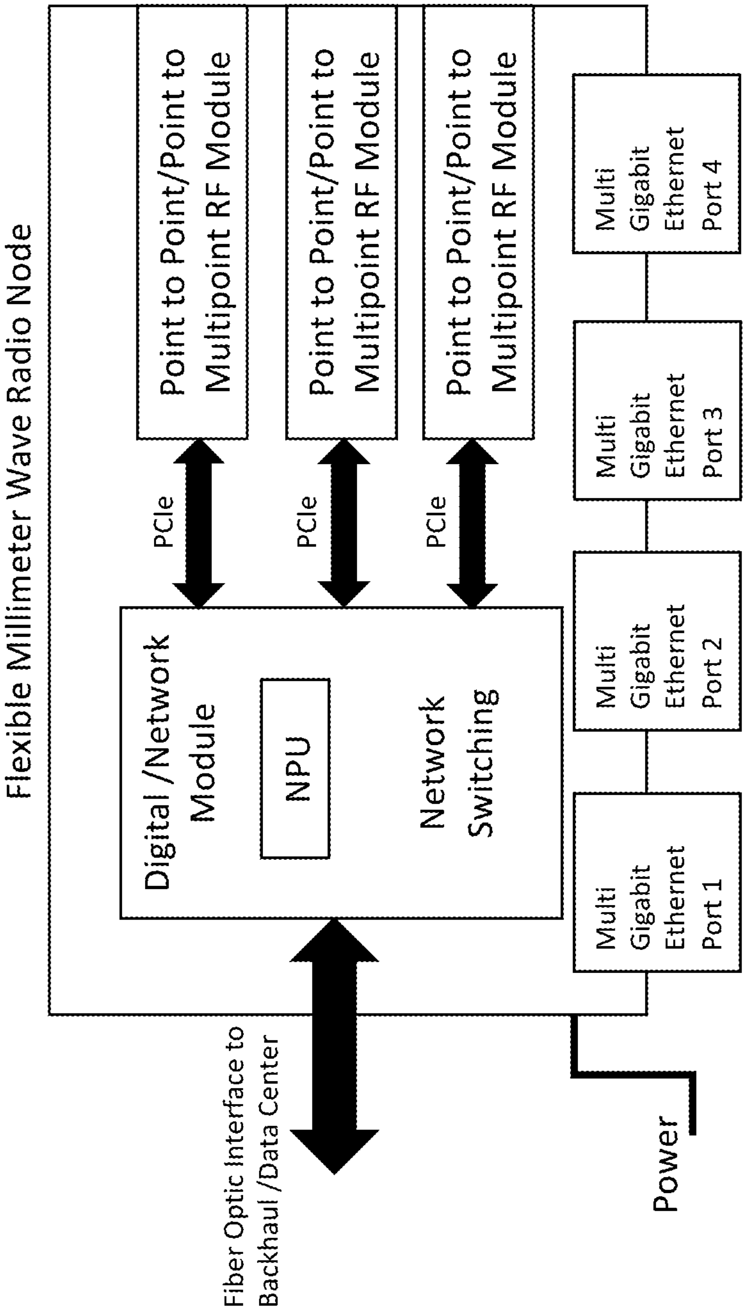
FIG. 21 depicts an example block diagram of flexible millimeter-wave communication equipment, in accordance with the present disclosure.

Referring to FIG. 21, a logical block diagram of the flexible millimeter-wave communication equipment described above is shown. As explained earlier, a flexible millimeter-wave radio node contains within an enclosure (typically outdoor) a digital/network module that has a network processing unit (at times referred to as an "NPU" for short, or at other times may be referred to as a "brain unit") and is configured to provide network switch operations between the fiber optic backhaul interface and the ptp or ptmp radio modules either connected via PCI/PCIe interface or via multi gigabit ethernet ports. A flexible millimeter-wave radio module also contains within the enclosure 3 ptp or ptmp radios. For providing mesh network deployment flexibility, a node can also be connected to external ptp/ptmp radios via ethernet ports. A node can be solar powered or can be powered via electric power outlet of the home where the node is installed. FIG. 21 also shows that this flexible millimeter-wave radio node may only need a single NPU that controls all the ptp or ptmp RF modules either connected via a PCI/PCIe interface or via a multi gigabit ethernet interface. Hence this example flexible millimeter-wave radio node removes the need for using a dedicated NPU for each ptp/ptmp RF module.

Figure 22:
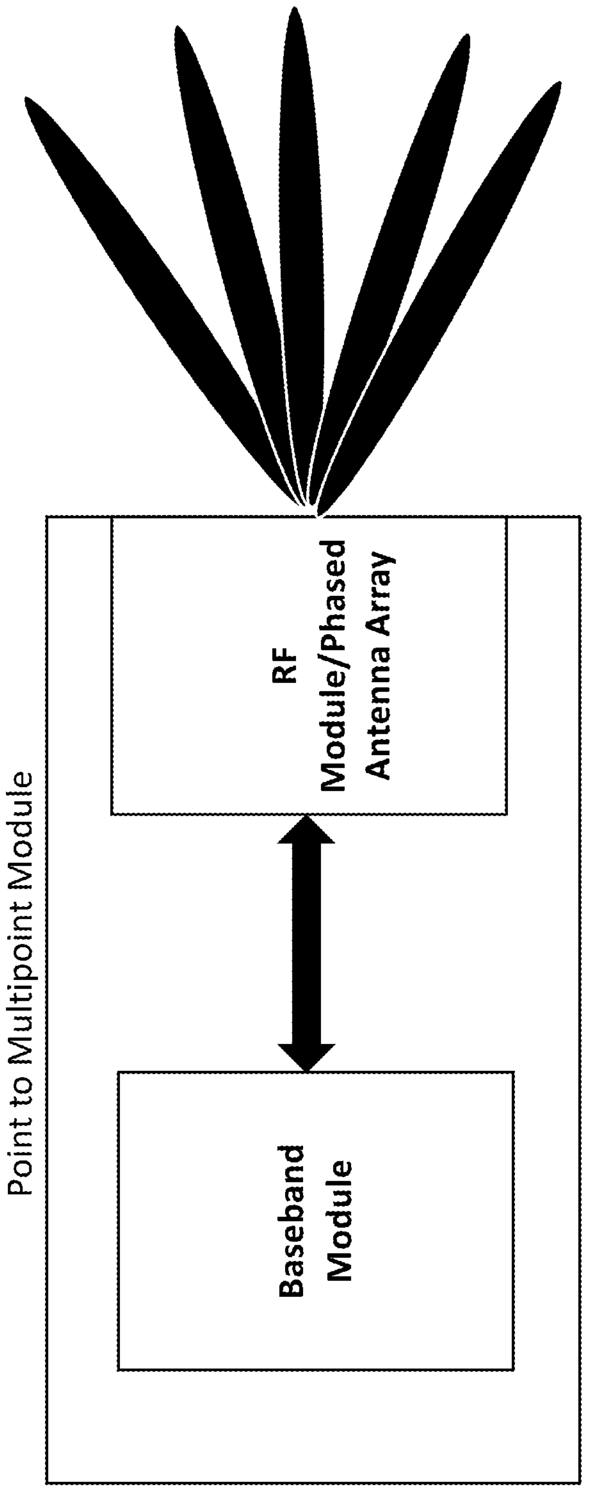
FIG. 22 depicts an example block diagram of a ptmp radio module of a communication node, in accordance with the present disclosure.

FIG. 22 shows a block diagram of a ptmp radio module of the communication node described above. As shown, this radio module contains a baseband module and a RF module that has the phased antenna array for providing beamforming capability.

Figure 23:
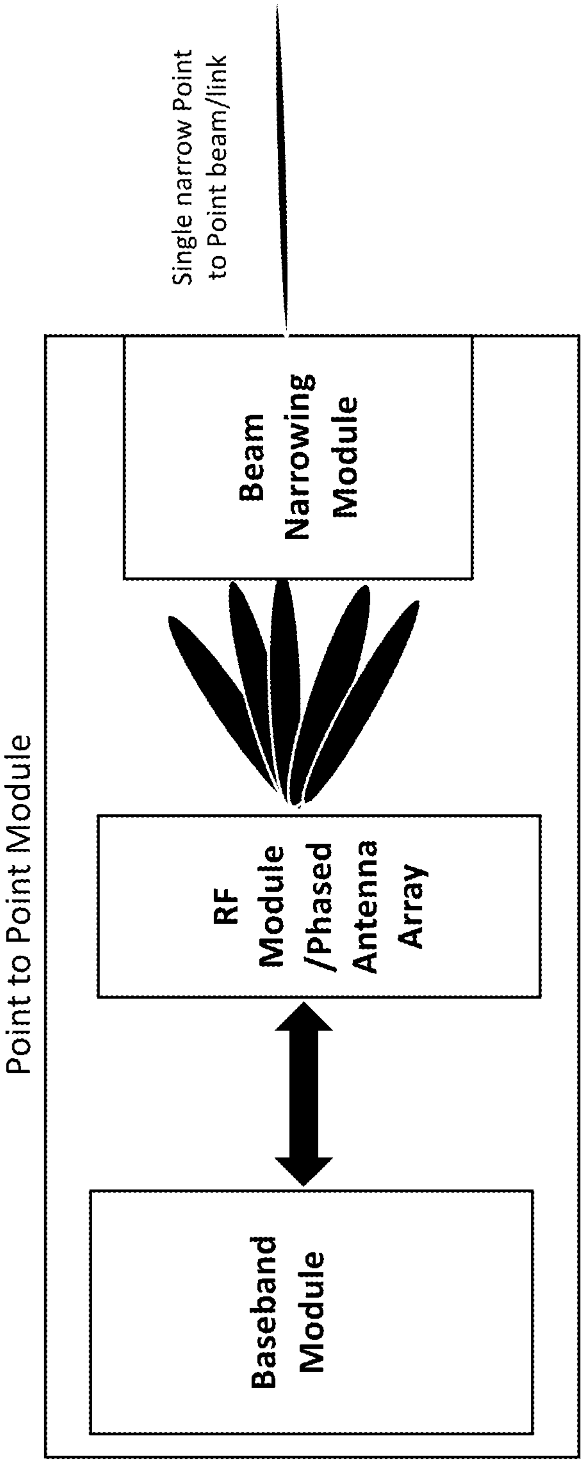
FIG. 23 depicts an example block diagram of a ptp radio module of a communication node, in accordance with the present disclosure.

FIG. 23 shows a block diagram of the ptp radio module of the communication node discussed above. This radio module contains a baseband module, an RF module that has the phased antenna array for providing beamforming capability, along with a beam narrowing module. The beam narrowing module, based on various techniques discussed earlier, narrows the beam generated by the phased antenna array of the RF module.

Figure 24:
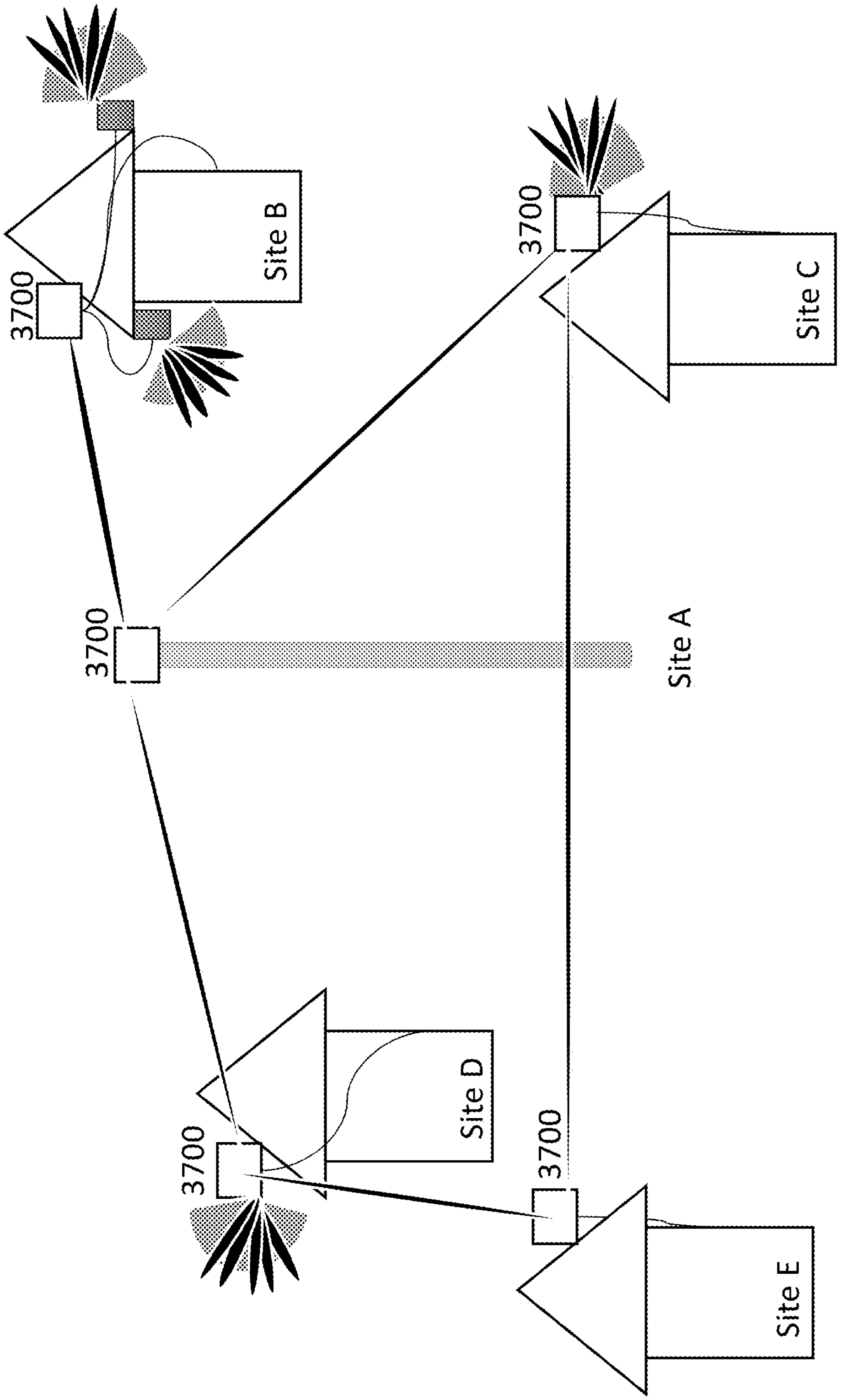
FIG. 24 depicts an example of a wireless mesh network comprising a plurality of communication nodes, in accordance with the present disclosure.

Referring to FIG. 24, various different use cases of the communication nodes described above and explained in the context of FIGS. 21-23 is shown. FIG. 24 shows a wireless mesh network comprising 5 communication nodes 3700. Communication nodes 3700 may each be a flexible millimeter-wave communication node that has been discussed earlier.

At "Site A" of the wireless mesh network, a communication node 3700 may be solar powered and mounted on the pole. This node 3700 at Site A may have 3 ptp links generated by 3 ptp radio modules integrated with the digital/network module. At "Site B," a communication node 3700 may be powered with an electric power outlet of the home and may have one ptp link via a single integrated ptp radio module and 2 ptmp links via two ptmp radio modules that are not integrated with a digital/network module but instead connected via ethernet interface to the communication node. Similarly, at "Site C," a communication node 3700 may be powered with an electric power outlet of the home and may have two ptp links via two integrated ptp radio module and one ptmp radio module integrated with a digital/network module. At "Site E," a communication node 3700 may be powered with an electric power outlet of the home and may have two ptp links via two integrated ptp radio module. Further, at "Site D," a communication node 3700 may be powered with an electric power outlet of the home and may have two ptp links via two integrated ptp radio module and one ptmp radio module integrated with the digital/network module.

Figure 25A:
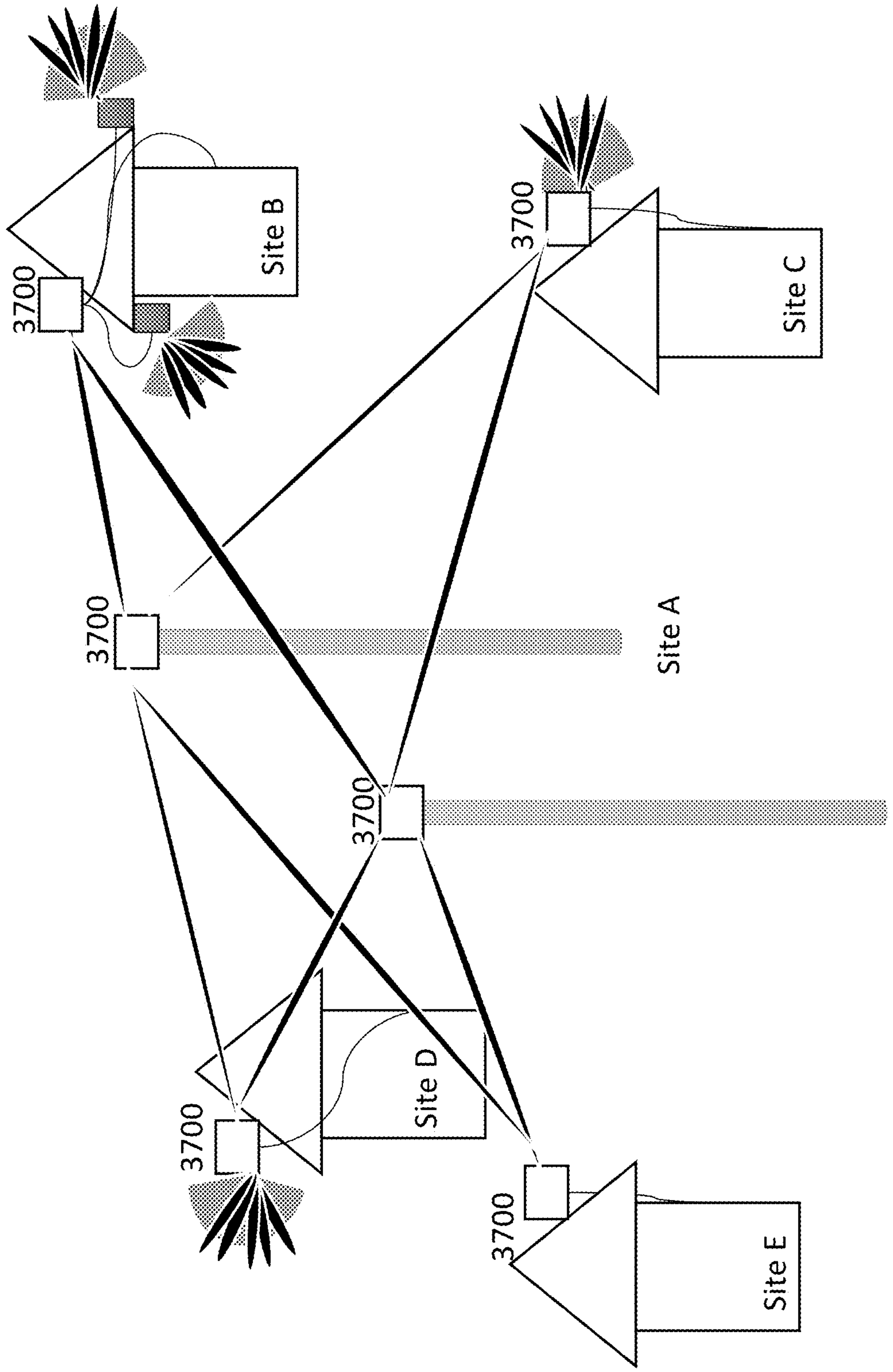
FIG. 25A depicts another example of a wireless mesh network comprising a plurality of communication nodes, in accordance with the present disclosure.

Referring to FIG. 25A, another use case of the communication node described above is shown. In particular, FIG. 25A shows an example wireless mesh network that includes communication nodes 3700 at the 5 sites previously described with respect to FIG. 24, as well as an additional communication node 3700 at "Site A2." Similar to communication node 3700 at "Site A," communication node 3700 at "Site A2" may be mounted on a pole (among other possibilities).

Based on the preceding disclosure (e.g., the disclosure in connection with FIGS. 5-7, 9-11, 13, and 16-18), one of ordinary skill in the art will appreciate that each communication node 3700 at a given site may have the capability to communicate with multiple other communication nodes at multiple other sites. For instance, communication node 3700 at "Site B" may have the capability to communicate with the respective communication nodes 3700 at both "Site A" and communication node 3700 at "Site A2." Similarly, the respective communication node 3700 at each of "Site C," "Site D," and "Site E" may have the capability to communicate with the respective communication nodes 3700 at both of "Site A" and "Site A2."

Furthermore, based on the preceding disclosure (e.g., the disclosure in connection with FIGS. 5, 11, and 18), one of ordinary skill in the art will appreciate that each communicate node 3700 at a given site (e.g., communication node 3700 at "Site B") may have the capability to dynamically switch its active communication link from a first communication node 3700 at a first site (e.g., communication node 3700 at "Site A") to a second communication node 3700 at a second site (e.g., communication node 3700 at "Site A2") based on some trigger that is similar to the triggers described above (e.g., changes in link condition such as a change from a LOS path to a non-LOS path due to a change in environment, increased interference, instructions from higher layers, latency, bandwidth, and/or packet loss requirements of a particular application, etc.).

Figure 25B:
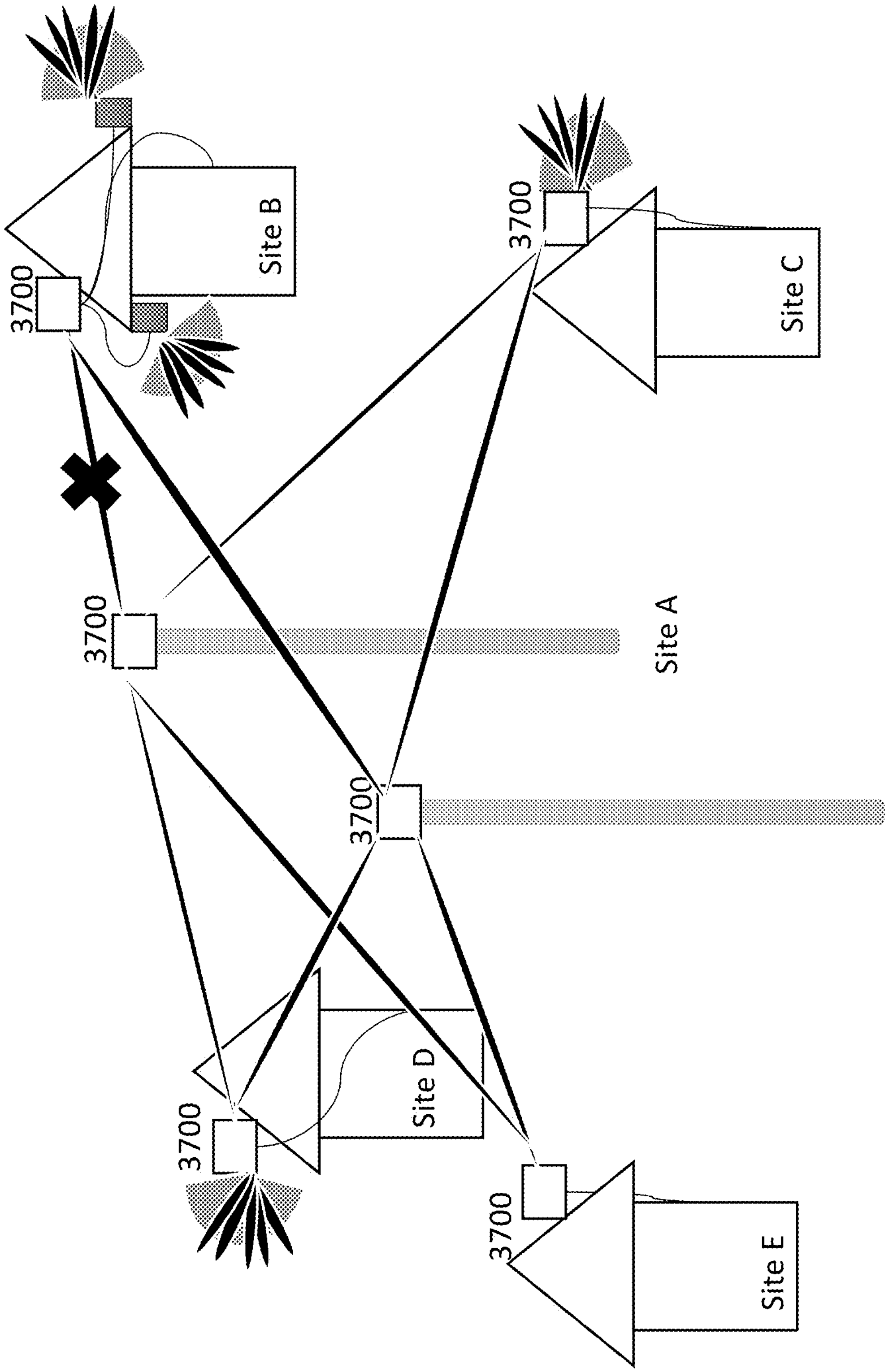
FIG. 25B depicts yet another example of a wireless mesh network comprising a plurality of communication nodes, in accordance with the present disclosure.

For instance, in the scenario shown in FIG. 25A, the respective communication node 3700 at each of "Site B," "Site C," "Site D," and "Site E" may initially be configured to actively communicate with the communication node 3700 at “Site A” (which may function to route backhaul traffic to and/or from such other sites). However, at some later point in time, the communication node 3700 may dynamically switch its active communication link from the communication node 3700 at “Site A” to the communication node 3700 at “Site A2” (which may also function to route backhaul traffic to and/or from such other sites) due to some trigger similar to the triggers described above. Such a scenario is shown in FIG. 25B.

It should be understood that FIGS. 24-25 are described in such a manner for the sake of clarity and explanation and that the example wireless mesh networks described in FIGS. 24-25 may take various other forms as well. For instance, the example wireless mesh networks may include more or less communication nodes, and a given communication node may take various other forms and may be mounted in various other manners and/or mounted on various other objects as well (e.g., mounted on a pedestal). Further, in line with the preceding disclosure, one or more of the communication nodes (e.g., the communication nodes 3700 at “Site A” and “Site A2) may be mounted to an object that is at or near a fiber access point. Further yet, the example mesh networks may have various different configurations of ptp or ptmp modules either integrated or connected via an ethernet interface and powered via various different power options.

Another important aspect of communication node 3700 is that the integrated radio modules can be pluggable. In other words, based on a specific use case, the number and types of radio modules integrated with a digital/network module via PCI/PCIe interface can easily be changed by plugging in the desired number and type of radio modules with full flexibility instead of having one specific configuration.

So far, the modified version of communication nodes discussed above and also described in the context of FIGS. 21-25 assumes that the ptp or ptmp modules connected to a digital/network module with an NPU via a high speed interface (e.g., PCI/PCIe/Thunderbolt) are also located inside a same enclosure. It should be understood that the ptp or ptmp modules connected to a digital/network module via high speed interface can also be located outside the digital/network module with the NPU and inside an independent box/enclosure connected via an outdoor cable supporting the PCI/PCIe/Thunderbolt high speed communication protocol to the enclosure of the digital/network module.

Figure 26:
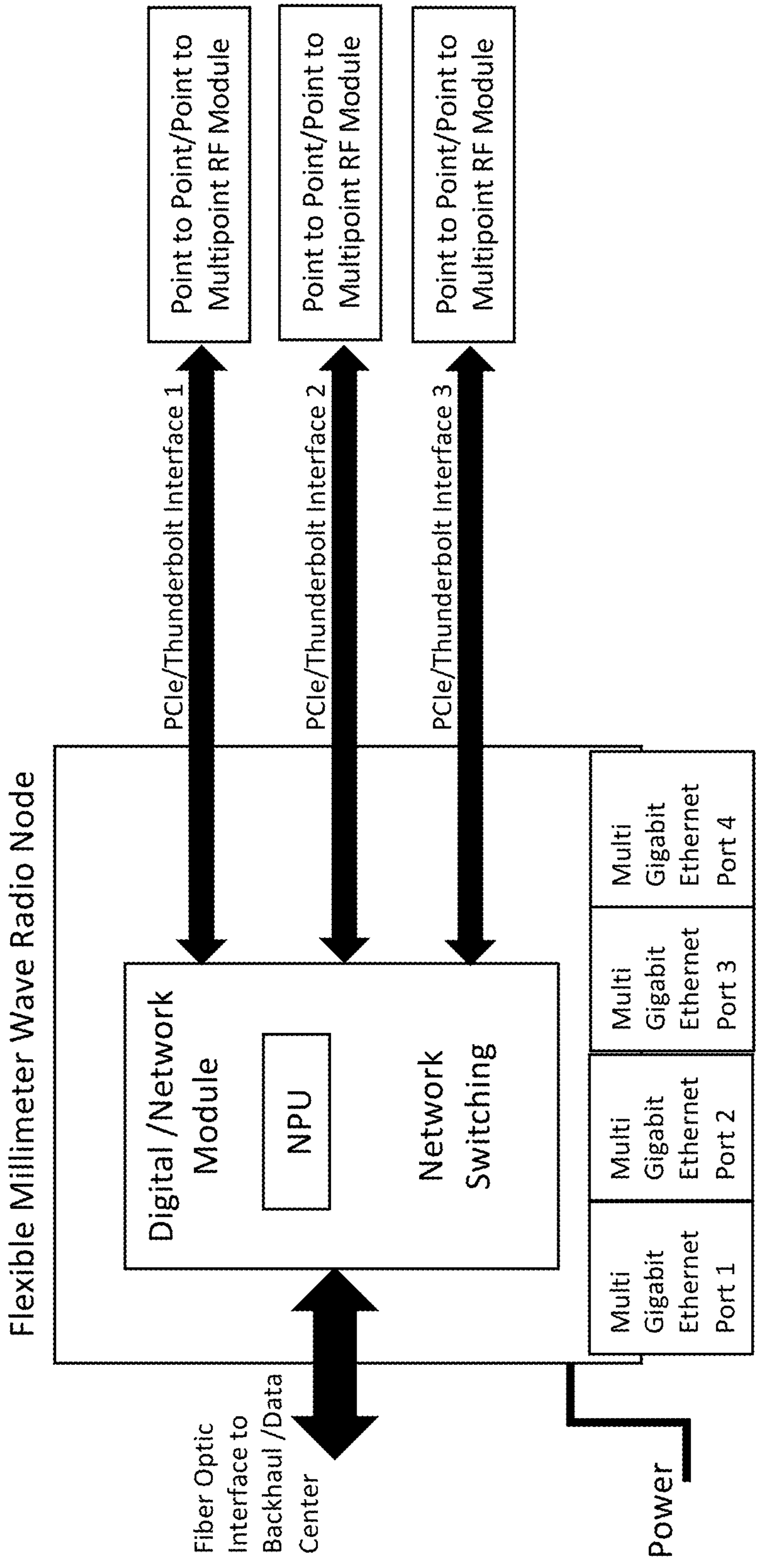
FIG. 26 depicts an example modified version of flexible millimeter-wave communication equipment, in accordance with the present disclosure.

As one example, FIG. 26 depicts a modified version of a flexible millimeter-wave radio box, where the ptp or ptmp RF modules are located outside a digital/network module with NPU enclosure and inside separate independent box/enclosure and connected via an outdoor wired cable capable of supporting high speed communication interface (e.g., PCI/PCIe/Thunderbolt Interface). As shown, 3 ptp or ptmp modules are connected via PCIe/Thunderbolt interfaces to the digital/network module with the NPU using a compatible outdoor cable.

In general, it should be understood that N number of ptp or ptmp modules in separate independent enclosures can be connected via a PCIe/Thunderbolt compatible outdoor cable, where N is an integer greater than zero. It should also be understood that the length of the outdoor cable compatible with high speed communication protocol, such as PCIe/thunderbolt, depends on the maximum limit defined by the technology. In one embodiment, PCIe/thunderbolt cable can be up to 3 meters. In other embodiments, the length of the outdoor PCI/PCIe/thunderbolt compatible cable can be less than or greater than 3 meters.

In yet another embodiment of the present disclosure, a wireless mesh network may include ultra-high-capacity nodes that are capable of establishing ultra-high-capacity links (e.g., ptp or ptmp bi-directional communication links) using a millimeter-wave spectrum, including but not limited to 28 Ghz, 39 Ghz, 37/42 Ghz, 60 Ghz (including V band), or E-band frequencies, as examples. These ultra-high-capacity links may have a larger range as compared to other ptp or ptmp links, including but not limited to ptp or ptmp links of the type discussed above with reference to FIGS. 1-26.

For instance, as one possibility, a ptp or ptmp link of the type discussed above with reference to FIGS. 1-26 may have an average range of up to 100 meters, whereas an ultra-high-capacity link may have a range of more than 100 meters. As another possibility, a ptp or ptmp link of the type discussed above with reference to FIGS. 1-26 may have an average range of up to 500 meters, whereas an ultra-high-capacity link may have a range of more than 500 meters. As yet another possibility, a ptp or ptmp link of the type discussed above with reference to FIGS. 1-26 may have an average range of up to 1000 meters, whereas an ultra-high-capacity link may have a range of more than 1000 meters.

However, in other implementations, it is possible that the length of an ultra-high-capacity link may be similar to the length of a ptp or ptmp links of the type discussed above with reference to FIGS. 1-26, but may nevertheless provide higher capacity such that a fewer number of ultra-high-capacity nodes/links may be used (as compared to the ptp or ptmp nodes/links of the type discussed above with reference to FIGS. 1-26) to build a main high capacity backbone through the mesh (i.e., the ultra-high-capacity nodes/links may be sparser).

The higher capacity and/or extended range of these ultra-high-capacity nodes/links may be achieved via various advanced signal processing techniques, including but not limited to multiple input multiple output (MIMO) such as 2×2 MIMO, 4×4 MIMO, 8×8 MIMO or an even higher order MIMO, use of vertical and horizontal polarization (V & H), higher switch capacity of the digital network module due to higher processing power such as support of 8×25 Gbps port (200 Gbps aggregate traffic flow), higher order modulation including 16 QAM, 64 QAM, 256 QAM, 512 QAM, 1024 QAM, orbital angular momentum (OAM) multiplexing, and/or higher antenna gains, among other possibilities. Further, in some implementations, the higher capacity and/or extended range of these ultra-high-capacity nodes/links can be achieved using a subset of the advanced signal processing techniques mentioned above.

These ultra-high-capacity nodes/links may be used in conjunction with other ptp and/or ptmp links, including but not limited to ptp or ptmp links of the type discussed above with reference to FIGS. 1-26, to add another layer to a wireless mesh network.

Figure 27:
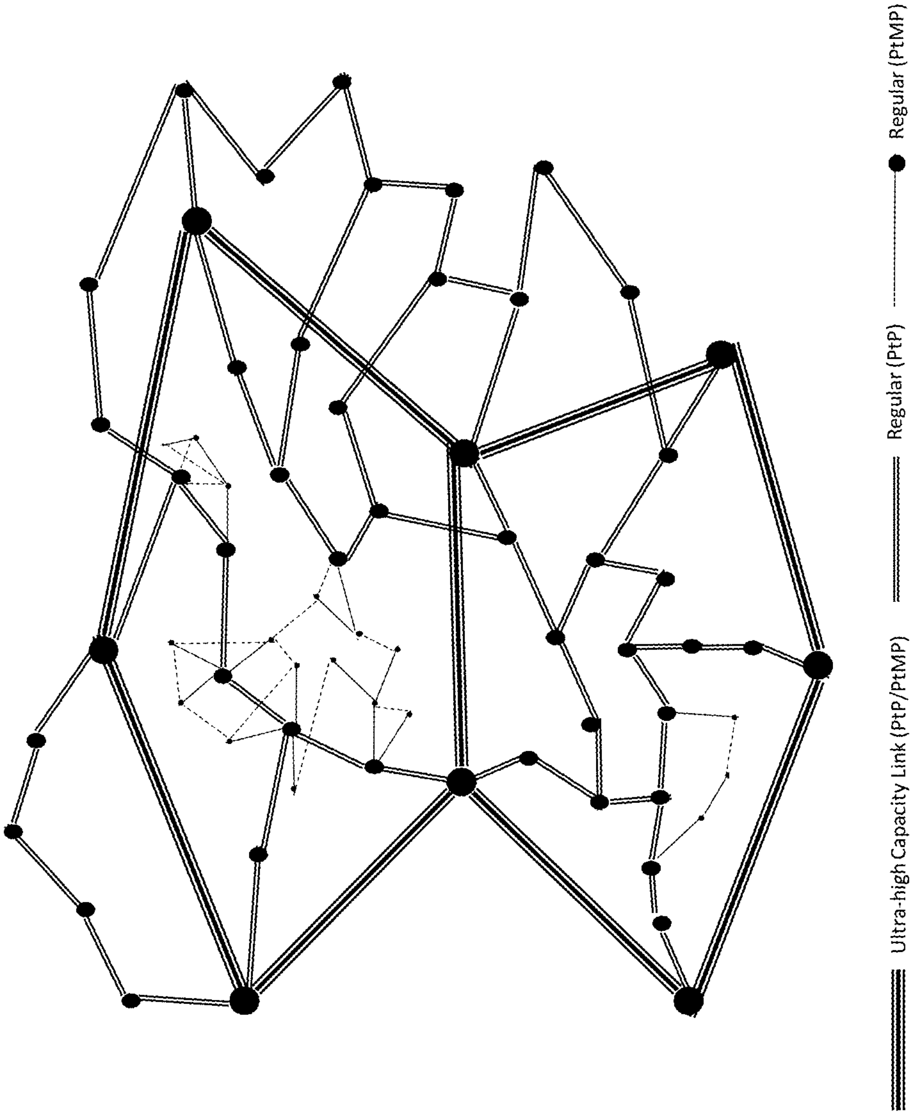
FIG. 27 depicts an example of a multi-layer wireless mesh network, in accordance with the present disclosure.

To illustrate with an example, FIG. 27 shows one example of a multi-layer wireless mesh network in which triple-compound links represent the ultra-high-capacity links described above, double-compound rings represent ptp links of the type discussed above with reference to FIGS. 1-26, and single-line links represent ptmp links of the type discussed above with reference to FIGS. 1-26. In this respect, each of the different types of links may be considered to define a different layer of the multi-layer wireless mesh network (e.g., an ultra-high-capacity layer, a standard ptp layer, and a standard ptmp layer).

As shown in FIG. 27, longer ultra-high-capacity links may be used bring a high level of capacity to the wireless mesh network, which can then be delivered to an end user/customer via a shorter ptp or point to multi point link (which may not be ultra-high-capacity). It should also be understood that while the ptmp links may primarily serve to provide flexibility in building the wireless mesh network due to the capability of beam steering and ability to establish multiple links from a single radio, these ptmp links may also be used to indirectly connect two ptp links via multiple ptmp link hops that can add additional reliability to the network.

Further, it should be understood that a multi-layer wireless mesh network such as the one illustrated in FIG. 27 can be deployed in various manners. For instance, in one implementation, different layers of the multi-layer mesh network can be deployed in parallel. In another implementation, different layers of the multi-layer wireless mesh network can be deployed in different phases. For example, a deployment approach for a multi-layer wireless mesh network may involve first building a core network backbone (e.g., an ultra-high-speed network) using ultra-high-capacity nodes/links and then densifying the network during one or more subsequent phases using other types of ptp or ptmp nodes/links, including but not limited to ptp or ptmp radio links of the type discussed above with reference to FIGS. 1-26. In another example, a deployment approach for a multi-layer wireless mesh network may involve first building a network of ptp nodes/links that are not ultra-high capacity and then later upgrading capacity by adding ultra-high-capacity nodes/links. A multi-layer wireless mesh network can be deployed in other manners as well.

Figure 28:
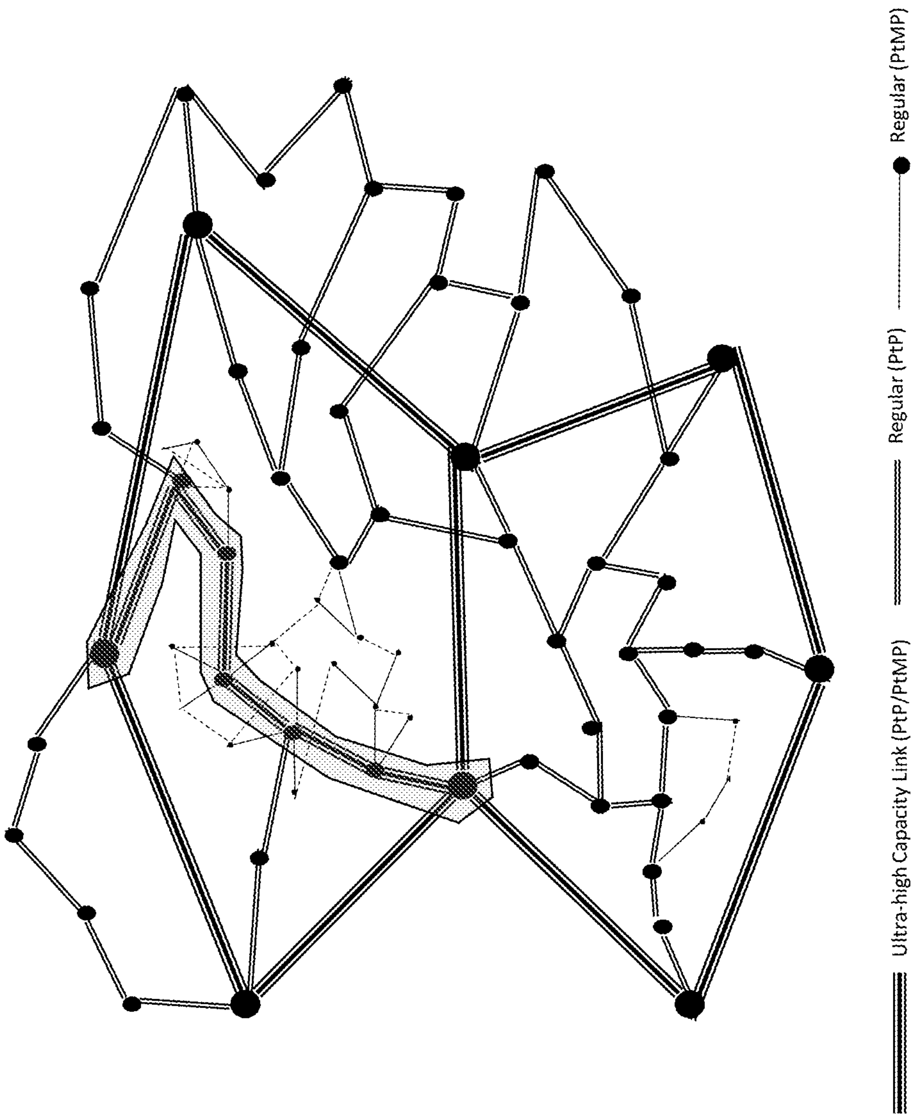
FIG. 28 depicts another example of a multi-layer wireless mesh network, in accordance with the present disclosure.

One variation of the multi-layer mesh architecture described above is that the ultra-high-capacity links can be designed to create specific paths based on a traffic requirement and/or some other criteria defined by the operator. To illustrate with an example, FIG. 28 shows another example of a multi-layer wireless mesh network in which some of the preexisting, non-ultra-high-capacity ptp links included in the example multi-layer wireless mesh network of FIG. 27 are replaced by ultra-high-capacity links (shown as triple-compound links) to provide ultra-high capacity to specific segments of the wireless mesh network. This can be done either by supplementing the hardware of the preexisting, non-ultra-high-capacity nodes at the customer location with new hardware (e.g., a new radio or other associated hardware) capable of establishing ultra-high-capacity links or by replacing the hardware of the preexisting, non-ultra-high-capacity nodes at the customer location with new hardware (e.g., a new radio or other associated hardware) capable of establishing ultra-high-capacity links.

Another variation of the multi-layer mesh architecture described above is that different layers of the wireless mesh network may be deployed at different heights, which may create physical-link separation by allowing re-use of the available frequency spectrum. For instance, in one implementation, a multi-layer wireless mesh network can have at least 2 layers of ultra-high-capacity links operating in the same frequency range, but at different heights. To illustrate with an example, a first layer of ultra-high-capacity links can be deployed at a lower height, such as by installing the required hardware at a lower height within a structure hosting the wireless mesh hardware (e.g., on a lower floor of a building), and a second layer of the ultra-high-capacity links can be deployed at a higher height, such as by installing the required hardware at a higher height of the structure hosting the wireless mesh hardware (e.g., at higher floor of the building). In this respect, the deployment of these different layers of ultra-high-capacity links at different heights may serve to increase the capacity of the multi-layer wireless mesh network.

While the foregoing example involves the deployment of multiple different layers of ultra-high-capacity links at multiple different heights, it should be understood that this example is merely provided for purposes of illustration, and that multiple layers of wireless mesh links of any type may be deployed at different heights in order to enhance the overall capacity of the multi-layer wireless mesh network, including but not limited to layers of ultra-high-capacity links, non-ultra-high-capacity ptp links, and/or non-ultra-high-capacity ptmp links.

Yet another variation of the multi-layer mesh architecture described above is that the ptmp links that are not ultra-high capacity (which are shown in FIGS. 27 and 28 as single-line links) may be replaced by wired links, such as a coaxial wire loop, fiber loop or some other type of wired link. To illustrate with an example, a multi-layer mesh network may include wired links that comprise the coaxial portion of the HFC (Hybrid Fiber Coax) used by the cable companies, in which case this coaxial portion of the HFC may bring mesh network connectivity to end users while the fiber portion of the HFC may bring the high-speed internet to the neighborhood. In this respect, the wireless mesh links consisting of ultra-high-capacity links (which are shown in FIGS. 27 and 28 as triple-compound links) and/or non-ultra-high-capacity ptp links may play the role of the fiber equivalent portion of the HFC by bring high capacity from a fiber POP to the neighborhood.

As noted above, the wireless communication equipment that is utilized to deploy the wireless communication nodes disclosed herein may take any of various forms, and in at least some examples, that wireless communication equipment may include a radio module that is based on a phased antenna array. For example, as discussed above with reference to FIG. 7, a wireless communication node's equipment may include a Module B type of ptmp radio module that is based on a phased antenna array. As another example, as discussed above with reference to FIGS. 21-23 and 26, a wireless communication node's equipment may include flexible millimeter-wave ptp and/or ptmp radios that are based on phased antenna arrays. Other examples of radio modules based on phased antenna arrays that can be utilized to deploy the wireless communication nodes disclosed herein are possible as well.

In accordance with yet another aspect of the present disclosure, a radio module of any of the wireless communication nodes disclosed herein can be made more flexible by using a phased antenna array comprising antenna elements having multiple different polarizations. For example, in one implementation, some phased antenna array elements of a radio module can have a vertical polarization and other phased antenna array elements of the radio module can have a horizontal polarization. In another implementation, the phased antenna array elements of a radio module can have slant/cross polarizations. For example, some phased antenna array elements of a radio module can have a +45 degree polarization and other phased antenna array elements of the radio module can have −45 degree polarization. Other implementations are possible as well, including but not limited to (i) implementations where the polarizations of the phased antenna array's antenna elements are something other than other than horizontal/vertical or slant/cross polarization, and/or (ii) implementations where the phased antenna array includes antenna elements belonging to more than two different polarizations (e.g., four respective sets of antenna elements having horizontal, vertical, +45 degree, and −45 degree polarizations).

Further, the phased antenna array comprising antenna elements having two or more different polarizations may be fed by an RF module comprising a plurality of RF chains, which may take any of various forms. In one implementation, each individual antenna element of the phased antenna array described above can be connected to a dedicated RF chain having a dedicated power amplifier. For example, in a 16-element antenna array, each antenna element may be connected to a dedicated RF chain, such that the radio module comprises 16 separate RF chains that feed the 16 antenna elements of the phased array. In another implementation, multiple antenna elements of the phased antenna array may be grouped together for purposes of the RF chains, where each group of multiple antenna elements may be connected to a respective RF chain such that the antenna elements in group share a power amplifier and other RF elements of the group's respective RF chain. For example, in a 16-element antenna array, the antenna elements may be arranged into groups of two antenna elements for purposes of the RF chains, such that the radio module comprises 8 separate RF chains that feed the grouped-by-two 16 antenna elements of the phased array.

In conjunction with the phased antenna array comprising antenna elements having two or more different polarizations and the RF module that feeds the antenna elements, a radio module designed in accordance with this aspect of the present disclosure may further comprise a control unit that is configured to dynamically control an activation state (e.g., the activation/deactivation) of the RF chains and their corresponding antenna elements in order to alter the polarization and/or emission pattern of the radiated signal. This control unit may comprise hardware, software, or some combination thereof, among other possibilities. Further, in practice, the control unit may be configured to dynamically control the activation state of the RF chains and their corresponding antenna elements in response to an instruction from an NPU of the radio module, a digital module of the radio module, or the like, among various other possibilities.

For instance, in one implementation where each antenna element of the phased antenna array has one of two possible polarizations (e.g. either horizontal or vertical), the control unit may be configured to (i) activate (or maintain activation of) all of the antenna elements having one polarization by activating (or maintaining activation of) whichever RF chain (s) feed the antenna elements to be activated and (ii) de-activate all of the antenna elements having the other polarization by deactivating whichever RF chains feed the antenna elements to be deactivated, such that antenna elements having only one of the two possible polarizations are activated in the phased antenna array and the antenna output belongs to that one polarization only.

For example, based on a given instruction received from an NPU or digital module of the radio module, the control unit may function to (i) activate (or maintain activation of) all antenna elements having a horizontal polarization by activating (or maintaining activation of) whichever RF chains feed such antenna elements and (ii) deactivate all antenna elements having a vertical polarization by deactivating whichever RF chains feed such antenna elements, which may result in an antenna output belonging to the horizontal polarization only.

As another example, based on a given instruction received from an NPU or digital module of the radio module, the control unit may function to (i) activate (or maintain activation of) all antenna elements having a vertical polarization by activating (or maintaining activation of) whichever RF chains feeds such antenna elements and (ii) deactivate all antenna elements having a horizontal polarization by deactivating whichever RF chain(s) feeds such antenna elements, which may result in an antenna output belonging to the vertical polarization only.

The control unit may also be configured to perform similar functionality with respect to antenna elements having other polarization values (e.g., slant/cross polarizations).

In another implementation, instead of activating all of the antenna elements of the phased antenna array having a particular polarization (e.g., all of the horizontal antenna elements or all of the vertical antenna elements), the control unit could be configured to activate less than all of the antenna elements having a particular polarization. For instance, consider an example of a phased antenna array that includes one set of antenna elements having a horizontal polarization (e.g., 8 horizontal antenna elements) and another set of antenna elements having a vertical polarization (e.g., 8 vertical antenna elements). In such an arrangement, the control unit may be configured to independently activate (or maintain activation of) two or more different subsets of the antenna elements having the horizontal polarization and/or two or more different subsets of the antenna elements having the vertical polarization.

For example, the control unit may function to activate (or maintain activation of) one particular subset of antenna elements having the horizontal polarization (e.g., 4 of the 8 available horizontal elements) while deactivating all of the other antenna elements having the horizontal polarization as well as all of the antenna elements having the vertical polarization. As another example, the control unit may function to activate (or maintain activation of) one particular subset of antenna elements having the vertical polarization (e.g., 4 of the 8 available vertical elements) while deactivating all of the other antenna elements having the vertical polarization as well as all of the antenna elements having the horizontal polarization. As yet another example, the control unit may function to activate (or maintain activation of) multiple subsets of antenna elements having the horizontal polarization or multiple subsets of antenna elements having the vertical polarization. Other examples are possible as well. The control unit may also be configured to perform similar functionality with respect to antenna elements having other polarization values (e.g., slant/cross polarizations).

This capability to activate different subsets of antenna elements having a particular polarization may provide various benefits, including but not limited to the capability to establish multiple separate wireless links using the different subsets of antenna elements having the particular polarization.

In yet another implementation, instead of keeping antenna elements having only one single polarization activated at any given time, the control unit could be configured to activate (and maintain activation of) antenna elements having multiple different polarizations at the same time. For instance, consider an example of a phased antenna array that includes one set of antenna elements having a horizontal polarization (e.g., 8 horizontal antenna elements) and another set of antenna elements having a vertical polarization (e.g., 8 vertical antenna elements). In such an arrangement, the control unit may be configured to activate (or maintain activation of) both (i) antenna elements having the horizontal polarization and (ii) antenna elements having the vertical polarization. The control unit may also be configured to perform similar functionality with respect to antenna elements having other polarization values (e.g., slant/cross polarizations).

This capability to activate (or maintain activation of) antenna elements having multiple different polarizations may provide various benefits, including but not limited to the capability for a radio module to perform (i) signal reception over an established bi-directional link using antenna elements having one of two possible polarizations and (ii) signal transmission over the established bi-directional link using antenna elements having the other of two possible polarizations. In such an implementation where a radio module uses antenna elements having one polarization for signal reception and antenna elements having another polarization for signal transmission, the radio module may utilize any of various different multiple access techniques to carry out such signal reception and/or transmission, including but not limited to time division duplexing (TDD), frequency division duplexing (FDD), Multiuser Superposition Transmission (MUST), CDMA, (FDMA), (TDMA), (SC-FDMA), (SC-TDMA), OFDMA, and/or (NOMA), among other possibilities.

It should also be understood that the foregoing implementations could be implemented together. For instance, the control unit could be configured to activate both a particular subset of antenna elements having a horizontal polarization and a particular subset of antenna elements having a vertical polarization, while other subsets of antenna elements having horizontal and vertical polarizations are deactivated. Other implementations are possible as well.

In some embodiments, the output of the phased antenna array's antenna elements can also be fed into one or more beam narrowing modules that are included as part of a radio module designed in accordance with this aspect of the present disclosure. For instance, in one implementation, a radio module may include a single beam narrowing module, and the output of all of the phased antenna array's antenna elements may be fed into that single beam narrowing module. In another implementation, a radio module may include multiple separate beam narrowing modules, and the output of different sets and/or subsets of the phased antenna array's antenna elements may be fed into the multiple separate beam narrowing modules.

For example, in an implementation where the phased antenna array includes antenna elements that each have one of two possible polarizations, a radio module may include at least one respective beam narrowing module corresponding to each of the two possible polarizations, where the output of a first set of antenna elements having a first polarization is fed into a first beam narrowing module and the output of a second set of antenna elements having a second polarization is fed into a second beam narrowing module. As another example, in an implementation where different subsets of antenna elements having a same given polarization can be activated/deactivated independently from one another, a radio module may include multiple beam narrowing modules corresponding to a single polarization, where the output of each different subset of antenna elements having the given polarization is fed into a different beam narrowing module. Other example arrangements of multiple beam narrowing modules are possible as well—including but not limited to the possibility that a radio module may include multiple beam narrowing modules corresponding to each possible polarization of the antenna elements (e.g., a first set of two or more beam narrowing modules corresponding to a horizontal polarization and a second set of two or more beam narrowing modules corresponding to a vertical polarization).

Each of the one or more beam narrowing modules that are included as part of a radio module designed in accordance with this aspect of the present disclosure can take any of various forms, examples of which may include a lens antenna, a parabolic antenna, or a different type of antenna, among other possibilities. Further, in operation, each beam narrowing module may function to consolidate the signals emitted from different active antenna elements of the phased antenna array into a single narrow beam composite signal.

For instance, in an implementation where the output of all of the phased antenna array's antenna elements are fed into a single beam narrowing module, then that single beam narrowing module may function to consolidate the signals emitted from whichever of the phased antenna array's antenna elements are active at any given time into a single narrow beam composite signal. For example, in a scenario where the control unit has activated all of the antenna elements having one of two possible polarizations and deactivated all of the antenna elements having the other of the two possible polarization, the single beam narrowing module may function to consolidate the signals emitted from the all of the antenna elements having that one polarization into a single narrow beam composite signal, such that the output of the beam narrowing module belongs to that one polarization only. Further, in an implementation where the module has two beam narrowing modules corresponding to the two possible polarizations of the antenna elements, then a first beam narrowing module may function to consolidate the signals emitted from a first set of antenna elements having a first polarization (e.g., horizontal) into a first narrow beam composite signal at times when such antenna elements are active, and a second beam narrowing module may function to consolidate the signals emitted from a second set of antenna elements having a second polarization (e.g., vertical) into a second narrow beam composite signal at times when such antenna elements are active.

Further yet, in an implementation where the module has multiple beam narrowing modules that correspond to a same given polarization and are each configured to receive the output from a different subset of antenna elements having that given polarization, each such beam narrowing module may function to consolidate the different individual signals emitted from a respective subset of antenna elements having the given polarization into a respective narrow beam composite signal at times when such antenna elements are active. To illustrate, consider an example where the phrase antenna array has a set of 8 antenna elements having a horizontal polarization, where these 8 antenna elements are grouped into two subsets of 4 antenna elements that can be activated/deactivated independently of one another via the control unit and RF module. In this example, the radio module may include two different beam narrowing modules corresponding to the horizontal polarization, where a first beam narrowing module functions to consolidate the signals emitted from the first subset of 4 antenna elements having the horizontal polarization into a first narrow beam composite signal at times when such antenna elements are active and a second beam narrowing module functions to consolidate the different individual signals emitted from the second subset of 4 antenna elements having the horizontal polarization into a second narrow beam composite signal at times when such antenna elements. Many other examples are possible as well.

Figure 29A:
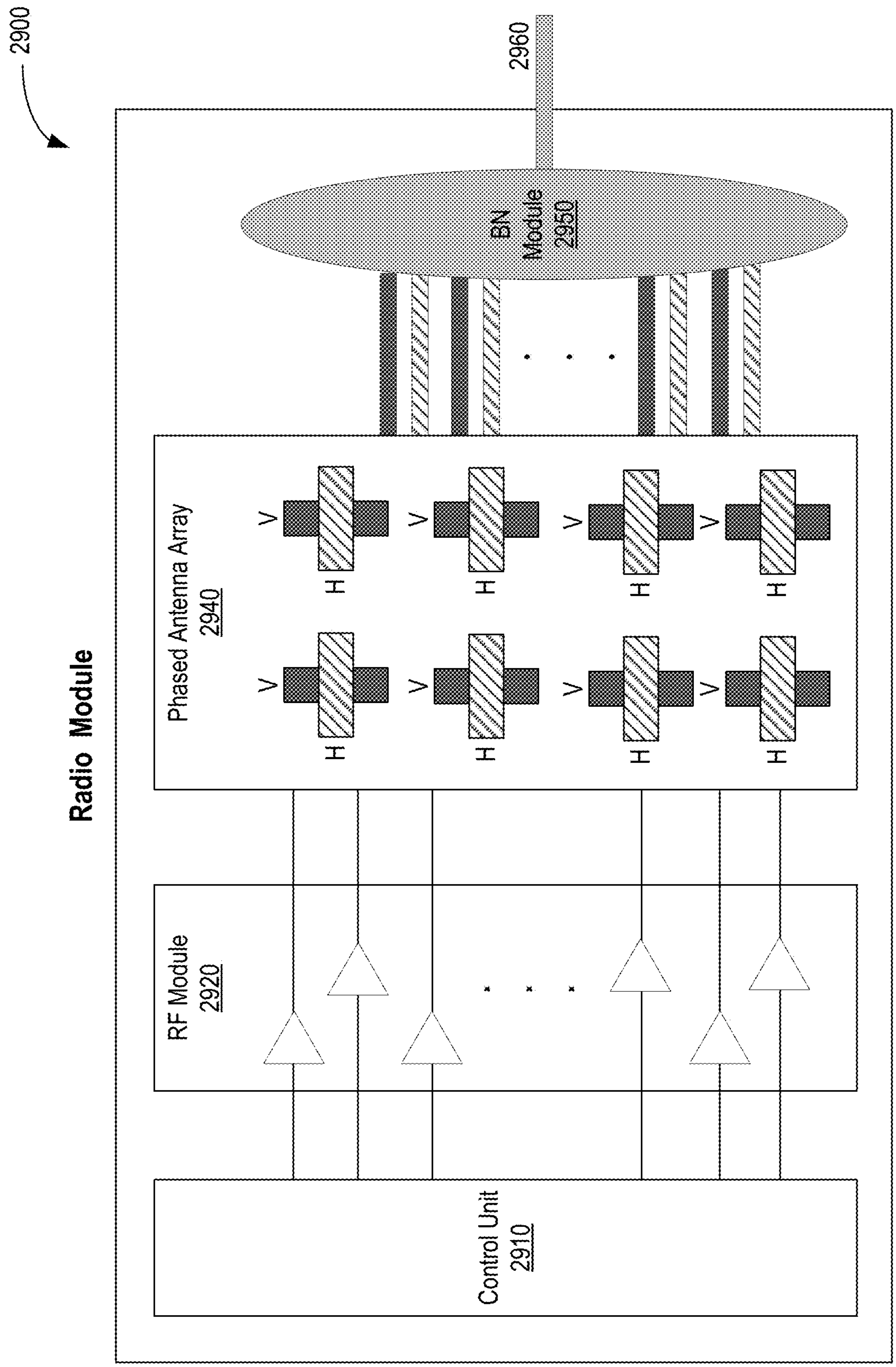
FIG. 29A depicts an example block diagram of a radio module of a communication node, in accordance with the present disclosure.
Figure 29B:
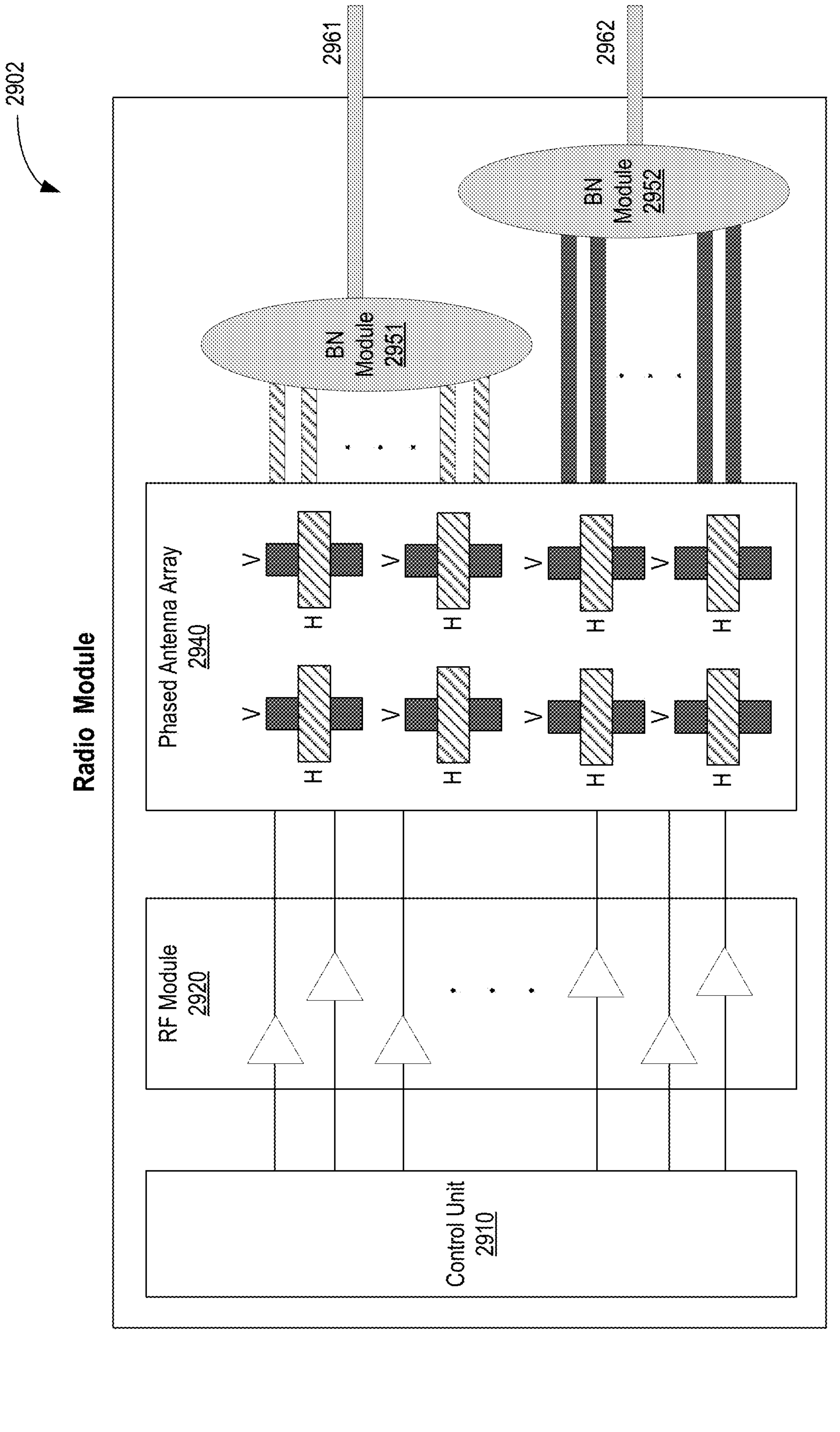
FIG. 29B depicts another example block diagram of a radio module of a communication node, in accordance with the present disclosure.
Figure 29C:
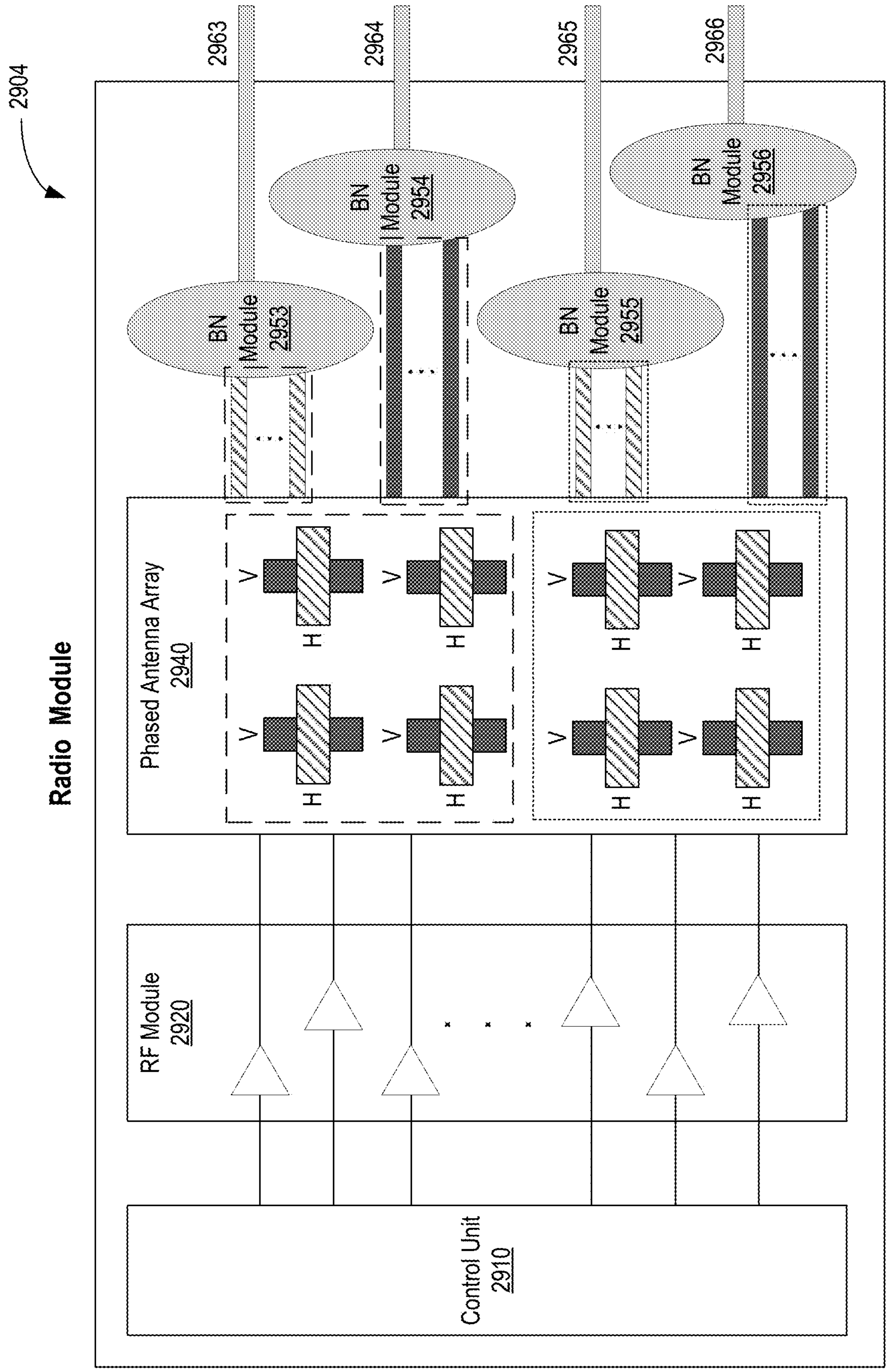
FIG. 29C depicts yet another example block diagram of a radio module of a communication node, in accordance with the present disclosure.

Some possible examples of radio module designed in accordance with this aspect of the present disclosure are illustrated in FIGS. 29A, 29B, and 29C. Beginning with FIG. 29A, a first example of a radio module 2900 is shown that includes a control unit 2910, an RF module 2920 comprising a plurality of RF chains, a phased antenna array 2940 comprising a first set of antenna elements having a horizontal polarization (marked "H" and depicted by a slanted line pattern) and a second set of antenna elements having a vertical polarization (marked “V” and depicted by a solid pattern), and a single beam narrowing module (“BN module”) 2950. As shown, in this example, the output of both the first set of antenna elements having the horizontal polarization and the second set of antenna elements having the vertical polarization are fed into the single BN module 2950, which then functions to consolidate the signals emitted by whichever of these antenna elements are active at any given time into a single narrow beam composite signal 2960.

In line with the description above, the control unit 2910 may be configured to activate and de-activate specific antenna elements of the phased antenna array 2940 by correspondingly activating and de-activating the particular RF chains that feeds those specific antenna elements. For instance, in the example shown in FIG. 29A, the control unit 2910 may be configured to activate only antenna elements having a given one of the two possible polarizations at a given time. For instance, the control unit 2910 may be configured to either (i) activate all of the antenna elements that have the horizontal polarization while deactivating all of the antenna elements that have the vertical polarization or (ii) activate all of the antenna elements that have the vertical polarization while deactivating all of the antenna elements that have the horizontal polarization. Regardless of which set of antenna elements is activated, the corresponding antenna output from those antenna elements (either horizontal or vertical polarization) is fed into the BN module 2950, which then consolidates the multiple signals received from the activated antenna elements into a single narrow beam composite signal 2960. However, the control unit 2910 may function to place the phased antenna array 2940 into other activation states as well (e.g., activation states in which a combination of horizontal and vertical antenna elements are activated at the same time).

In some implementations, the radio module 2900 may include an equal number of RF chains and antenna elements, in which case each of the antenna elements of the phased antenna array 2940 may be fed by a dedicated RF chain, and the control unit 2910 may activate and deactivate a given antenna element by activating and deactivating the dedicated RF chain that feeds the given antenna element. In other implementations, the radio module 2900 may include less RF chains than antenna elements, in which case the antenna elements of the phased antenna array 2940 may be grouped together (e.g., into groups of two or more antenna elements having the same polarization) for purposes of the RF chains, such that each respective RF chain may be configured to feed multiple antenna elements. The control unit 2910 may then activate and deactivate a given group of antenna elements by activating and deactivating the respective RF chain that feeds the given group of antenna elements. The RF feeds of the radio module 2900 may be arranged in other manners as well.

Turning to FIG. 29B, a second example of a radio module 2902 is shown that includes a control unit 2910, an RF module 2920 comprising a plurality of RF chains 2921-2936, a phased antenna array 2940 comprising a first set of antenna elements having a horizontal polarization (marked “H” and depicted by a slanted line pattern) and a second set of antenna elements having a vertical polarization (marked “V” and depicted by a solid pattern), and two BN modules 2951 and 2952 that respectively correspond to signals received by antenna elements having the horizontal and vertical polarizations. As shown, in this example, output of the first set of antenna elements having the horizontal polarization is fed into the first BN module 2951, which then functions to consolidate the signals emitted by that first set of antenna elements into a first narrow beam composite signal 2961 when such antenna elements are active, and the output of the second set of antenna elements having the vertical polarization are fed into the second BN module 2952, which then functions to consolidate the signals emitted by that second set of antenna elements into a second narrow beam composite signal 2962 when such antenna elements are active.

In line with the description above, the control unit 2910 may be configured to activate and de-activate specific antenna elements of the phased antenna array 2940 by correspondingly activating and de-activating the particular RF chains that feeds those specific antenna elements. For instance, in the example of FIG. 29B, the control unit 2910 may be configured to activate both the first set of antenna elements having the horizontal polarization and the second set of antenna elements having the vertical polarization at the same time, such as in a scenario where one set of antenna elements is used for signal reception on a bi-directional wireless link and the other set of antenna elements is used for signal transmission on the bi-directional wireless link. Alternatively, the control unit 2910 may be configured to activate only a given one of the first or second set of antenna elements corresponding to a given polarization at a given time. The control unit 2910 may function to place the phased antenna array 2940 into other activation states as well (e.g., activation states in which a combination of horizontal and vertical antenna elements are activated at the same time).

In some implementations, the radio module 2902 may include an equal number of RF chains and antenna elements, in which case each antenna element of the phased antenna array 2940 may be fed by a dedicated RF chain, and the control unit 2910 may activate and deactivate a given antenna element by activating and deactivating the dedicated RF chain that feeds the given antenna element. In other implementations, the radio module 2902 may include less RF chains than antenna elements, in which case the antenna elements of the phased antenna array 2940 may be grouped together (e.g., into groups of two or more antenna elements having the same polarization) for purposes of the RF chains, such that each respective RF chain may be configured to feed multiple antenna elements. The control unit 2910 may then activate and deactivate a given group of antenna elements by activating and deactivating the respective RF chain that feeds the given group of antenna elements. The RF feeds of the radio module 2902 may be arranged in other manners as well.

Turning to FIG. 29C, a third example of a radio module 2904 is shown that includes a control unit 2910, an RF module 2920 comprising a plurality of RF chains 2921-2936, a phased antenna array 2940 comprising a first set of antenna elements having a horizontal polarization (marked “H” and depicted by a slanted line pattern) and a second set of antenna elements having a vertical polarization (marked “V” and depicted by a solid pattern), and four BN modules 2953, 2954, 2955, and 2956. As shown, in this example, the first and second sets of antenna elements of the phased antenna array 2940 may each be grouped into different subsets that each output signals to a respective BN module. For example, the first set of antenna elements having the horizontal polarization may be grouped into a first subset (depicted by a dashed box) and a second subset (depicted by a dotted box), and the second set of antenna elements having the vertical polarization may likewise be grouped into a first subset (depicted by a dashed box) and a second subset (depicted by a dotted box). The antenna array elements in each of these subsets may then output signals to a respective BN module. For example, as shown in FIG. 29C, (i) the first subset of antenna elements that have the horizontal polarization may output (when activated) signals to BN module 2953, which then consolidates the received signals into a single narrow beam composite signal 2963, (ii) the first subset of antenna elements that have the vertical polarization may output (when activated) signals to BN module 2954, which then consolidates the received signals into a single narrow beam composite signal 2964, (iii) the second subset of antenna elements that have the horizontal polarization may output (when activated) signals to BN module 2955, which then consolidates the received signals into a single narrow beam composite signal 2965, and (iv) the second subset of antenna elements that have the vertical polarization may output (when activated) signals to BN module 2956, which then consolidates the received signals into a single narrow beam composite signal 2966.

In the example of FIG. 29C, the control unit 2910 may be configured to separately control each subset of antenna elements and thereby facilitate establishing multiple different bi-directional links between the radio module 2904 and one or more other radio modules in the wireless mesh network. For example, the control unit 2910 may be configured to activate both (i) the first subset of antenna elements having the horizontal orientation to transmit signals over a first bi-directional link and (ii) the first subset of antenna elements having the vertical orientation to receive signals over the first bi-directional link. Similarly, the control unit 2910 may be configured to activate both (i) the second subset of antenna elements having the horizontal orientation to transmit signals over a second bi-directional link and (ii) the second subset of antenna elements having the vertical orientation to receive signals over the second bi-directional link. In this way, the radio module 2904 may establish multiple different bi-directional links for signal transmission and signal reception with one or more other radio modules. The control unit 2910 may also function to place the phased antenna array 2940 into other activation states as well (e.g., activation states in which a combination of horizontal and vertical antenna elements are activated at the same time).

In line with the description above, the control unit 2910 may be configured to activate and de-activate specific antenna elements of the phased antenna array 2940 by correspondingly activating and de-activating the particular RF chains that feeds those specific antenna elements. For instance, in the example of FIG. 29C, the control unit 2910 may be configured to activate both the first set of antenna elements having the horizontal polarization and the second set of antenna elements having the vertical polarization at the same time, such as in a scenario where one set of antenna elements is used for signal reception on a bi-directional wireless link and the other set of antenna elements is used for signal transmission on the bi-directional wireless link. Alternatively, the control unit 2910 may be configured to activate only a given one of the first or second set of antenna elements corresponding to a given polarization at a given time. The control unit 2910 may function to place the phased antenna array 2940 into other activation states as well (e.g., activation states in which a combination of horizontal and vertical antenna elements are activated at the same time).

In some implementations, the radio module 2904 may include an equal number of RF chains and antenna elements, in which case each antenna element of the phased antenna array 2940 may be fed by a dedicated RF chain, and the control unit 2910 may activate and deactivate a given antenna element by activating and deactivating the dedicated RF chain that feeds the given antenna element. In other implementations, the radio module 2902 may include less RF chains than antenna elements, in which case the antenna elements of the phased antenna array 2940 may be grouped together (e.g., into groups of two or more antenna elements having the same polarization) for purposes of the RF chains, such that each respective RF chain may be configured to feed multiple antenna elements. The control unit 2910 may then activate and deactivate a given group of antenna elements by activating and deactivating the respective RF chain that feeds the given group of antenna elements. The RF feeds of the radio module 2904 may be arranged in other manners as well.

FIGS. 29A, 29B, and 29C each depict one embodiment of a radio module having a phased antenna array as disclosed herein. It should be understood that other examples in accordance with this disclosure are also possible.

CONCLUSION

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A radio module for a wireless communication node, the radio module comprising:

- a phased antenna array comprising a first set of antenna elements having a first polarization and a second set of antenna elements having a second polarization;
- a radio frequency (RF) module comprising a plurality of RF chains that are configured to feed the first and second sets of antenna elements in the phased antenna array;
- a control unit that is configured to control an activation state of each antenna element in the phased antenna array; and
- a plurality of beam narrowing modules comprising:
  - a first beam narrowing module corresponding to the first polarization and configured to (i) receive signals emitted by at least a subset of antenna elements from the first set of antenna elements having the first polarization when active and (ii) consolidate the received signals into a first narrow beam composite signal having the first polarization; and
  - a second beam narrowing module corresponding to the second polarization and configured to (i) receive signals emitted by at least a subset of antenna elements from the second set of antenna elements having the second polarization when active and (ii)

consolidate the received signals into a second narrow beam composite signal having the second polarization.

2. The radio module of claim 1, wherein each of the first and second beam narrowing modules is one of a lens antenna or a parabolic antenna.

3. The radio module of claim 1, wherein the first polarization comprises a horizontal polarization and the second polarization comprises a vertical polarization.

4. The radio module of claim 1, wherein the first polarization comprises a +45 degree polarization and the second polarization comprises a −45 degree polarization.

5. The radio module of claim 1, wherein:

the plurality of RF chains comprises one or both of (i) RF chains that are each configured to feed a single antenna element of the phased antenna array or (ii) RF chains that are each configured to feed two or more antenna elements of the phased antenna array.

6. The radio module of claim 1, wherein:

the at least a subset of antenna elements from the first set of antenna elements having the first polarization is the first set of antenna elements having the first polarization; and the at least a subset of antenna elements from the second set of antenna elements having the second polarization is the second set of antenna elements having the second polarization.

7. The radio module of claim 6, wherein the control unit is configured to (i) activate one of the first or second sets of antenna elements for signal reception over a bi-directional wireless link and (ii) activate the other of the first or second sets of antenna elements for signal transmission over the bi-directional wireless link.

8. The radio module of claim 7, wherein the control unit is configured to activate the first and second sets of antenna elements at the same time for signal reception and signal transmission at the same time over the bi-directional wireless link.

9. The radio module of claim 1, wherein:

the at least a subset of antenna elements from the first set of antenna elements having the first polarization is a first subset of antenna elements having the first polarization;

the at least a subset of antenna elements from the second set of antenna elements having the second polarization is a second subset set of antenna elements having the second polarization;

the plurality of beam narrowing modules further comprises:

a third beam narrowing module corresponding to the first polarization and configured to (i) receive signals emitted by a third subset of antenna elements from the first set of antenna elements having the first polarization when active and (ii) consolidate the received signals into a third narrow beam composite signal having the first polarization; and a fourth beam narrowing module corresponding to the second polarization and configured to (i) receive signals emitted by a fourth subset of antenna elements from the second set of antenna elements having the second polarization when active and (ii) consolidate the received signals into a fourth narrow beam composite signal having the second polarization; and the control unit is configured to independently activate or deactivate each of the first through fourth subsets of antenna elements.

10. The radio module of claim 9, wherein:

the control unit is configured to (i) activate the first subset of antenna elements from the first set of antenna elements for signal reception over a first bi-directional wireless link, (ii) activate the second subset of antenna elements from the second set of antenna elements for signal transmission over the first bi-directional wireless link, (iii) activate the third subset of antenna elements from the first set of antenna elements for signal reception over a second bi-directional wireless link, and (iv) activate the fourth subset of antenna elements from the second set of antenna elements for signal transmission over the second bi-directional wireless link.

11. A communication system comprising:

a set of wireless communication nodes that are installed with respective equipment for operating as part of a wireless mesh network, wherein the respective equipment of each wireless communication node in the set includes a respective radio module comprising:

a phased antenna array comprising a first set of antenna elements having a first polarization and a second set of antenna elements having a second polarization;

a radio frequency (RF) module comprising a plurality of RF chains that are configured to feed the first and second sets of antenna elements in the phased antenna array;

a control unit that is configured to control an activation state of each antenna element in the phased antenna array; and a plurality of beam narrowing modules comprising:

a first beam narrowing module corresponding to the first polarization and configured to (i) receive signals emitted by at least a subset of antenna elements from the first set of antenna elements having the first polarization when active and iii) consolidate the received signals into a first narrow beam composite signal having the first polarization; and a second beam narrowing module corresponding to the second polarization and configured to (i) receive signals emitted by at least a subset of antenna elements from the second set of antenna elements having the second polarization when active and (ii) consolidate the received signals into a second narrow beam composite signal having the second polarization.

12. The communication system of claim 11, wherein each of the first and second beam narrowing modules is one of a lens antenna or a parabolic antenna.

13. The communication system of claim 11, wherein the first polarization comprises a horizontal polarization and the second polarization comprises a vertical polarization.

14. The communication system of claim 11, wherein the first polarization comprises a +45 degree polarization and the second polarization comprises a −45 degree polarization.

15. The communication system of claim 11, wherein:

the plurality of RF chains comprises one or both of (i) RF chains that are each configured to feed a single antenna element of the phased antenna array or (ii) RF chains that are each configured to feed two or more antenna elements of the phased antenna array.

16. The communication system of claim 11, wherein:

the at least a subset of antenna elements from the first set of antenna elements having the first polarization is the first set of antenna elements having the first polarization; and the at least a subset of antenna elements from the second set of antenna elements having the second polarization is the second set of antenna elements having the second polarization.

17. The communication system of claim 16, wherein the control unit is configured to (i) activate one of the first or second sets of antenna elements for signal reception over a bi-directional wireless link and (ii) activate the other of the first or second sets of antenna elements for signal transmission over the bi-directional wireless link.

18. The communication system of claim 17, wherein the control unit is configured to activate the first and second sets of antenna elements at the same time for signal reception and signal transmission at the same time over the bi-directional wireless link.

19. The communication system of claim 11, wherein:

the at least a subset of antenna elements from the first set of antenna elements having the first polarization is a first subset of antenna elements having the first polarization;

the at least a subset of antenna elements from the second set of antenna elements having the second polarization is a second subset set of antenna elements having the second polarization;

the plurality of beam narrowing modules further comprises:

a third beam narrowing module corresponding to the first polarization and configured to (i) receive signals emitted by a third subset of antenna elements from the first set of antenna elements having the first polarization when active and (ii) consolidate the received signals into a third narrow beam composite signal having the first polarization; and a fourth beam narrowing module corresponding to the second polarization and configured to (i) receive signals emitted by a fourth subset of antenna elements from the second set of antenna elements having the second polarization when active and (ii) consolidate the received signals into a fourth narrow beam composite signal having the second polarization; and the control unit is configured to independently activate or deactivate each of the first through fourth subsets of antenna elements.

20. The communication system of claim 19, wherein:

the control unit is configured to (i) activate the first subset of antenna elements from the first set of antenna elements for signal reception over a first bi-directional wireless link, (ii) activate the second subset of antenna elements from the second set of antenna elements for signal transmission over the first bi-directional wireless link, (iii) activate the third subset of antenna elements from the first set of antenna elements for signal reception over a second bi-directional wireless link, and (iv) activate the fourth subset of antenna elements from the second set of antenna elements for signal transmission over the second bi-directional wireless link.

* * * * *